US011634046B2

United States Patent
Naganishi et al.

(10) Patent No.: US 11,634,046 B2
(45) Date of Patent: Apr. 25, 2023

(54) VEHICLE CHARGING SYSTEM AND POWER RECEIVING FITTING BODY

(71) Applicant: Yazaki Corporation, Tokyo (JP)

(72) Inventors: Yukinari Naganishi, Shizuoka (JP); Satoru Horiuchi, Shizuoka (JP); Yuichi Takahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 79 days.

(21) Appl. No.: 17/386,046

(22) Filed: Jul. 27, 2021

(65) Prior Publication Data

US 2022/0032800 A1   Feb. 3, 2022

(30) Foreign Application Priority Data

Jul. 31, 2020 (JP) .............................. JP2020-129798

(51) Int. Cl.
*B60L 53/35* (2019.01)
*B60L 53/16* (2019.01)
*B60L 53/31* (2019.01)
*H01R 13/453* (2006.01)
*H01R 13/639* (2006.01)

(52) U.S. Cl.
CPC .............. *B60L 53/35* (2019.02); *B60L 53/16* (2019.02); *B60L 53/31* (2019.02); *H01R 13/4538* (2013.01); *H01R 13/639* (2013.01); *H01R 2201/26* (2013.01)

(58) Field of Classification Search
CPC ........... B60L 53/35; B60L 53/31; B60L 53/16
See application file for complete search history.

(56) References Cited

U.S. PATENT DOCUMENTS

| 3,596,018 | A | * | 7/1971 | Elmes | ................ | H01R 13/6315 |
| | | | | | | D13/133 |
| 3,603,860 | A | * | 9/1971 | Johnson | ................ | H02J 7/0045 |
| | | | | | | 320/109 |
| 5,252,078 | A | * | 10/1993 | Langenbahn | ........... | B60L 53/31 |
| | | | | | | 439/138 |
| 5,272,431 | A | * | 12/1993 | Nee | .......................... | B60L 53/65 |
| | | | | | | 320/109 |
| 5,306,999 | A | * | 4/1994 | Hoffman | ................. | B60L 53/16 |
| | | | | | | 320/109 |

(Continued)

FOREIGN PATENT DOCUMENTS

| JP | 2006-68845 A | 3/2006 |
| JP | 2011-020177 A | 2/2011 |
| JP | 2011-50177 A | 3/2011 |

*Primary Examiner* — Neil Abrams
(74) *Attorney, Agent, or Firm* — Sughrue Mion, PLLC

(57) ABSTRACT

A vehicle charging system includes: a power supply device including a power supply fitting body and provided in a stop space of a vehicle; and a power receiving fitting body that is provided on a bottom of the vehicle and is able to be fitted to and removed from the power supply fitting body in an insertion/removal direction. The power receiving fitting body includes power receiving terminals electrically connected no a battery provided in the vehicle, a power receiving terminal holding part that holds the power receiving terminals, and an opposite space forming part that is arranged adjacent to the power receiving terminal holding part in the insertion/removal direction and forms an opposite space facing the power receiving terminals.

20 Claims, 37 Drawing Sheets

(56) References Cited

U.S. PATENT DOCUMENTS

| | | | | |
|---|---|---|---|---|
| 5,596,258 | A * | 1/1997 | Kimura | H02J 7/00036 |
| | | | | 320/109 |
| 5,646,500 | A * | 7/1997 | Wilson | B60L 53/126 |
| | | | | 439/246 |
| 5,850,135 | A * | 12/1998 | Kuki | B60L 53/126 |
| | | | | 320/108 |
| 8,384,344 | B1 * | 2/2013 | Rogers | B60L 53/16 |
| | | | | 320/108 |
| 8,471,522 | B2 * | 6/2013 | Virk | B60L 53/14 |
| | | | | 320/140 |
| 9,421,879 | B2 * | 8/2016 | Pastoor | B60L 53/35 |
| 9,428,070 | B2 * | 8/2016 | Bell | B60L 53/35 |
| 10,286,799 | B2 * | 5/2019 | Namou | B60L 53/14 |
| 10,351,005 | B2 * | 7/2019 | Haag | H02J 50/90 |
| 10,661,669 | B1 * | 5/2020 | Torok | B60L 53/30 |
| 10,723,594 | B2 * | 7/2020 | Hermey | G02B 6/36 |
| 11,318,857 | B2 * | 5/2022 | Westfall | B60L 53/16 |
| 11,338,688 | B2 * | 5/2022 | Naganishi | B60L 53/36 |
| 2006/0043929 | A1 | 3/2006 | Koyanagi et al. | |
| 2011/0148350 | A1 * | 6/2011 | Wegener | B60L 53/12 |
| | | | | 320/108 |
| 2011/0310021 | A1 | 12/2011 | Choi et al. | |
| 2022/0032800 | A1 * | 2/2022 | Naganishi | B60L 53/14 |
| 2022/0355693 | A1 * | 11/2022 | Ikegaya | G05D 3/12 |

* cited by examiner

FIG.37
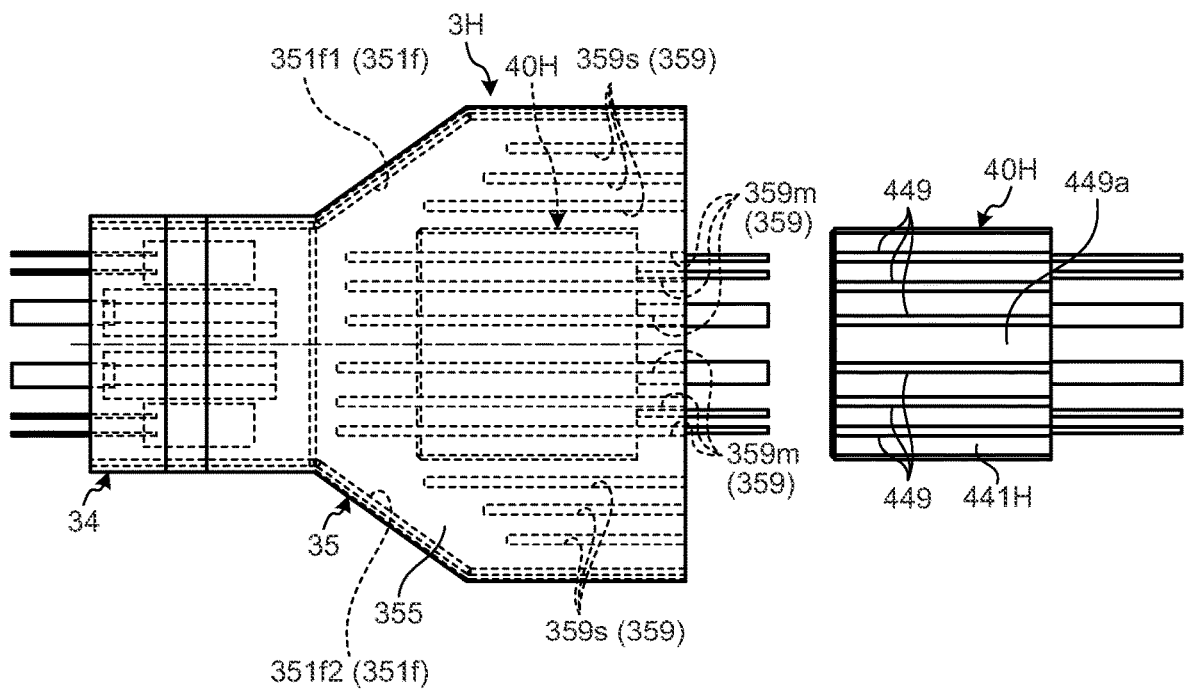
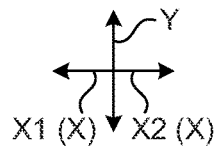
FIG.38
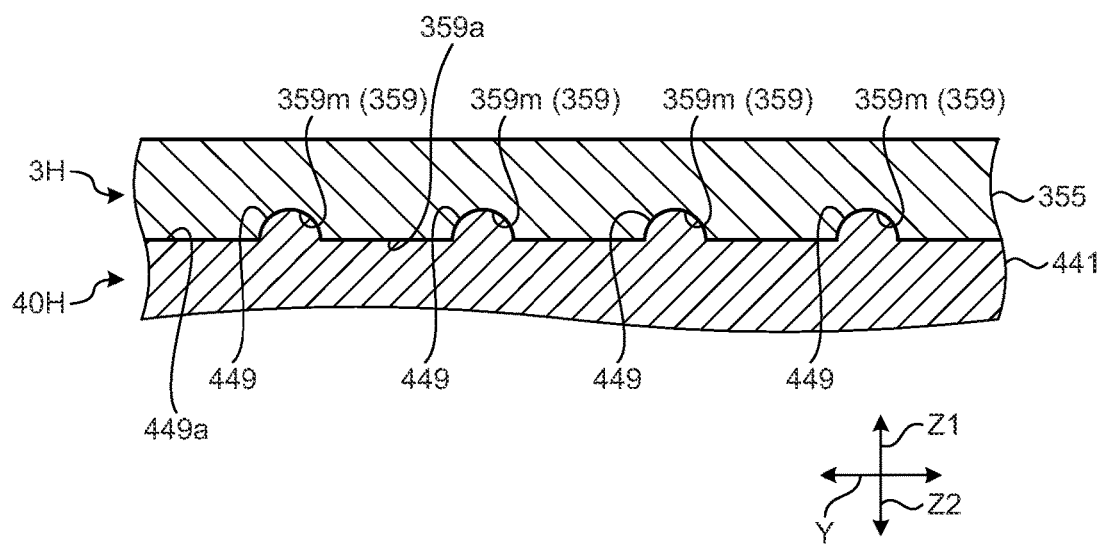
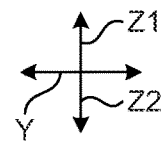

VEHICLE CHARGING SYSTEM AND POWER RECEIVING FITTING BODY

CROSS-REFERENCE TO RELATED APPLICATION(S)

The present application claims priority to and incorporates by reference the entire contents of Japanese Patent Application No. 2020-129798 filed in Japan on Jul. 31, 2020.

BACKGROUND OF THE INVENTION

1. Field of the Invention

The present invention relates to a vehicle charging system and a power receiving fitting body.

2. Description of the Related Art

A vehicle provided with a battery, such as an electric vehicle, runs by driving a driving motor with power charged in the battery. One of the means to charge the battery is through a vehicle charging system.

Some vehicle charging systems include: a power supply device that has a power supply fitting body and is provided in a stop space of a vehicle, and a power receiving fitting body that is provided at the bottom of the vehicle and can be fitted to and removed from the power supply fitting body (for example, Japanese Patent Application Laid-open No. 2011-20177).

The power receiving fitting body has power receiving terminals, and the power supply fitting body has power supply terminals that come into contact with the power receiving terminals in a state in which the power supply fitting body and the power receiving fitting body have been fitted, electrically connects the power receiving terminals and the power supply terminals, and charges a battery by supplying power to the battery from a charging device provided outside the vehicle.

However, in the vehicle charging system according to the related art, since the power receiving terminals are arranged vertically along a vertical direction of the vehicle, the power receiving fitting body occupies a space inside the vehicle in the vertical direction of the vehicle. Therefore, in the power receiving fitting body of the vehicle charging system according to the related art, the power receiving terminals are arranged vertically along the vertical direction, which may affect a layout inside the vehicle.

SUMMARY OF THE INVENTION

The present invention has been made to solve the problem described above, and an object of the present invention is to provide a vehicle charging system and a power receiving fitting body that are capable of suppressing the influence on a layout inside a vehicle.

In order to achieve the above mentioned object, a vehicle charging system according to one aspect of the present invention includes a power supply device including a power supply fitting body and provided in a stop space of a vehicle; and a power receiving fitting body that is provided on a bottom of the vehicle and is able to be fitted to and removed from the power supply fitting body in an insertion/removal direction, wherein the power receiving fitting body includes a power receiving terminal electrically connected to a battery provided in the vehicle, a power receiving terminal holding part that holds the power receiving terminal, and an opposite space forming part that is arranged adjacent to the power receiving terminal holding part in the insertion/removal direction and forms an opposite space facing the power receiving terminal, the power supply fitting body includes a power supply terminal electrically connected to a charging device provided outside the vehicle, the power supply device includes at least an insertion/removal direction movement part that moves the power supply fitting body in the insertion/removal direction, and when the power supply fitting body is located in the opposite space and the power supply terminal and the power receiving terminal are in an opposite state in which the power supply terminal and the power receiving terminal are opposite to each other in the insertion/removal direction, the insertion/removal direction movement part causes the power receiving fitting body and the power supply fitting body to be fitted to each other by moving the power supply fitting body toward the power receiving fitting body in the insertion/removal direction, and electrically connects the battery and the charging device by bringing the power receiving terminal and the power supply terminal into contact with each other.

According to another aspect of the present invention, in the vehicle charging system, it is preferable that the power receiving terminal holding part has a holding portion opening at an end of the power receiving terminal in a removal direction, the holding portion opening connecting the opposite space with an internal space of the power receiving terminal holding part, the power receiving fitting body has a holding portion door that opens and closes the holding portion opening, the holding portion door is in an open state by external force based on a movement of the power supply fitting body by the insertion/removal direction movement part, and exposes the power receiving terminal to the opposite space via the holding portion opening, and the holding portion door is in a closed state due to absence of the external force based on the movement of the power supply fitting body by the insertion/removal direction movement part, and closes the holding portion opening.

According to still another aspect of the present invention, in the vehicle charging system, it is preferable that the opposite space forming part has guide surfaces that are arranged on a side of the power receiving fitting body in the insertion/removal direction and face the power supply fitting body in the insertion/removal direction in the opposite state, the guide surfaces are arranged in a pair with the power receiving terminal holding part interposed therebetween, and a distance between the pair of guide surfaces in a width direction becomes shorter toward the power receiving fitting body in the insertion/removal direction.

According to still another aspect of the present invention, in the vehicle charging system, it is preferable that the power supply device has a vertical movement part that causes the power supply fitting body to advance and retract with respect to the opposite space by moving the power supply fitting body in a vertical direction of the vehicle.

According to still another aspect of the present invention, in the vehicle charging system, it is preferable that the opposite space forming part has a forming portion opening that connects the opposite space and an exterior in a downward direction, the power receiving fitting body has a forming portion door that opens and closes the forming portion opening, the forming portion door is in an open state by external force based on a movement of the power supply fitting body by the vertical movement part, and connects the opposite space with an exterior via the forming portion opening, and the forming portion door is in a closed state due to absence of the external force based on the movement of the power supply fitting body by the vertical movement part, and closes the forming portion opening.

According to still another aspect of the present invention, in the vehicle charging system, it is preferable that the opposite space forming part has a contact surface coming into contact with a ceiling surface of the power supply fitting body when the power supply fitting body moved in an upward direction by the vertical movement part, one of the ceiling surface and the contact surface is formed with a convex portion extending in the insertion/removal direction, the other of the ceiling surface and the contact surface is formed with a concave portion configured to engage with the convex portion and extending in the insertion/removal direction, and when the convex portion and the concave portion engage with each other in the opposite state, an axial direction of the power supply terminal becomes parallel to an axial direction of the power receiving terminal.

According to another aspect of the present invention, in the vehicle charging system, it is preferable that the power receiving fitting body has a plurality of the power receiving terminals, and the power receiving terminals are arranged side by side in a width direction that is a direction different from de insertion/removal direction and the vertical direction of the vehicle.

In order to achieve the above mentioned object, a power receiving fitting body that is provided on a bottom of a vehicle and is able to be fitted to and removed from a power supply fitting body in an insertion/removal direction, the power supply fitting body being included in a power supply device provided in a stop space of a vehicle, the power receiving fitting body according to still another aspect of the present invention includes a power receiving terminal electrically connected to a battery provided in the vehicle; a power receiving terminal holding part that holds the power receiving terminal; and an opposite space forming part that is arranged adjacent to the power receiving terminal holding part in the insertion/removal direction and forms an opposite space facing the power receiving terminal, wherein the power receiving terminal is able to face and come into contact with, in the insertion/removal direction, a power supply terminal electrically connected to a charging device provided outside the vehicle, and when the power supply fitting body is moved toward a side of the power receiving fitting body in the insertion/removal direction, the power receiving fitting body is fitted to the power supply fitting body and the power receiving terminal and the power supply terminal come into contact with each other so as electrically connect the battery and the charging device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 37 is a perspective view for explaining a power supply fitting body and a power receiving fitting body according to a first modification of the third embodiment in a vehicle charging system according to the present invention;

FIG. 38 is a sectional view illustrating a contact surface of the power supply fitting body and a ceiling surface of the power receiving fitting body according to the first modification of the third embodiment;

DETAILED DESCRIPTION OF THE PREFERRED EMBODIMENTS

Hereinafter, a vehicle charging system 1 according to embodiments of the present invention will be described in detail with reference to the drawings. Note that the invention is not limited to the embodiments.

Figure 1:
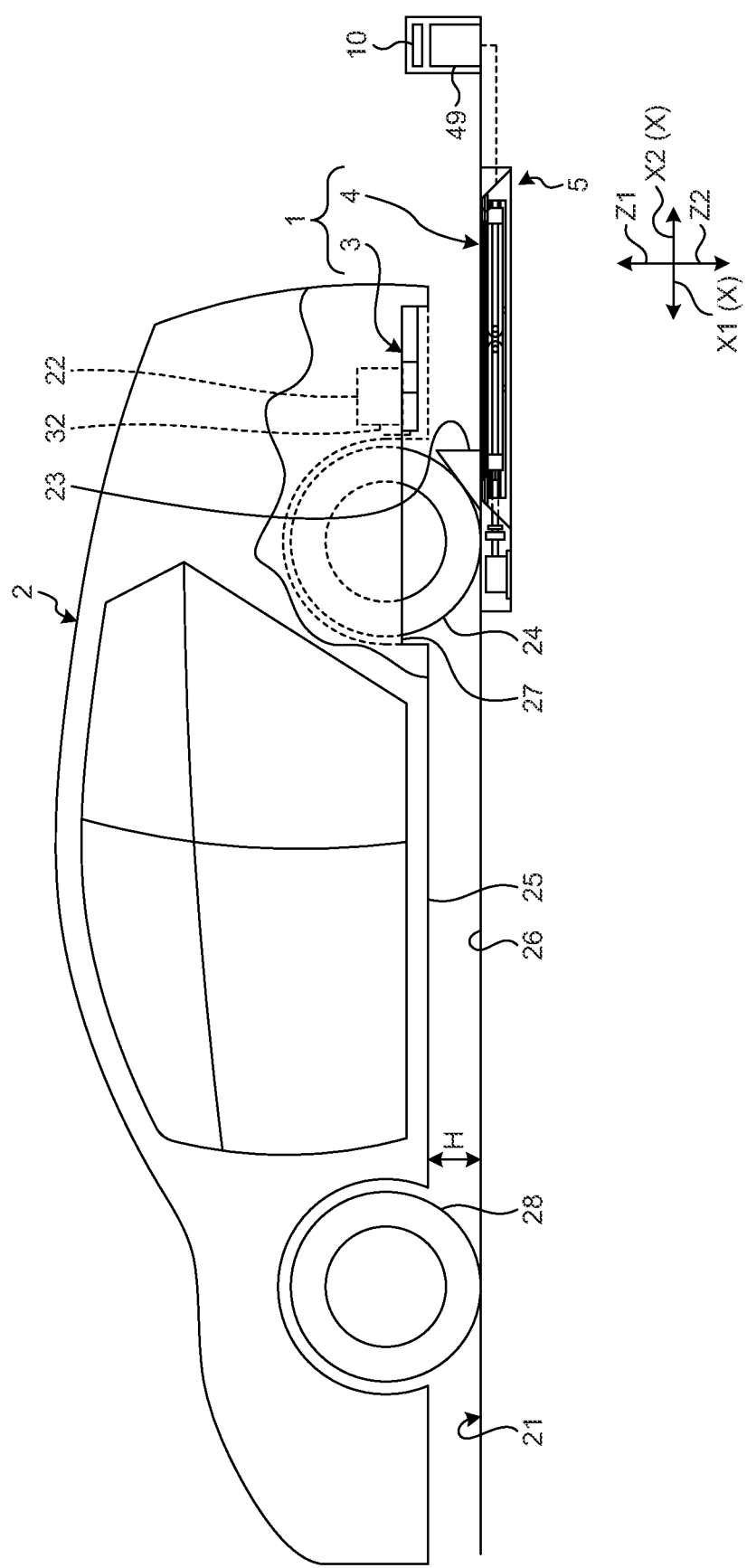
FIG. 1 is a sectional view of a vehicle charging system according to a first embodiment of the present embodiment.
Figure 2:
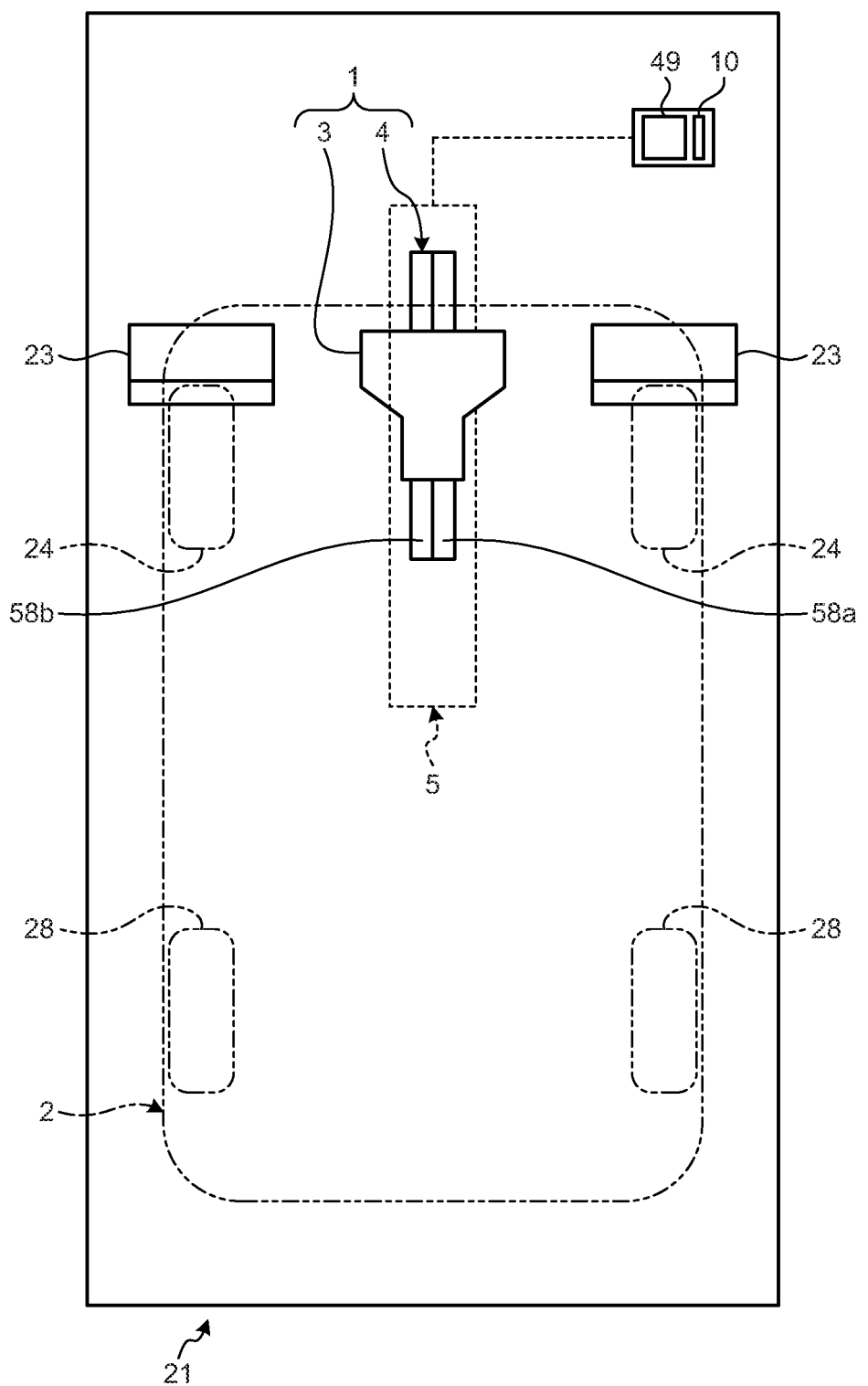
FIG. 2 is a plan view of the vehicle charging system according to the first embodiment of the present embodiment.
Figure 3:
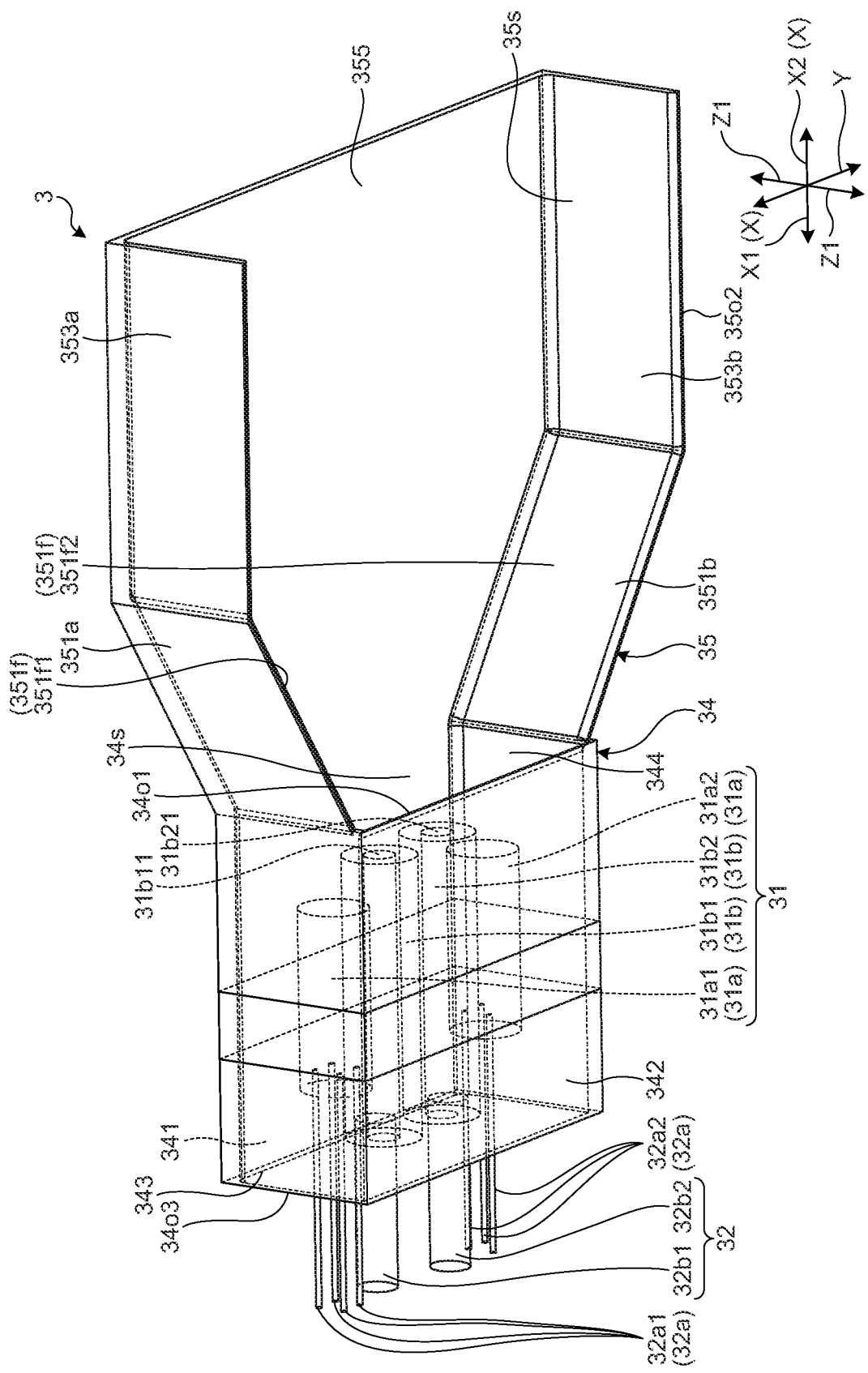
FIG. 3 is a perspective view of a power receiving fitting body according to the first embodiment of the present embodiment.
Figure 4:
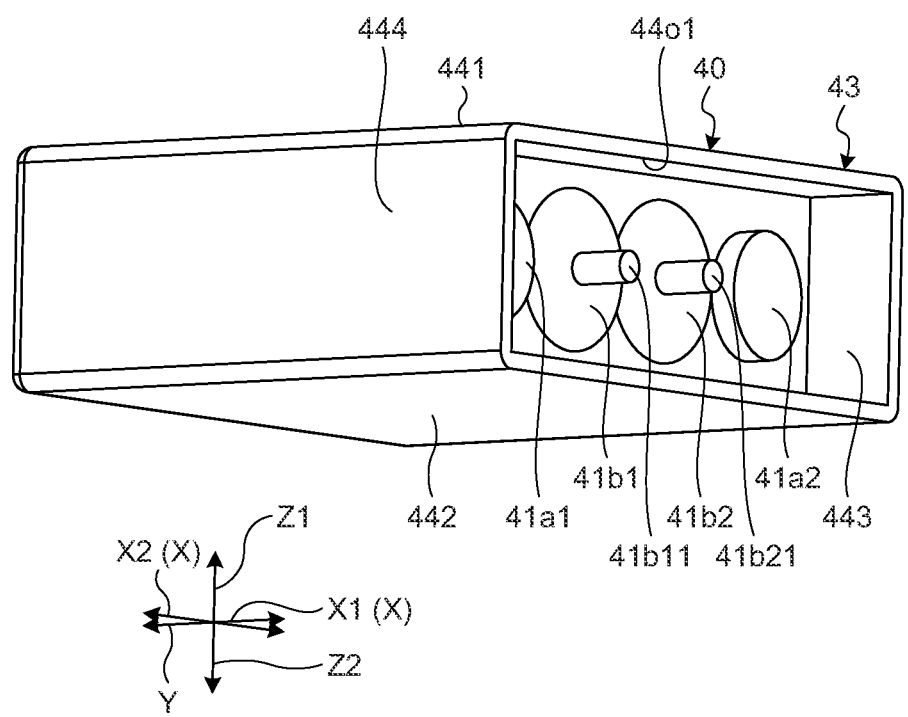
FIG. 4 is a perspective view of a power supply fitting body according to the first embodiment of the present embodiment.
Figure 5:
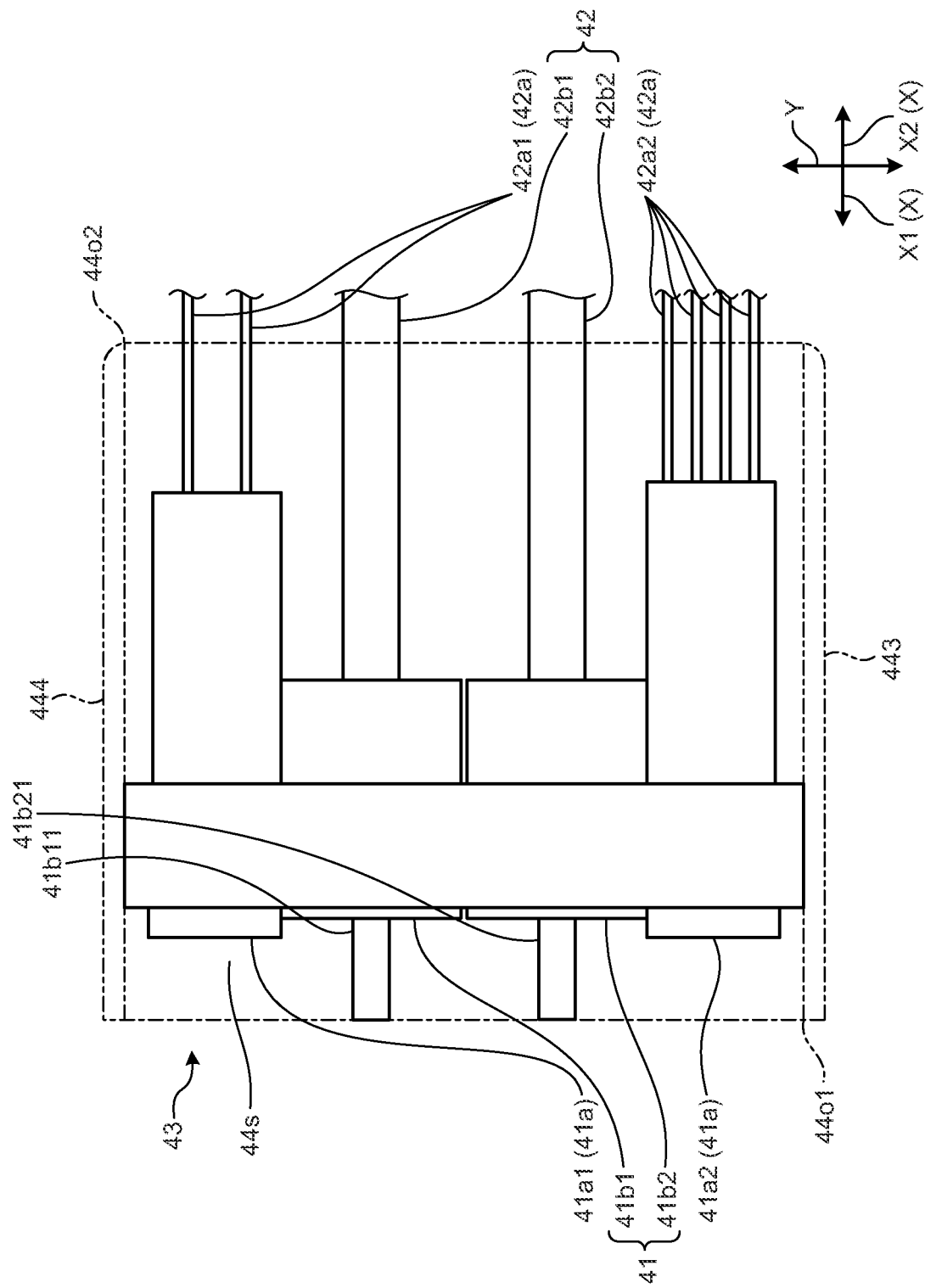
FIG. 5 is a plan view of the power supply fitting body.
Figure 6:
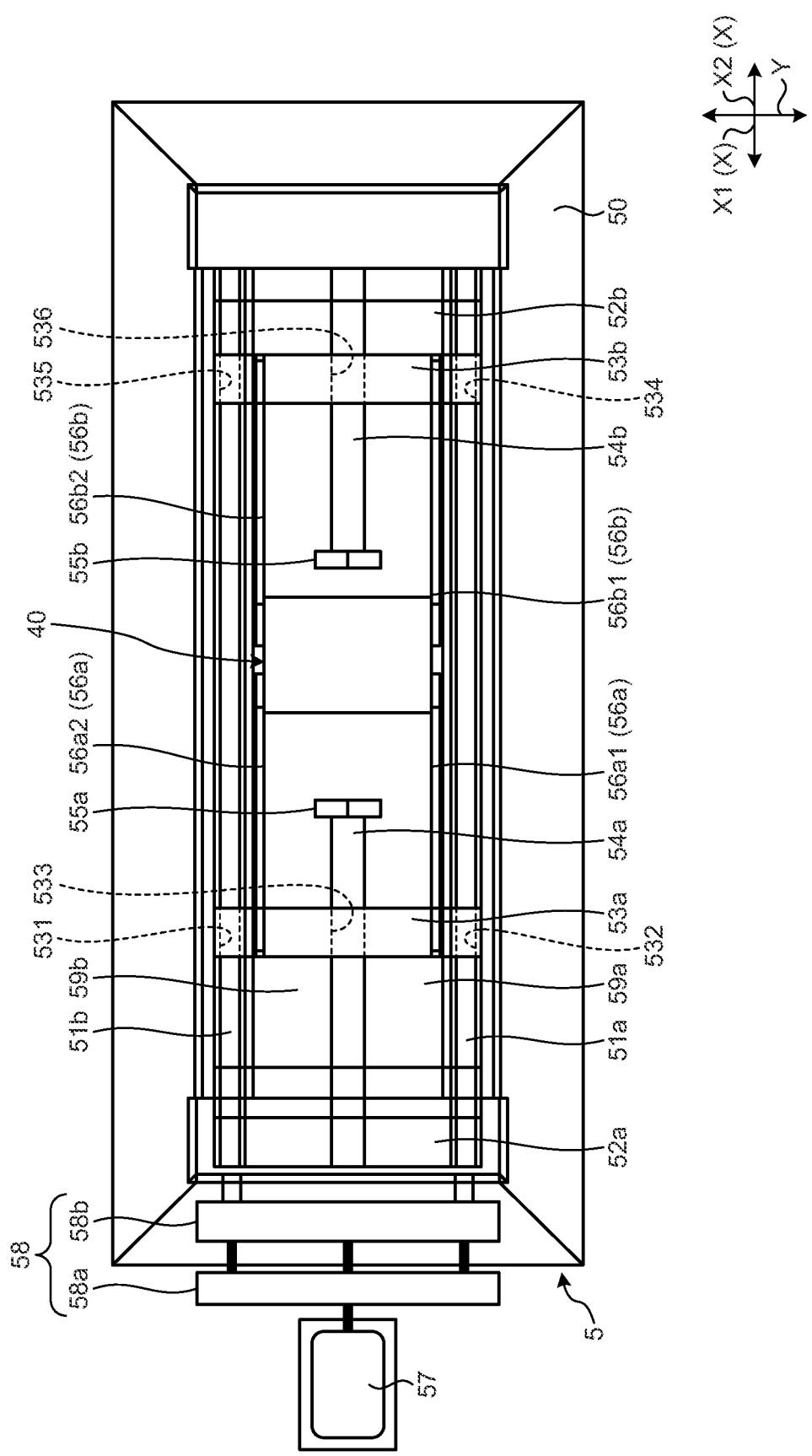
FIG. 6 is a plan view of a lift part included in a power supply device according to the first embodiment of the present embodiment.
Figure 7:
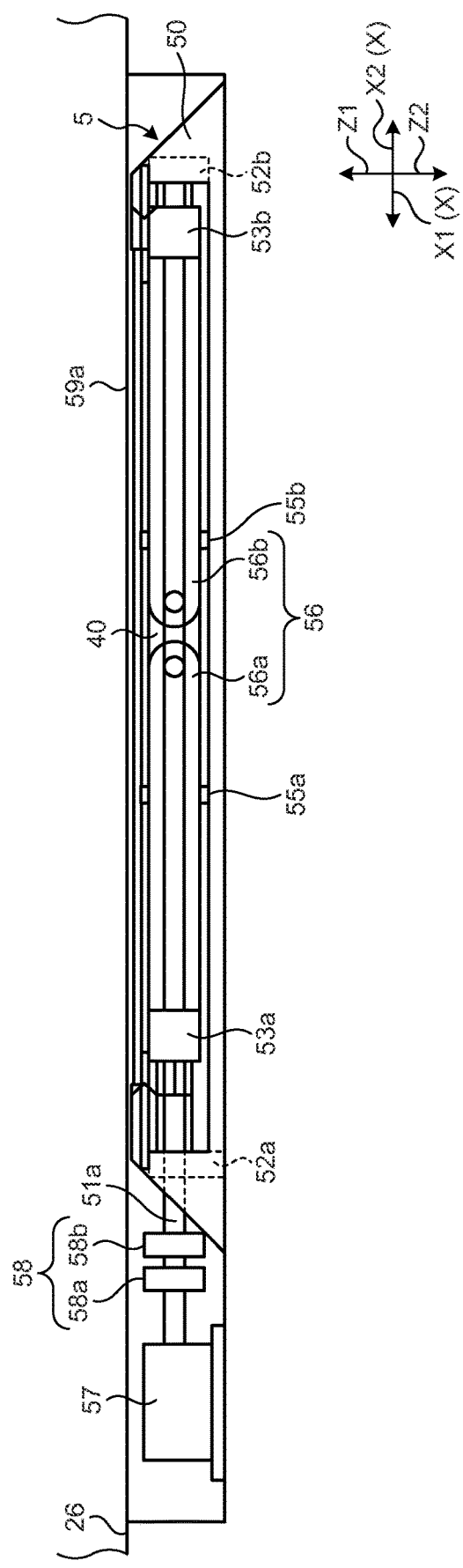
FIG. 7 is a side view of the lift part.
Figure 8:
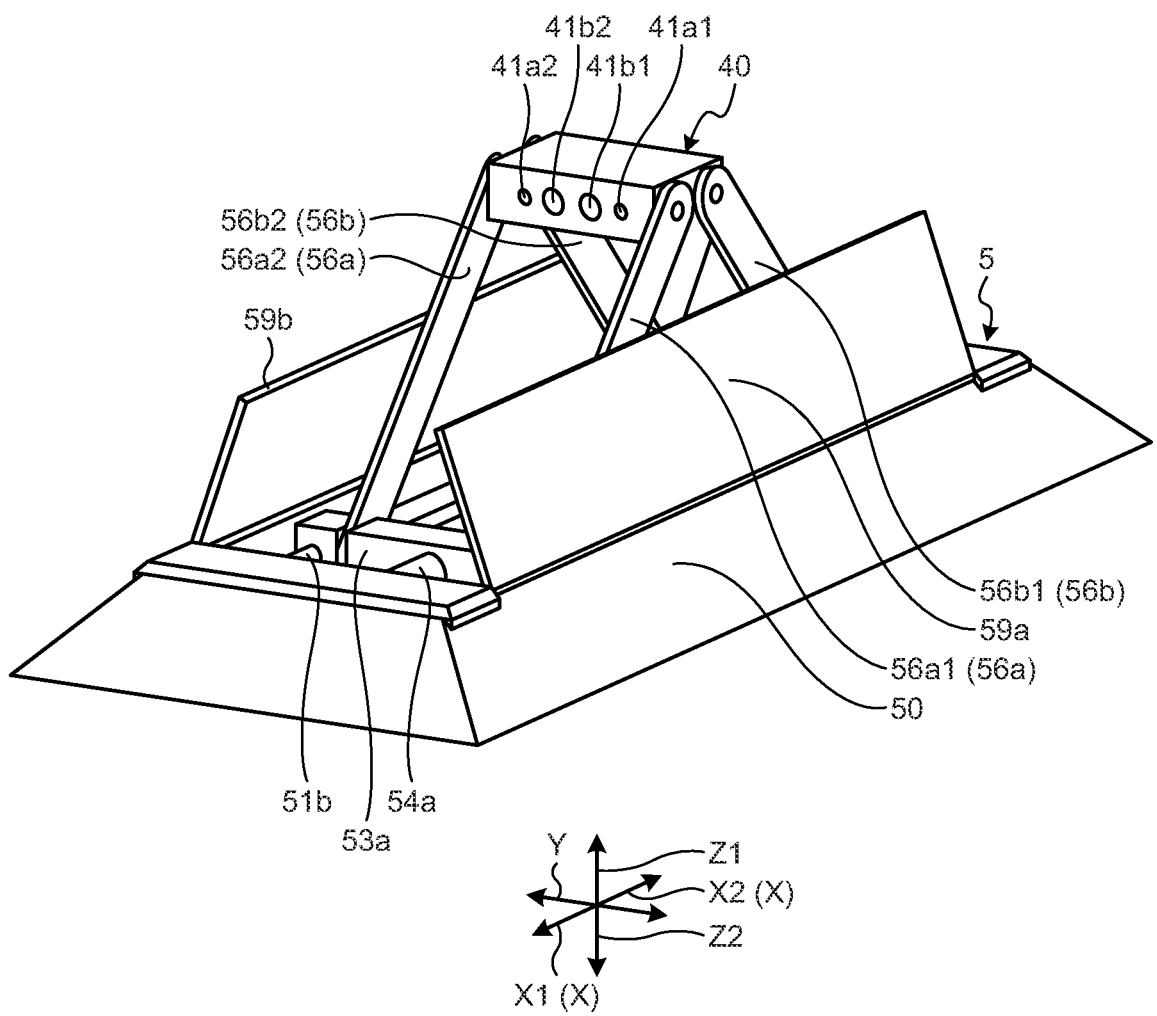
FIG. 8 is a perspective view illustrating a state in which arms of the lift part included in the power supply device according to the first embodiment of the present embodiment are raised.
Figure 9:
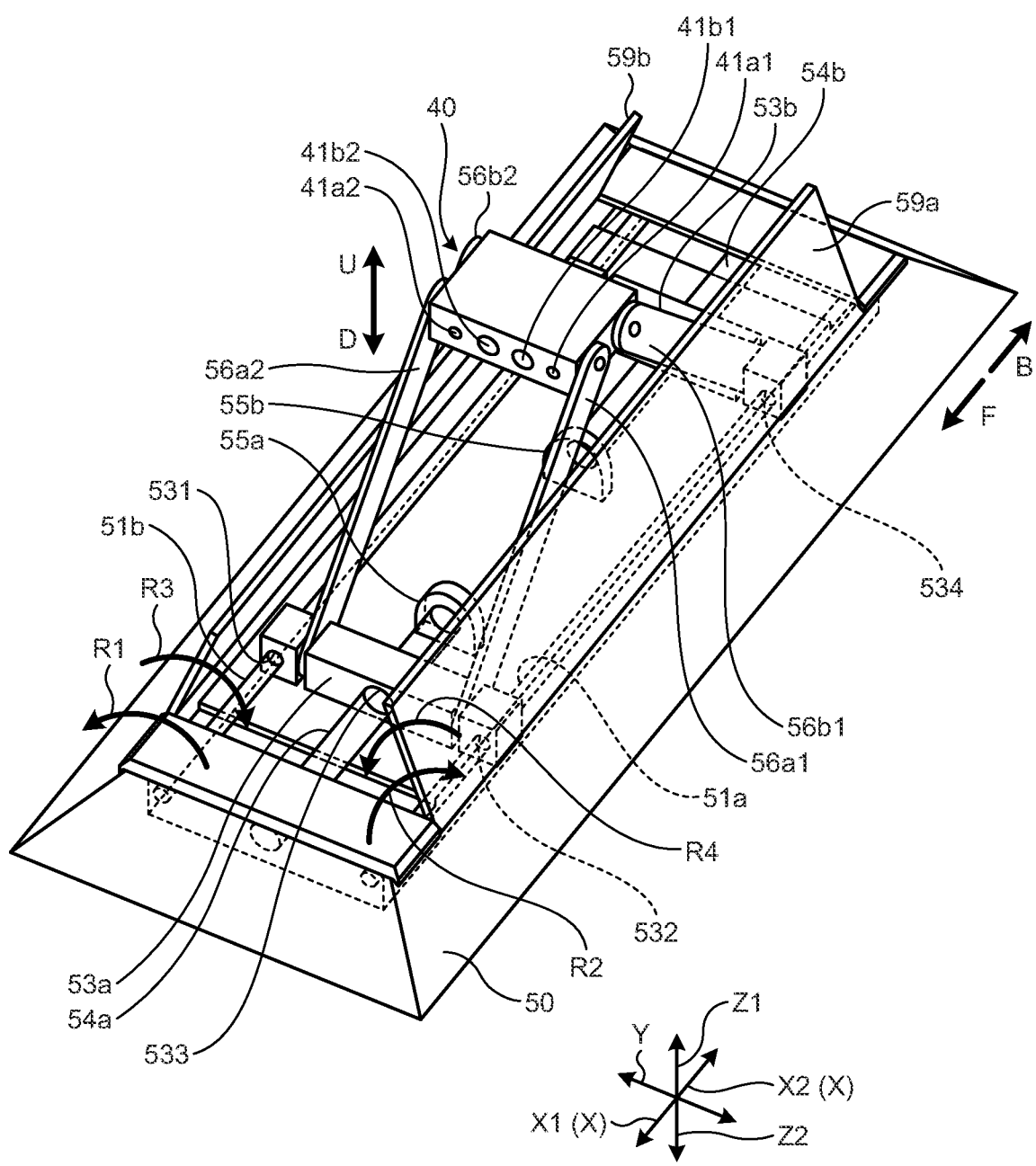
FIG. 9 is a perspective view illustrating a state in which the arms of the lift part are raised.
Figure 10:
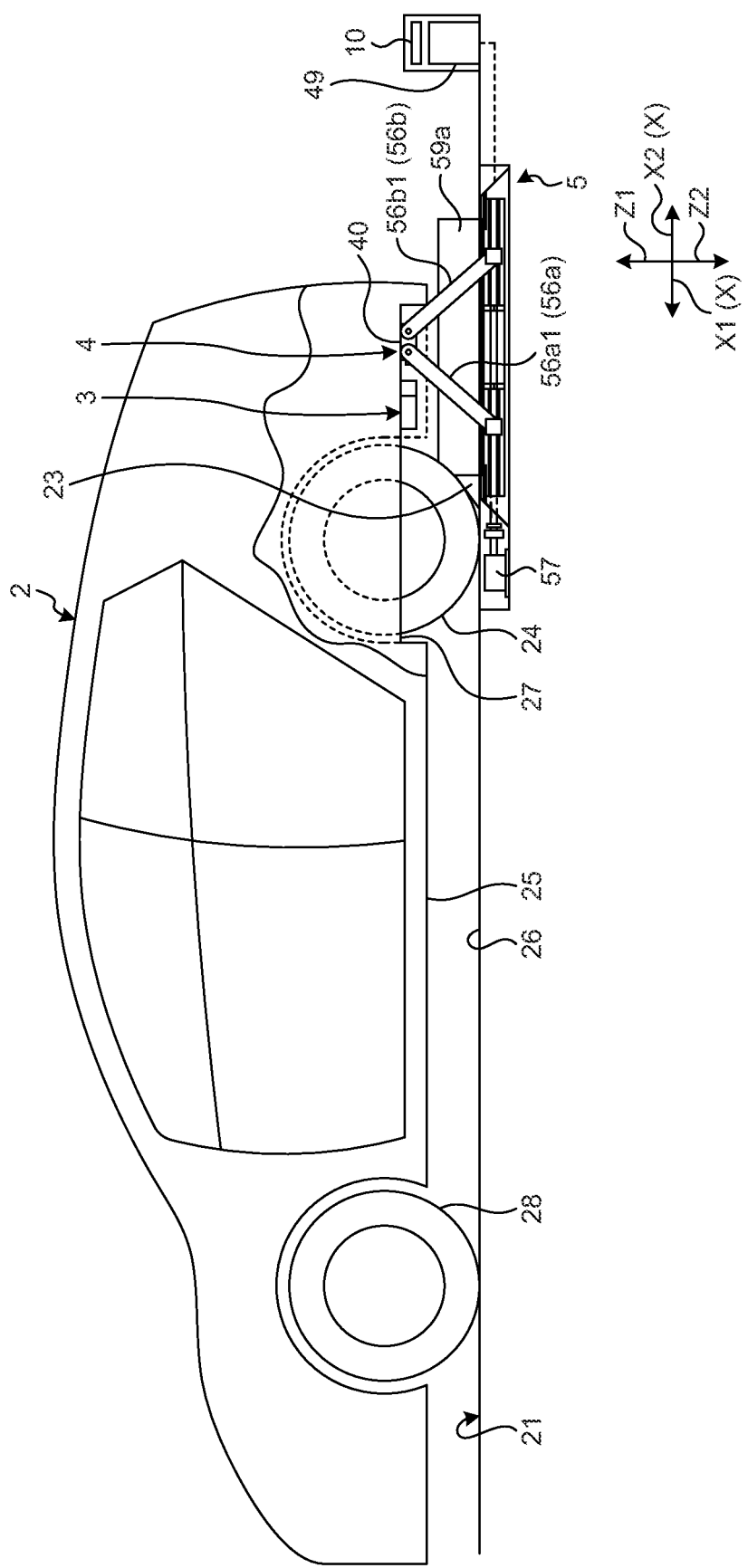
FIG. 10 is a side view illustrating a state in which the arms of the lift part are raised and the power supply fitting body is entered into an opposite space.
Figure 11:
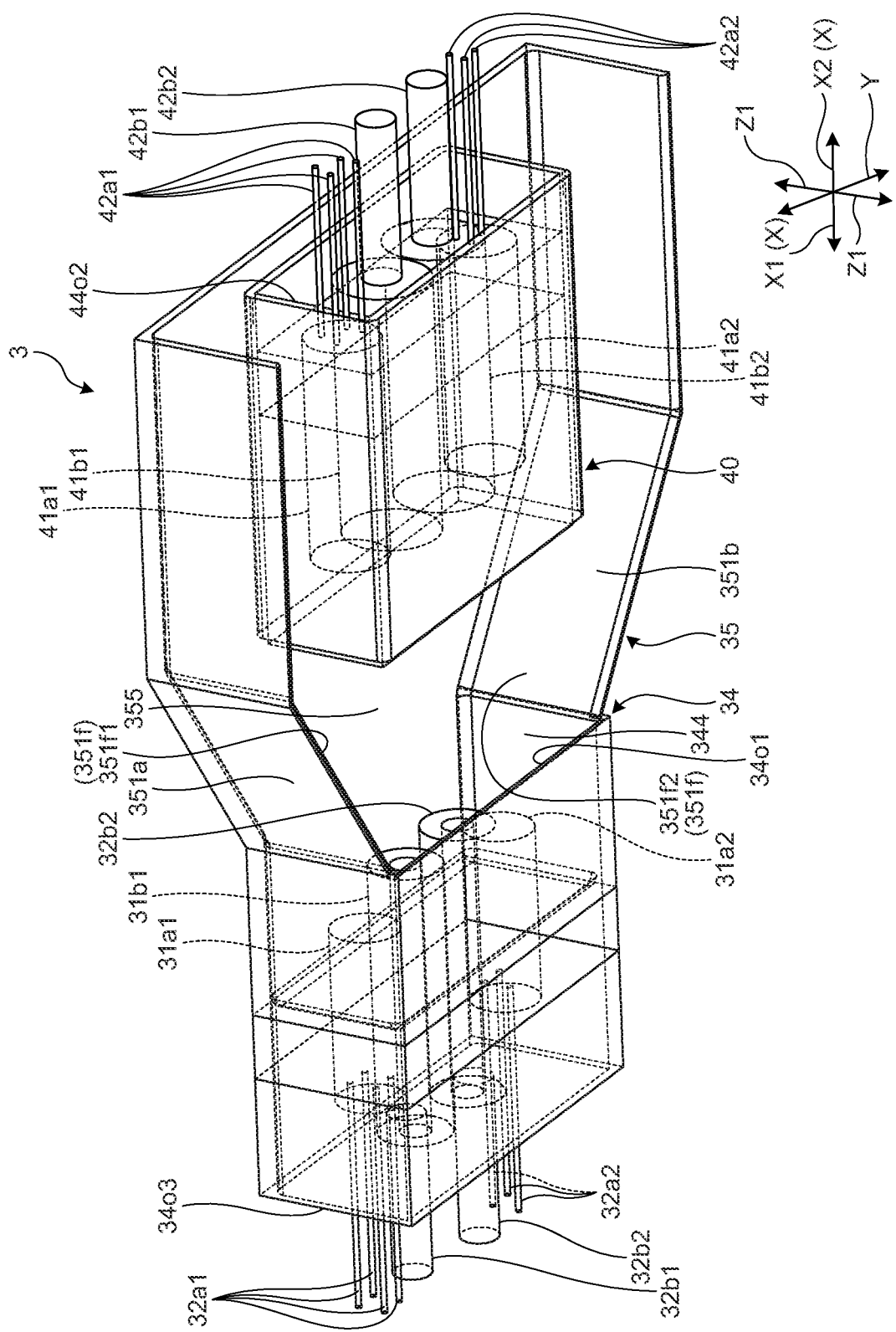
FIG. 11 is a perspective view illustrating a state in which the power supply fitting body is entered into the opposite space.
Figure 12:
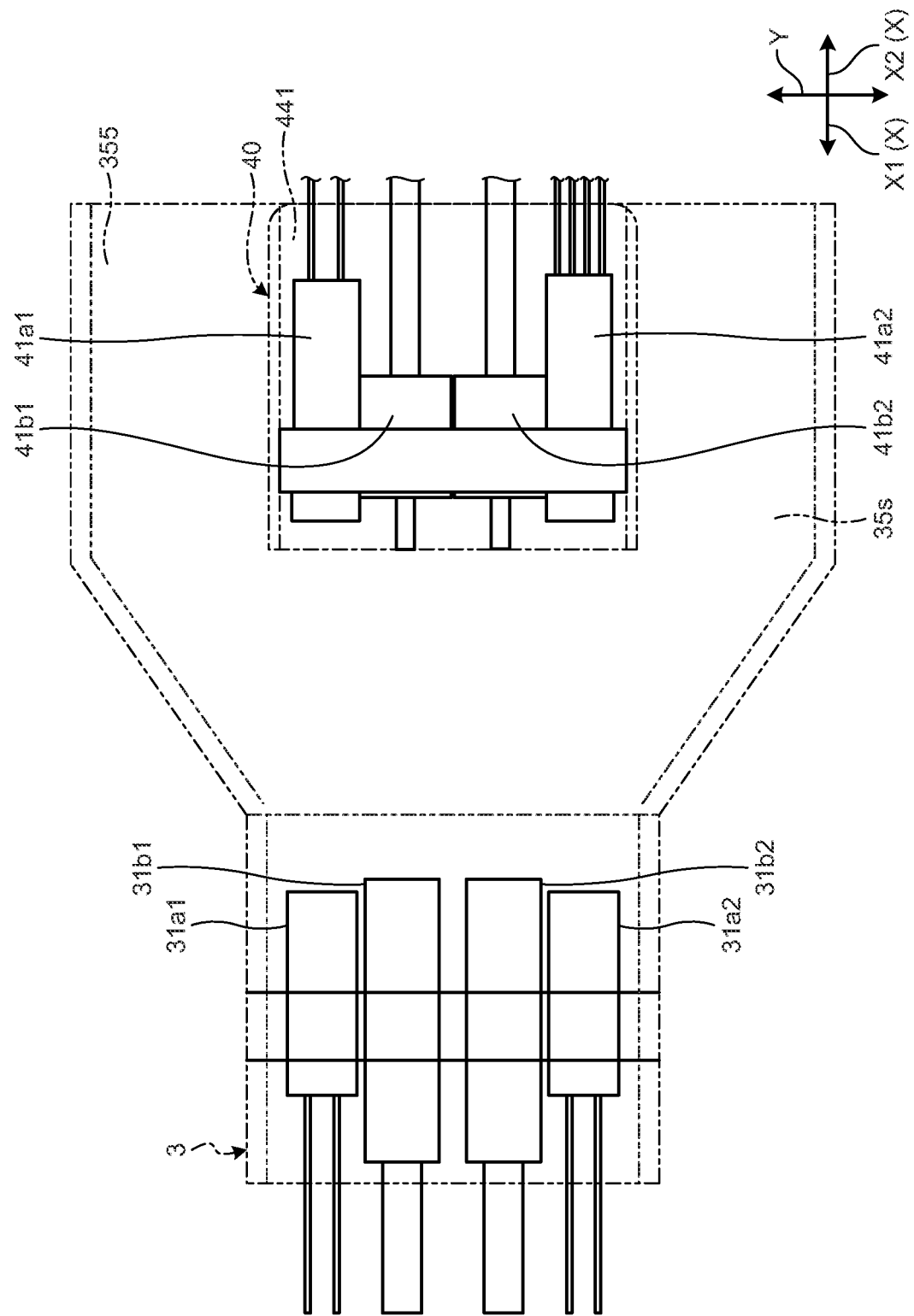
FIG. 12 is a plan view illustrating a state in which the power supply fitting body is entered into the opposite space.
Figure 13:
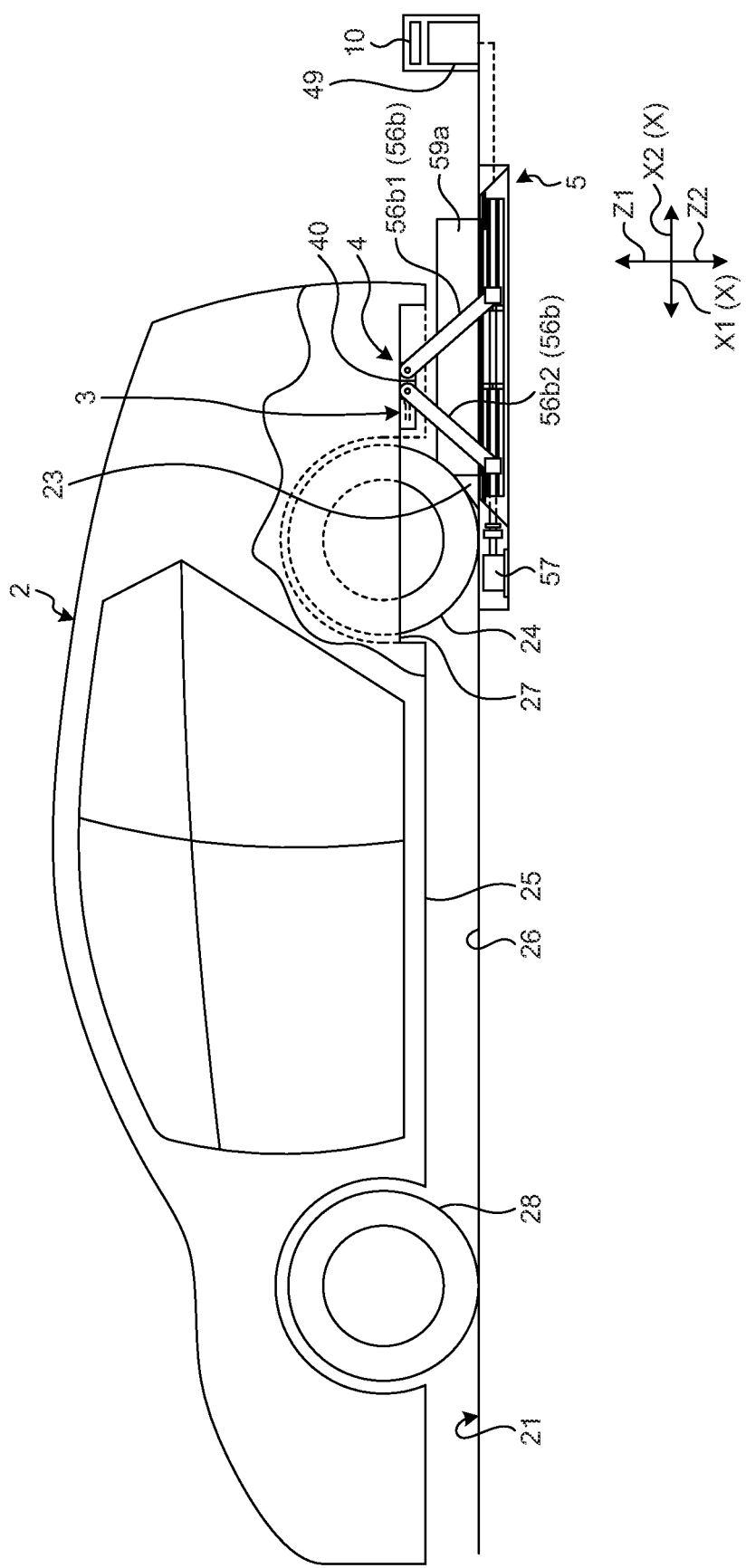
FIG. 13 is a side view illustrating a state in which the power supply fitting body and the power receiving fitting body are fitted.
Figure 14:
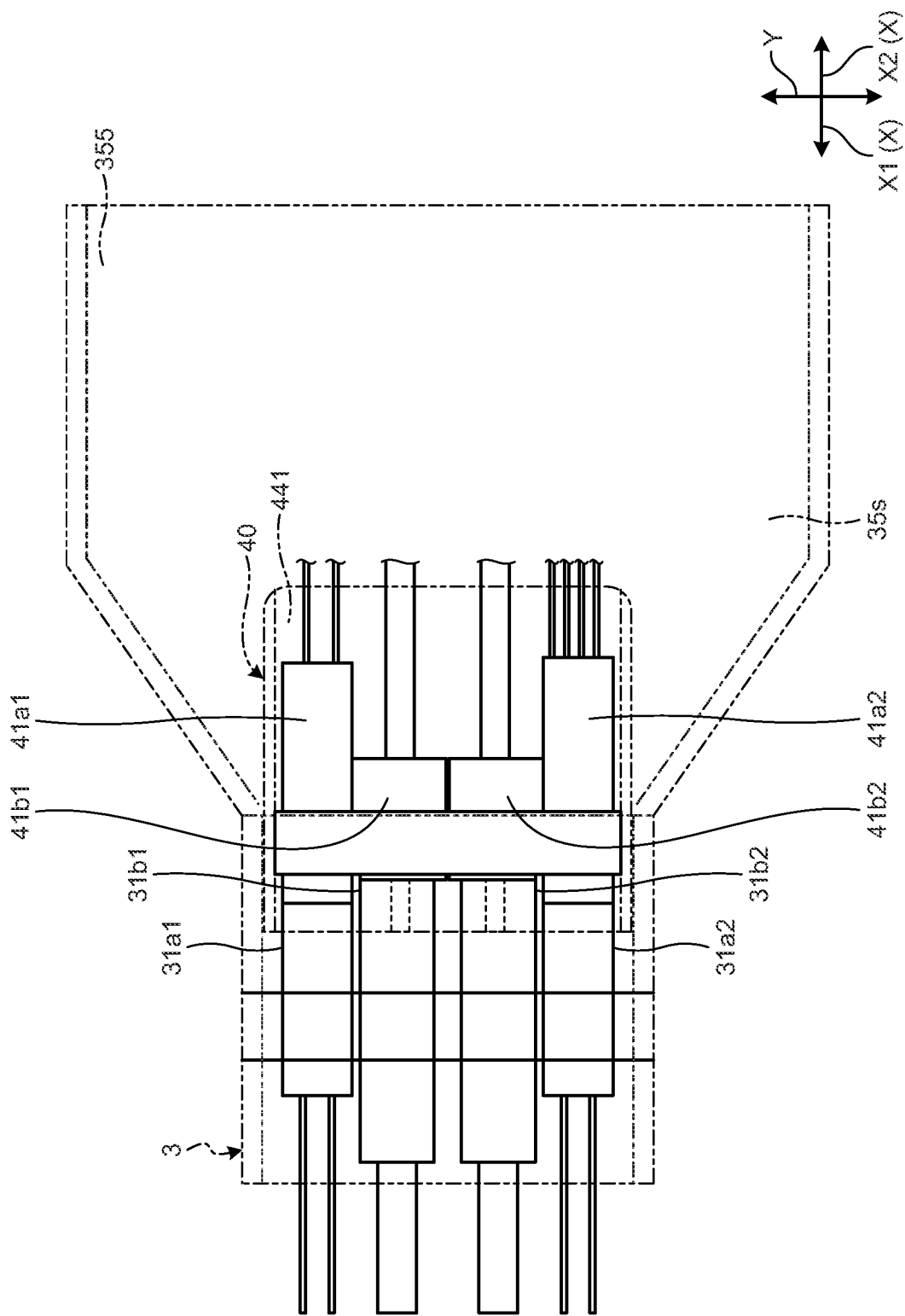
FIG. 14 is a plan view illustrating a state in which the power supply fitting body and the power receiving fitting body are fitted.
Figure 15:
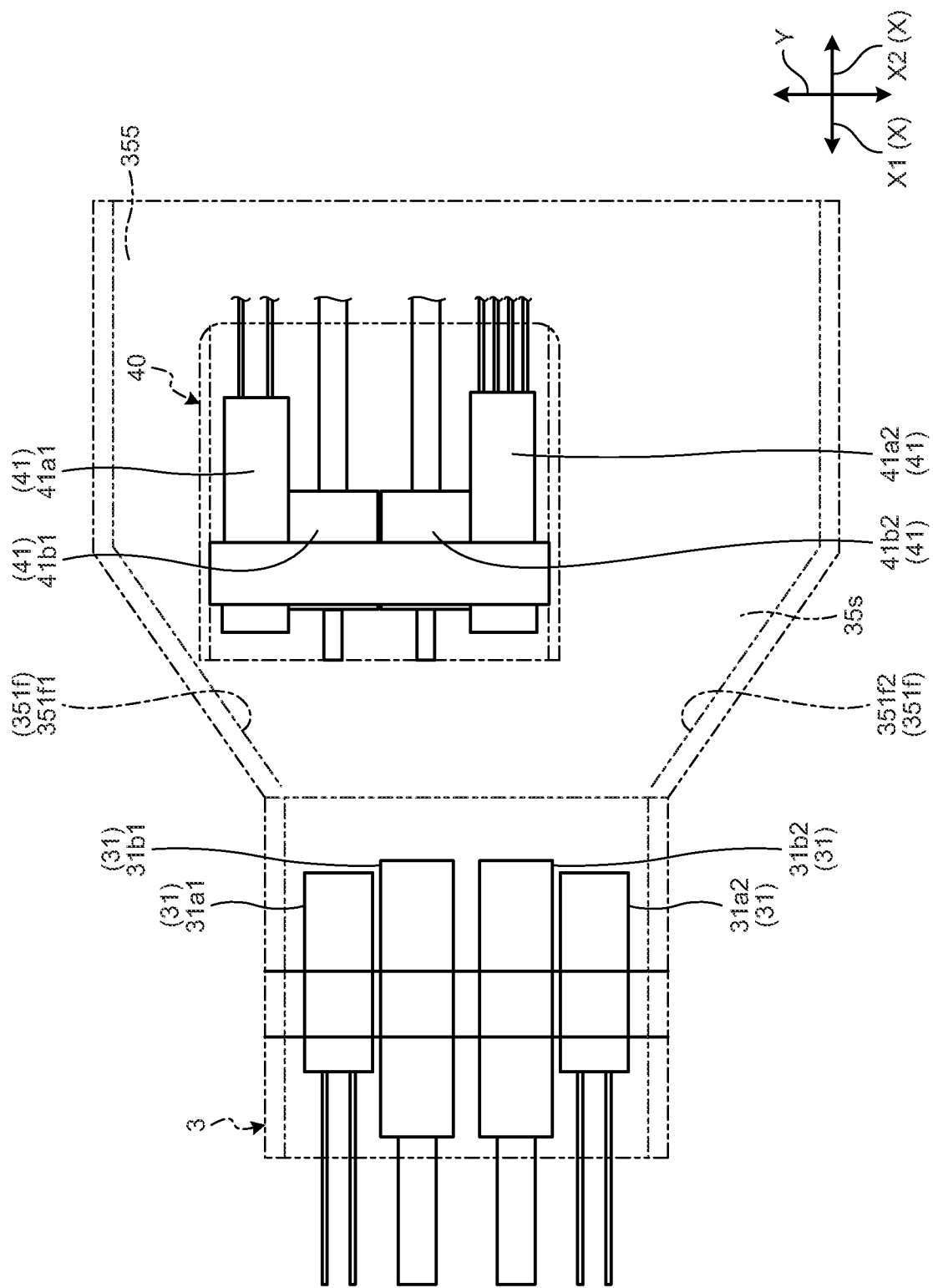
FIG. 15 is a plan view illustrating a state in which the positions of power supply terminals in a width direction are shifted with respect to the positions of power receiving terminals in the width direction.

FIG. 1 is a sectional view of the vehicle charging system 1 according to a first embodiment of the present embodiment. FIG. 2 is a plan view of the vehicle charging system 1 according to the first embodiment of the present embodiment. FIG. 3 is a perspective view of a power receiving fitting body 3 according to the first embodiment of the present embodiment. FIG. 4 is a perspective view of a power supply fitting body 40 according to the first embodiment of the present embodiment. FIG. 5 is a plan view of the power supply fitting body 40. FIG. 6 is a plan view of a lift part 5 included in a power supply device 4 according to the first embodiment of the present embodiment. FIG. 7 is a side view of the lift part 5. FIG. 8 is a perspective view illustrating a state in which arms 56$a$1, 56$a$2, 56$b$1, and 56$b$2 of the lift part 5 included in the power supply device 4 according so the first embodiment of the present embodiment are raised. FIG. 9 is a perspective view illustrating a state in which the arms 56$a$1, 56$a$2, 56$b$1, and 56$b$2 of the lift part 5 are raised. FIG. 10 is a side view illustrating a state in which the arms 56$a$1, 56$a$2, 56$b$1, and 56$b$2 of the lift part 5 are raised and the power supply fitting body 40 is entered into an opposite space 35$s$. FIG. 11 is a perspective view illustrating a state in which the power supply fitting body 40 is entered into the opposite space 35$s$. FIG. 12 is a plan view illustrating a state in which the power supply fitting body 40 is entered into the opposite space 35$s$. FIG. 13 is a side view illustrating a state in which the power supply fitting body 40 and the power receiving fitting body 3 are fitted. FIG. 14 is a plan view illustrating a state in which the power supply fitting body 40 and the power receiving fitting body 3 are fitted. FIG. 15 is a plan view illustrating a state in which the positions of corresponding power supply terminals 41 in a width direction Y are shifted with respect to the positions of power receiving terminals 31 in the width direction Y.

In FIG. 1 to FIG. 44, X denotes an insertion/removal direction, which is a lateral direction of the vehicle charging system 1, X1 denotes a fitting direction that is one direction in the insertion/removal direction X, which is the lateral direction, and X2 denotes a removal direction that is the other direction in the insertion/removal direction X, which is the lateral direction. That is, the removal direction X2 is a direction opposite to the fitting direction X1 in the insertion/removal direction X. Z denotes a vertical direction of the vehicle charging system 1, Z1 denotes an upward direction, which is one direction in the vertical direction Z, and Z2 denotes a downward direction, which is the other direction in the vertical direction Z. That is, the downward direction Z2 is a direction opposite to the upward direction Z1 in the vertical direction Z. Y is a width direction that is a direction different from the insertion/removal direction X in the vehicle charging system 1 and the vertical direction Z of a vehicle 2. In the vehicle charging system 1 according to the present embodiment, the insertion/removal direction X, the width direction Y, and the vertical direction Z are orthogonal to one another. Furthermore, in the vehicle charging system 1 according to the first embodiment, as illustrated in FIG. 2, the insertion/removal direction X of the vehicle charging system coincides with a front-back direction FB of a stopped vehicle 2, and the width direction Y of the vehicle charging system 1 coincides with a vehicle width direction S of the stopped vehicle 2.

First Embodiment

The vehicle charging system 1 illustrated in FIG. 1 and FIG. 2 according to the present embodiment includes the power receiving fitting body (power receiving device) 3 and the power supply device 4. The power supply device 4 has the power supply fitting body 40, and is buried in a stop space 21 of the vehicle 2, for example.

The vehicle 2 drives an electric motor (motor) by using power supplied from a battery 22 that is a rechargeable/dischargeable storage battery, thereby traveling with the electric motor as a part or the whole of a driving source. The vehicle 2 is, for example, an electric vehicle, a hybrid vehicle, a plug-in hybrid vehicle, and the like. The vehicle 2 is parked in a state in which rear wheels 24 are in contact with a car stop 23 of the stop space 21 provided with the power supply device 4. The battery 22 is electrically connected to a charging device 49 connected to the power supply device 4 in a state in which the power supply fitting body 40 and the power receiving fitting body 3 has been fitted, and is charged by power supplied from the charging device 49. The vehicle 2 has what is called the lowest ground height H between a bottom 25 of the vehicle 2 and a ground surface 26 in the vertical direction Z of the vehicle 2. The bottom 25 is the lowest portion of the vehicle 2 in the vertical direction Z between the rear wheels 24 and front wheels 28 of the vehicle 2. The lowest ground height H is set to 9 cm or more in the road transport vehicle safety standards. The vehicle 2 of the present embodiment is, for example, an autonomous vehicle that travels and stops without requiring any driving operation by a passenger.

The power receiving fitting body 3 is what is called an inlet, is provided on the bottom 25 of the vehicle 2, and can be fitted to and removed from the power supply fitting body 40. The power receiving fitting body 3 of the present embodiment is provided, for example, at the center portion of the vehicle 2 in the width direction Y, and is arranged in a concave portion 27 extending in the front-back direction with respect to a vehicle body. More specifically, the whole of the power receiving fitting body 3 is arranged inside the concave portion 27. As illustrated in FIG. 3, the power receiving fitting body 3 has power receiving terminals 31, power receiving signal terminals 31a, a power receiving terminal holding part 34, and an opposite space forming part 35.

The power receiving terminal 31 is formed a columnar shape by a conductive metal, extends in the insertion/removal direction X, and is arranged along the insertion/removal direction X. The thickness of the power receiving terminal 31 in a radial direction is thicker than that in the radial direction of the power receiving signal terminal 31a. The power receiving terminal 31 has, for example, a first power receiving terminal 31b1 and a second power receiving terminal 31b2. That is, the power receiving fitting body 3 of the present embodiment has two power receiving terminals 31. Each power receiving terminal 31 is electrically connected to a terminal of a power receiving wire 32. The power receiving wire 32 has a first power receiving wire 32b1 and a second power receiving wire 32b2. The first power receiving terminal 31b1 is electrically connected to a terminal of the first power receiving wire 32b1. The second power receiving terminal 31b2 is electrically connected to a terminal of the second power receiving wire 32b2.

The power receiving terminals 31 and the power receiving wires 32 are provided in the middle of power supply lines that supply power from the charging device 49 to the battery 22.

The first bower receiving terminal 31b1 is formed at the tip end thereof with an engaging concave portion 31b11. The engaging concave portion 31b11 extends from the tip end of the first power receiving terminal 31b1 in the fitting direction X1. The second power receiving terminal 31b2 is formed at the tip end thereof with an engaging concave portion 31b21. The engaging concave portion 31b21 extends from the tip end of the second power receiving terminal 31b2 in the fitting direction X1.

The power receiving signal terminal 31a is formed of a conductive metal in a columnar shape, extends along the insertion/removal direction X, and is arranged along the insertion/removal direction X. The power receiving signal terminal 31a has, for example, a first power receiving signal terminal 31a1 and a second power receiving signal terminal 31a2. That is, the power receiving fitting body 3 of the present embodiment has two power receiving signal terminals 31a. Each power receiving signal terminal 31a is electrically connected no a terminal of a power receiving signal wire 32a. The power receiving signal wire 32a has a first power receiving signal wire 32a1 and a second power receiving signal wire 32a2. The first power receiving signal terminal 31a1 is electrically connected to a terminal of the first power receiving signal wire 32a1. The second power receiving signal terminal 31a2 is electrically connected to a terminal of the second power receiving signal wire 32a2.

The power receiving signal terminals 31a and the power receiving signal wires 32a are provided in the middle of signal lines that transmit/receive signals between the charging device 49 and the battery 22. The signals relate to, for example, the state of the battery 22 such as a filling rate of the battery 22.

In the power receiving fitting body 3, a plurality of (two) power receiving terminals 31 are arranged side by side in the width direction Y. Furthermore, in the power receiving fitting body 3, in addition to the two power receiving terminals 31, a plurality of (two) power receiving signal terminals 31a are arranged side by side in the width direction Y on both sides of the power receiving terminals 31 in the width direction Y. That is, in the power receiving fitting body 3 of the present embodiment, the two power receiving terminals 31 are arranged side by side adjacent to each other in the width direction Y, and the two power receiving signal terminals 31a are arranged side by side adjacent to both sides of the power receiving terminals 31 in the width direction Y.

The power receiving terminal holding part 34 is formed of an insulating synthetic resin. The power receiving terminal holding part 34 accommodates the power receiving terminals 31 and holds the power receiving terminals 31. The power receiving terminal holding part 34 has a pair of power receiving ceiling portion 341 and power receiving bottom portion 342 facing each other in the vertical direction Z, a pair of power receiving side portions 343 and 344 facing each other in the width direction Y, and an internal space 34s, and is formed in a square tube shape. The power receiving terminal holding part 34 has a holding portion opening 31o1, which connects the internal space 34s of the power receiving terminal holding part 34 and an opposite space 35s to be described below, at an end of the power receiving terminal 31 on the removal direction X2 side. Furthermore, the power receiving terminal holding part 34 has a third opening 34o3, which connects the internal space 34s of the power receiving terminal holding part 34 and an exterior, at an end of the power receiving terminal 31 on the fitting direction X1 side.

The opposite space forming part 35 is formed of an insulating synthetic resin. In the power receiving fitting body 3 of the present embodiment, the power receiving terminal holding part 34 and the opposite space forming part 35 are integrally formed with each other. The opposite space forming part 35 is arranged adjacent to the power receiving terminal holding part 34 in the insertion/removal direction X, and forms the opposite space 35s facing the power receiving terminals 31. The opposite space forming part 35 has a pair of first opposite wall portions 351a and 351b facing each other in the width direction Y, a pair of second opposite wall portions 353a and 353b facing each other in the width direction Y, and a ceiling wall portion 355 that connects upper ends of the pair of first opposite wall portions 351a and 351b and connects upper ends of the pair of second opposite wall portions 353a and 353b. Furthermore, the opposite space forming part 35 forms the opposite space 35s on the removal direction X2 side of the power receiving terminal 31 by the pair of first opposite wall portions 351a and 351b, the pair of second opposite wall portions 353a and 353b, and the ceiling wall portion 355. Furthermore, the opposite space forming part 35 has a forming portion opening 35o2, which connects the opposite space 35s and an exterior in the downward direction Z2, by ends of the pair of first opposite wall portions 351a and 351b in the downward direction Z2 and ends of the pair of second opposite wall portions 353a and 353b in the downward direction Z2.

The pair of first opposite wall portions 351a and 351b are inclined in the insertion/removal direction X and the width direction Y, and a distance between the ends of the pair of first opposite wall portions 351a and 351b on the fitting direction X1 side in the insertion/removal direction X is shorter than that between the ends of the pair of first opposite wall portions 351a and 351b on the removal direction X2 side in the insertion/removal direction X.

Guide surfaces 351f are arranged on she opposite space 35s (inner surface) side of the pair of first opposite wall portions 351a and 351b. The opposite space forming part 35 of the present embodiment has the guide surfaces 351f that are arranged on the power receiving fitting body 3 side in the insertion/removal direction X and face the power supply fitting body 40 in the insertion/removal direction X in an opposite state to be described below. The guide surfaces 351f are arranged in a pair with the power receiving terminal holding part 34 interposed therebetween. A distance between a pair of guide surfaces 351f1 and 351f2 in the width direction Y becomes shorter toward the power receiving fitting body 3 in the insertion/removal direction X.

The pair of second opposite wall portions 353a and 353b are arranged in parallel in de width direction Y. In the vehicle charging system 1 of the present embodiment, when the vehicle 2 traveling by automatic driving is stopped, the power supply fitting body 40 is caused to advance and retract with the opposite space 35s, which is located between the pair of second opposite wall portions 353a and 353b in the width direction Y, serving as a target. Furthermore, when the vehicle 2 traveling by automatic driving is stopped, even though the position of the vehicle 2 stopped in the stop space 21 is shifted, the power supply fitting body 40 is caused to advance and retract with respect to the opposite space 35s between the pair of first opposite wall portions 351a and 351b in the width direction Y and between the pair of second opposite wall portions 353a and 353b in the width direction Y.

As illustrated in FIG. 1 and FIG. 2, the power supply device 4 is provided in the stop space 21 of the vehicle 2. The power supply device 4 has the power supply fitting body 40, the charging device 49, and the lift part 5. The power supply fitting body 40 and the lift part 5 are buried in the ground of the stop space 21, for example. The charging device 49 is provided on the ground of the stop space 21, for example.

The power supply fitting body 40 is what is called a coupler, and can be fitted to the power receiving fitting body 3 by being inserted into the internal space 34s of the power receiving fitting body 3 as illustrated in FIG. 14. Furthermore, the power supply fitting body 40 can be removed from the power receiving fitting body 3 by moving in the removal direction X2 from such a state as illustrated in FIG. 12. As illustrated in FIG. 4 and FIG. 5, the power supply fitting body 40 has the power supply terminals 41 and a power supply terminal holding part 43.

The power supply terminal 41 is formed in a columnar shape by a conductive metal, extends along the insertion/removal direction X, and is arranged along the insertion/removal direction X. The thickness of the power supply terminal 41 in the radial direction is thicker than that in the radial direction of a power supply signal terminal 41a. The power supply terminal 41 has, for example, a first power supply terminal 41b1 and a second power supply terminal 41b2. That the power supply fitting body 40 of the present embodiment has two power supply terminals 41. Each power supply terminal 41 is electrically connected to a terminal of a power supply wire 42. The power supply wire 42 has a first power supply wire 42b1 and a second power supply wire 42b2. The first power supply terminal 41b1 is electrically connected to a terminal of the first power supply wire 42b1. The second power supply terminal 41b2 is electrically connected to a terminal of the second power supply wire 42b2.

The power supply terminals 41 and the power supply wires 42 are provided in the middle of the power supply lines that supply power from the charging device 49 to the battery 22. The power supply lines are configured by the power receiving terminals 31, the power receiving wires 32, the power supply terminals 41, and the power supply wires 42.

The first power supply terminal 41b1 is formed at the tip end thereof with an engaging convex portion 41b11. The engaging convex portion 41b11 protrudes from the tip end of the first power supply terminal 41b1 toward the fitting direction X1, extends in the fitting direction X1, and can engage with the engaging concave portion 31b11. The second power supply terminal 41b2 is formed at the tip end thereof with an engaging convex portion 41b21. The engaging convex portion 41b21 protrudes from the tip end of the second power supply terminal 41b2 toward the fitting direction X1, extends in the fitting direction X1, and can engage with the engaging concave portion 31b21.

The power supply signal terminal 41a is formed of a conductive metal in a columnar shape, extends along the insertion/removal direction X, and is arranged along the insertion/removal direction X. The power supply signal terminal 41a has, for example, a first power supply signal terminal 41a1 and a second power supply signal terminal 41a2. That is, the power supply fitting body 40 of the present embodiment has two power supply signal terminals 41a. Each power supply signal terminal 41a is electrically connected to a terminal of a power supply signal wire 42a. The power supply signal wire 42a has a first power supply signal wire 42a1 and a second power supply signal wire 42a2. The first power supply signal terminal 41a1 is electrically connected to a terminal of the first power supply signal wire 42a1. The second power supply signal terminal 41a2 is electrically connected to a terminal of the second power supply signal wire 42a2.

The power supply signal terminals 41a and the power supply signal wires 42a are provided in the middle of the signal lines that transmit/receive signals between the charging device 49 and the battery 22. The signal lines are configured by the power receiving signal terminals 31a, the power receiving signal wires 32a, the power supply signal terminals 41a, and the power supply signal wires 42a.

In the power supply fitting body 40, a plurality of (two) power supply terminals 41 are arranged side by side in the width direction Y. Furthermore, in the power supply fitting body 40, in addition to the two power supply terminals 41, a plurality of (two) power supply signal terminals 41a are arranged side by side in the width direction Y on both sides of the power supply terminals 41 in the width direction Y. That is, in the power supply fitting body 40 of the present embodiment, the two power supply terminals 41 are arranged side by side adjacent to each other in the width direction Y, and the two power supply signal terminals 41a are arranged side by side adjacent to both sides of the power supply terminals 41 in the width direction Y.

The power supply terminal holding part 43 is formed of an insulating synthetic resin, and accommodates and holds the power supply terminals 41. The power supply terminal holding part 43 has a pair of power supply ceiling portion 441 and power supply bottom portion 442 facing each other in the vertical direction Z, a pair of power supply side portions 443 and 444 facing each other in the width direction Y, and a power supply internal space 44s, and is formed in a square tube shape. The power supply terminal holding part 43 has a power supply first opening 44o1, which connects the power supply internal space 44s of the holding part and an exterior, at an end of the power supply terminal 41 on the removal direction X2 side. Furthermore, the power supply terminal holding part 43 has a power supply second opening 44o2, which connects the power supply internal space 44s of the power supply terminal holding part 43 and an exterior, at an end of the power supply terminal 41 on the fitting direction X1 side.

The power supply terminal holding part 43 of the present embodiment is attached to tip ends of a pair of first arms 56a1 and 56a2 and a pair of second arms 56b1 and 56b2 of a link mechanism 56, which will be described below, in the lift part 5 (see FIG. 9).

The charging device 49 illustrated in FIG. 1 is electrically connected to each power supply terminal 41 via each power supply wire 42. The charging device 49 is connected to an external power supply, converts AC power supplied from the external power supply into a direct current, and supplies power to the battery 22 via the power supply wires 42, the power supply terminals 41, the power receiving terminals 31, and the power receiving wires 32, thereby charging the battery 22.

The lift part 5 illustrated in FIG. 1 moves the power supply fitting body 40 in the vertical direction Z of the vehicle 2 and moves the power supply fitting body 40 in the insertion/removal direction X as will be described below. That is, in the vehicle charging system 1 of the present embodiment, the lift part 5 is an insertion/removal direction movement part that moves the power supply fitting body 40 in the insertion/removal direction X, and is a vertical movement part that causes the power supply fitting body 40 to advance and retract with respect to the opposite space 35s by moving the power supply fitting body 40 in the vertical direction Z of the vehicle 2. Furthermore, although not illustrated, the lift part 5 according to the present embodiment can swing the power supply fitting body 40 with respect to an orthogonal axis orthogonal to a plane including the insertion/removal direction X and the width direction Y (in other words, an orthogonal axis extending in the vertical direction Z). Moreover, although not illustrated, the lift part 5 according to the present embodiment can move the power supply fitting body 40 in the width direction Y by coming into contact with the power receiving fitting body 3. Furthermore, although not illustrated, the lift part 5 according to the present embodiment can rotate the power supply fitting body 40 clockwise and counterclockwise around a shaft center extending in the insertion/removal direction X by coming into contact with the power receiving fitting body 3.

As illustrated in FIG. 6 and FIG. 7, the lift part 5 has a lift housing 50, a pair of screw shafts 51a and 51b, a pair of first bearings 52a and 52b, a pair of sliders 53a and 53b, a pair of slider guide portions 54a and 54b, a pair of second bearings 55a and 55b, the link mechanism 56, a driving source 57, a driving transfer portion 58, and a pair of lift door portions 59a and 59b. As will be described below, by driving and reversely driving the driving source 57, the lift part 5 can move the power supply fitting body 40 in the upward direction Z1 and the downward direction Z2 and move the power supply fitting body 40 in the fitting direction X1 and the removal direction X2.

The lift housing 50 is buried in the ground and accommodates the pair of screw shafts 51a and 51b, the pair of first bearings 52a and 52b, the pair of sliders 53a and 53b, the pair of slider guide portions 54a and 54b, the pair of second bearings 55a and 55b, and the link mechanism 56.

Each of the screw shafts 51a and 51b is formed in a columnar shape and extends in the removal direction X2. Furthermore, the pair of screw shafts 51a and 51b are arranged in parallel to the fitting direction X1 and the removal direction X2. The peripheral surfaces of each of the screw shafts 51a and 51b are threaded in a spiral form. The peripheral surfaces of each of the screw shafts 51a and 51b of the present embodiment are threaded from an end thereof in the fitting direction X1 to an end thereof in the removal direction X2, for example, in either a clockwise direction or a counterclockwise direction. That is, in the lift part 5 of the present embodiment, the directions of the threads provided on the pair of screw shafts 51a and 51b are the same.

The pair of first bearings 52a and 52b are arranged facing each other in the fitting direction X1. Between the pair of first bearings 52a and 52b, the one first bearing 52a is arranged at the end of each of the screw shafts 51a and 51b in the fitting direction X1. Between the pair of first bearings, the other first bearing 52b is arranged at the end of each of the screw shafts 51a and 51b in the removal direction X2. The pair of first bearings 52a and 52b support the screw shafts 51a and 51b while permitting the clockwise rotation of each of the screw shafts 51a and 51b and the counterclockwise rotation of each of the screw shafts 51a and 51b.

The pair of slider guide portions 54a and 54b are arranged facing each other in the removal direction X2. Each of the slider guide portions 54a and 54b is formed in a columnar shape and extends in the removal direction X2.

The pair of second bearings 55a and 55b are arranged facing each other in the fitting direction X1. Between the pair of second bearings 55a and 55b, the one second bearing 55a is arranged at the end of the one slider guide portion 54a arranged on the fitting direction X1 side. Furthermore, the one slider guide portion 54a is supported by the one first bearing 52a located on the fitting direction X1 side and the one second bearing 55a located on the removal direction X2 side.

Between the pair of second bearings 55a and 55b, the other second bearing 55b is arranged an the end of the other slider guide portion 54b arranged on the removal direction X2 side. Furthermore, the other slider guide portion 54b is supported by the other first bearing 52b located on the removal direction X2 side and the other second bearing 55b located on the fitting direction X1 side.

The pair of sliders 53a and 53b are formed, for example, in a substantially rectangular parallelepiped shape, respectively. The pair of sliders 53a and 53b each have one screw hole and two through holes. More specifically, the one slider 53a located on the fitting direction X1 side has a first slider screw hole 531 that penetrates the one slider 53a in the insertion/removal direction X, and a first slider through hole 532 and a second slider through hole 533 that penetrate the one slider 53a in the insertion/removal direction X. The other slider 53b located on the removal direction X2 side has a second slider screw hole 534 that penetrates the other slider 53b in the insertion/removal direction X, and a third slider through hole 535 and a fourth slider through hole 536 that penetrate the other slider 53b in the insertion/removal direction X.

Furthermore, in the pair of sliders 53a and 53b, the direction of the screw of the first slider screw hole 531 in the one slider 53a is opposite to that of the screw of the second slider screw hole 534 in the other slider 53b. Furthermore, with respect to the pair of screw shafts 51a and 51b, the first slider screw hole 531 is screwed with the screw of the other screw shaft 51b and the second slider screw hole 534 is screwed with the screw of the one screw shaft 51a. More specifically, the other screw shaft 51b is inserted into the first slider screw hole 531, and the screw provided on the inner peripheral surface of the first slider screw hole 531 is screwed with the screw provided on the outer peripheral surface of the other screw shaft 51b. Furthermore, the one screw shaft 51a is inserted into the second slider screw hole 534, and the screw provided on the inner peripheral surface of the second slider screw hole 534 is screwed with the screw provided on the outer peripheral surface of the one screw shaft 51a.

The driving source 57 is, for example, a motor, and the driving transfer portion 58 is composed of parts such as a gear and a chain, for example, and transfers the driving force of the driving source 57 to each of the screw shafts 51a and 51b. Then, when the driving force of the driving source 57 is transferred to each of the screw shafts 51a and 51b, each of the screw shafts 51a and 51b rotates around the shaft center of each of the screw shafts 51a and 51b. Furthermore, the driving transfer portion 58 of the lift part 5 of the present embodiment has a first driving transfer portion 58a that transfers the driving force of the driving source 57, and a second driving transfer portion 58b. When the driving of the driving source 57 is transferred to each of the screw shafts 51a and 51b via the first driving transfer portion 58a, for example, the lift part 5 of the present embodiment rotates the one screw shaft 51a in the clockwise direction (direction indicated by arrow R2 in FIG. 9) around its own shaft center, and rotates the other screw shaft 51b in the clockwise direction (direction indicated by the arrow R3 in FIG. 9) around its own shaft center. Furthermore, when the reverse driving of the driving source 57 is transferred to each of the screw shafts 51a and 51b via the first driving transfer portion 58a, for example, the lift part 5 rotates the one screw shaft 51a in the counterclockwise direction (direction indicated by arrow R4 in FIG. 9) around its own shaft center, and rotates the other screw shaft 51b in the counterclockwise direction (direction indicated by arrow R1 in FIG. 9) around its own shaft center. That is, when the driving of the driving source 57 is transferred to each of the screw shafts 51a and 51b via the first driving transfer portion 58a, for example, the lift part 5 rotates the pair of screw shafts 51a and 51b in the same direction around the shaft centers of the pair of screw shafts 51a and 51b.

On the other hand, when the driving of the driving source 57 is transferred to each of the screw shafts 51a and 51b via the second driving transfer portion 58b, for example, the lift part 5 rotates the one screw shaft 51a in the clockwise direction (direction indicated by the arrow R2 in FIG. 9) around its own shaft center, and rotates the other screw shaft 51b in the counterclockwise direction (direction indicated by the arrow R1 in FIG. 9) around its own shaft center. Furthermore, when the reverse driving of the driving source 57 is transferred to each of the screw shafts 51a and 51b via the second driving transfer portion 58b, for example, the lift part 5 rotates the one screw shaft 51a in the counterclockwise direction (direction indicated by arrow R4 in FIG. 9) around its own shaft center, and rotates the other screw shaft 51b in the clockwise direction (direction indicated by arrow R3 in FIG. 9) around its own shaft center. That is, when the driving of the driving source 57 is transferred to each of the screw shafts 51a and 51b via the second driving transfer portion 58b, the lift part 5 rotates the pair of screw shafts 51a and 51b in the opposite direction around the shaft centers of the pair of screw shafts 51a and 51b.

When the driving source 57 is driven and the driving of the driving source 57 is transferred to the pair of the screw shafts 51a and 51b via the first driving transfer portion 58a, the lift part 5 operates as follows. In the pair of sliders 53a and 53b, the direction of the first slider screw hole 531 in the one slider 53a is opposite to the direction of the second slider screw hole 534 in the other slider 53b. Therefore, in the insertion/removal direction X, the one slider 53a comes into close proximity to the other slider 53b.

On the other hand, when the reverse driving of the driving source 57 is transferred to the pair of the screw shafts 51a and 51b via the first driving transfer portion 58a, the lift part 5 operates as follows. In the pair of sliders 53a and 53b, the direction of the first slider screw hole 531 in the one slider 53a is opposite to the direction of the second slider screw hole 534 in the other slider 53b. Therefore, in the insertion/removal direction X, the one slider 53a is separated from the other slider 53b.

On the other hand, when the driving source 57 is driven and the driving of the driving source 57 is transferred to the pair of the screw shafts 51a and 51b via the second driving transfer portion 58b, the first slider screw hole 531 screwed with the screw of the other screw shaft 51b while the second slider screw hole 534 is screwed with the screw of the one screw shaft 51a, with respect to the pair of screw shafts 51a and 51b, and the rotation direction around the shaft center of the other screw shaft 51b is opposite to that around the shaft center of the one screw shaft 51a. Therefore, when the driving of the driving source 57 is transferred to the pair of the screw shafts 51a and 51b via the second driving transfer portion 58b, the pair of sliders 53a and 53b move to one side in the insertion/removal direction X while maintaining a distance therebetween in the insertion/removal direction X.

In addition, the driving source 57 is reversely driven and the reverse driving of the driving source 57 is transferred to the pair of the screw shafts 51a and 51b via the second driving transfer portion 58b. With respect to the pair of screw shafts 51a and 51b, the first slider screw hole 531 is screwed with the screw of the other screw shaft 51b while the second slider screw hole 534 is screwed with the screw of the one screw shaft 51a, and the rotation direction around the shaft center of the other screw shaft 51b is opposite to that around the shaft center of the one screw shaft 51a. Thus, when the reverse driving of the driving source 57 is transferred to the pair of the screw shafts 51a and 51b via the second driving transfer portion 58b, the pair of sliders 53a and 53b move to the other side in the insertion/removal direction X while maintaining a distance therebetween in the insertion/removal direction X.

The pair of slider guide portions 54a and 54b face each other in the insertion/removal direction X. Each of the slider guide portions 54a and 54b is formed in the rod shape of a cylinder extending in the insertion/removal direction X.

Between the pair of slider guide portions 54a and 54b, the one slider guide portion 54a located on the fitting direction X1 side in the insertion/removal direction X has an end on the fitting direction X1 side fixed to the one first bearing 52*a*, and an end on the removal direction X2 side fixed to the one second bearing 55*a*. In addition, the one slider guide portion 54*a* is inserted into the second slider through hole 533 of the one slider 53*a*, and guides the movement of the one slider 53*a* in the insertion/removal direction X.

Between the pair of slider guide portions 54*a* and 54*b*, the other slider guide portion 54*b* located on the removal direction X2 side in the insertion/removal direction X has an end on the fitting direction X1 side fixed to the other first bearing 52*b*, and an end on the removal direction X2 side fixed to the other second bearing 55*b*. In addition, the other slider guide portion 54*b* is inserted into the third slider through hole 535 of the other slider 53*b*, and guides the movement of the other slider 53*b* in the insertion/removal direction X.

The link mechanism 56 has four arms 56*a*1, 56*a*2, 56*b*1, and 56*b*2. More specifically, the link mechanism 56 has a pair of first arms 56*a*1 and 56*a*2 located on the fitting direction X1 side and a pair of second arms 56*b*1 and 56*b*2 located on the removal direction X2 side. The pair of first arms 56*a*1 and 56*a*2 each have a base end on the fitting direction X1 side and a tip end on the removal direction X2 side, wherein the base end is attached to the one slider 53*a* and the tip end is attached to the power supply fitting body 40. The pair of second arms 56*b*1 and 56*b*2 each have a base end on the removal direction X2 side and a tip end on the fitting direction X1 side, wherein the base end is attached to the other slider 53*b* and the tip end is attached to the power supply fitting body 40.

The lift part 5 having the above configuration drives the driving source 57 in a state in which the power supply fitting body 40 is located downward in the vertical direction Z, and brings the pair of sliders 53*a* and 53*b* close to each other in the insertion/removal direction X when the driving of the driving source 57 is transferred to the pair of the screw shafts 51*a* and 51*b* via the first driving transfer portion 58*a*. Then, as illustrated in FIG. 8 and FIG. 9, the lift part 5 raises the four arms 56*a*1, 56*a*2, 56*b*1, and 56*b*2 by bringing the pair of sliders 53*a* and 53*b* close to each other, and moves the power supply fitting body 40 in the upward direction Z1 by raising the four arms 56*a*1, 56*a*2, 56*b*1, and 56*b*2.

On the other hand, the lift part 5 reversely drives the driving source 57 in a state in which the power supply fitting body 40 is located in the upward direction Z1 in the vertical direction Z, and separates the pair of sliders 53*a* and 53*b* in the insertion/removal direction X when the reverse driving of the driving source 57 is transferred to the pair of the screw shafts 51*a* and 51*b* via the first driving transfer portion 58*a*. Then, as illustrated in FIG. 6 and FIG. 7, the lift part 5 lowers the four arms 56*a*1, 56*a*2, 56*b*1, and 56*b*2 by separating the pair of sliders 53*a* and 53*b* from each other, and moves the power supply fitting body 40 in the downward direction Z2 by lying down the four arms 56*a*1, 56*a*2, 56*b*1, and 56*b*2.

Furthermore, the lift part 5 drives the driving source 57 in a state in which the power receiving fitting body 3 and the power supply fitting body 40 are separated from each other in the insertion/removal direction X, and when the driving of the driving source 57 is transferred to the pair of the screw shafts 51*a* and 51*b* via the second driving transfer portion 58*b*, the lift part 5 moves in the fitting direction X1 in the insertion/removal direction X in a state in which the pair of sliders 53*a* and 53*b* maintain the distance therebetween. That is, the lift part 5 operates as described above, thereby moving the power supply fitting body 40 toward the fitting direction X1 (direction indicated by arrow F in FIG. 9).

On the other hand, the lift part 5 reversely drives the driving source 57 in a state in which the power receiving fitting body 3 and the power supply fitting body 40 are close to each other in the insertion/removal direction X, and when the reverse driving of the driving source 57 is transferred to the pair of the screw shafts 51*a* and 51*b* via the second driving transfer portion 58*b*, the lift part 5 moves in the removal direction X2 in the insertion/removal direction X in a state in which the pair of sliders 53*a* and 53*b* maintain the distance therebetween. That is, the lift part 5 operates as described above, thereby moving the power supply fitting body 40 toward the removal direction X2 (direction indicated by arrow B in FIG. 9).

The pair of lift door portions 59*a* and 59*b* are provided on the lift housing 50 to be openable/closable, and are in an open state when the power supply fitting body 40 comes into contact with the pair of lift door portions 59*a* and 59*b* by driving the lift part 5. Furthermore, when the power supply fitting body 40 is located in the upward direction Z1 in the vertical direction Z, the pair of lift door portions 59*a* and 59*b* are maintained in an open state by coming into contact with the four arms 56*a*1, 56*a*2, 56*b*1, and 56*b*2. On the other hand, by providing an urging member (not illustrated), the pair of lift door portions 59*a* and 59*b* are urged in a closing direction, and when the power supply fitting body 40 is moved downward in the vertical direction Z by reversely driving the lift part 5, the pair of lift door portions 59*a* and 59*b* are in a closed state by the urging force of the urging member, suppressing the entering of foreign matters, such as rainwater, into the lift housing 50.

The operation of the vehicle charging system 1 having the above configuration will be described below. First, as illustrated in FIG. 2, the vehicle 2 is not stopped in the stop space 21, the arms 56*a*1, 56*a*2, 56*b*1, and 56*b*2 of the lift part 5 lie down, and the pair of lift door portions 59*a* and 59*b* are in a closed state. In such a state, as illustrated in FIG. 1, the vehicle 2 stops in the stop space 21 by automatic driving.

Then, when the vehicle 2 stopped in the stop space 21 is detected by a sensor (not illustrated), a controller 10 of the vehicle charging system 1 drives the lift part 5, raising the four arms 56*a*1, 56*a*2, 56*b*1, and 56*b*2, causing the pair of lift door portions 59*a* and 59*b* to be in an open state, and moving the power supply fitting body 40 toward the upward direction Z1 in the vertical direction Z as illustrated in FIG. 10.

Then, as illustrated in FIG. 11 and FIG. 12, the controller 10 of the vehicle charging system 1 causes the power supply fitting body 40 to enter the opposite space 35*s* by driving the lift part 5, and stops driving the lift part 5 when the power supply ceiling portion 441 of the power supply fitting body 40 comes into contact with the ceiling wall portion 355 of the power receiving fitting body 3. In such a state, in the insertion/removal direction X, the position of the power supply fitting body 40 in the vertical direction Z coincides with the position of the power receiving fitting body 3 in the vertical direction Z. That is, the lift part 5 is driven, so that the power supply fitting body 40 is located in the opposite space 35*s* and the power supply terminals 41 and the power receiving terminals 31 are in an opposite state in which they are opposite to each other in the insertion/removal direction X. The opposite state will be described more specifically. The position of the first power supply signal terminal 41*a*1 in the vertical direction Z coincides with the position of the first power receiving signal terminal 31*a*1 in the vertical direction Z. Furthermore, the position of the second power supply signal terminal 41a2 in the vertical direction Z coincides with the position of the second power receiving signal terminal 31a2 in the vertical direction Z. Furthermore, the position of the first power supply terminal 41b1 in the vertical direction Z coincides with the position of the power receiving terminal 31b1 in the vertical direction Z. Moreover, the position of the second power supply terminal 41b2 in the vertical direction Z coincides with the position of the second power receiving terminal 31b2 in the vertical direction Z.

That is, in the present embodiment, the opposite state refers to a state in which the power supply fitting body 40 is located in the opposite space 35s and the position of the power receiving terminals 31 in the vertical direction Z and the position of the power supply terminals 41 in the vertical direction Z coincide with each other. Thus, when the position of the power receiving terminals 31 in the vertical direction Z and the position of the power supply terminals 41 in the vertical direction Z coincide with each other, the opposite state includes a state in which the position of the power receiving terminals 31 in the width direction Y and the position of the power supply terminals 41 in the width direction Y coincide with each other as illustrated in FIG. 12, and a state in which the position of the power supply terminals 41 in the width direction Y is shifted from the position of the power receiving terminals 31 in the width direction Y as illustrated in FIG. 15.

From such a state, the controller 10 of the vehicle charging system 1 moves the power supply fitting body 40 toward the fitting direction X1 in the insertion/removal direction X by driving the lift part 5, thereby causing the power supply fitting body 40 to be fitted to the power receiving fitting body 3 so that the power receiving terminals 31 and the power supply terminals 41 are in contact with each other as illustrated in FIG. 13 and FIG. 14. More specifically, the controller 10 of the vehicle charging system 1 brings the first power receiving signal terminal 31a1 into contact with the first power supply signal terminal 41a1, brings the second power receiving signal terminal 31a2 into contact with the second power supply signal terminal 41a2, brings the first power receiving terminal 31b1 into contact with the first power supply terminal 41b1, and brings the second power receiving terminal 31b2 into contact with the second power supply terminal 41b2.

Then, the controller 10 of the vehicle charging system 1 charges the battery 22 by the charging device 49. Thereafter, the controller 10 of the vehicle charging system 1 moves the power supply fitting body 40 toward the removal direction X2 in the insertion/removal direction X by driving the lift part 5, thereby removing the power supply fitting body 40 from the power receiving fitting body 3. Thereafter, the controller 10 of the vehicle charging system 1 stops driving the lift part 5 and stops the movement of the power supply fitting body 40 toward the removal direction X2.

Next, the controller 10 of the vehicle charging system 1 moves the power supply fitting body 40 toward the downward direction Z2 in the vertical direction Z by driving the lift part 5, thereby accommodating the power supply fitting body 40 inside the lift housing 50. In the lift part 5, the pair of lift door portions 59a and 59b are in a closed state by the urging force of the urging member.

The vehicle charging system 1 and the power receiving fitting body 3 according to the present embodiment have the following configurations. The power receiving fitting body 3 has the power receiving terminals 31 electrically connected to the battery 22 provided in the vehicle 2, the power receiving terminal holding part 34 that holds the power receiving terminals 31, and the opposite space forming part 35 that is arranged adjacent to the power receiving terminal holding part 34 in the insertion/removal direction X and forms the opposite space 35s facing the power receiving terminals 31. When the power supply fitting body 40 is located in the opposite space 35s and the power supply terminals 41 and the power receiving terminals 31 are in an opposite state in which they are opposite to each other in the insertion/removal direction X, the lift part (insertion/removal direction movement part) 5 causes the power receiving fitting body 3 and the power supply fitting body 40 to be fitted to each other by moving the power supply fitting body 40 toward the power receiving fitting body 3 in the insertion/removal direction X, and electrically connects the battery 22 and the charging device 49 by bringing the power receiving terminals 31 and the power supply terminals 41 into contact with each other. Therefore, when the power supply fitting body 40 is moved in the insertion/removal direction X by the lift part (insertion/removal direction movement part) 5, the vehicle charging system 1 and the power receiving fitting body 3 according to the present embodiment can electrically connect the power supply terminals 41 and the power receiving terminals 31. As a consequence, the vehicle charging system 1 and the power receiving fitting body 3 according to the present embodiment can arrange the power receiving terminals 31 along the insertion/removal direction X. Consequently, in the vehicle charging system 1 and the power receiving fitting body 3 according to the present embodiment, the power receiving terminals 31 can be arranged horizontally along the insertion/removal direction X, so that the layout inside the vehicle can be suppressed from being affected. With this, the vehicle charging system 1 and the power receiving fitting body 3 according to the present embodiment can suppress the influence on the layout of the components constituting the vehicle 2 inside the vehicle.

The vehicle charging system 1 and the power receiving fitting body 3 according to the present embodiment have the following configurations. The power receiving fitting body 3 has a plurality of power receiving terminals 31, and the power receiving terminals 31 are arranged side by side in a direction different from the insertion/removal direction X and the vertical direction Z of the vehicle 2. Therefore, the vehicle charging system 1 and the power receiving fitting body 3 according to the present embodiment can further suppress the influence on the layout inside the vehicle.

Furthermore, the vehicle charging system 1 and the opposite space forming part 35 of the power receiving fitting body 3 according to the present embodiment have the guide surfaces 351f that are arranged on the power receiving fitting body 3 side in the insertion/removal direction X and face the power supply fitting body 40 in the insertion/removal direction X in the opposite state. The guide surfaces 351f are arranged in a pair with the power receiving terminal holding part 34 interposed therebetween. The distance between the pair of guide surfaces 351f1 and 351f2 in the width direction Y becomes shorter toward the power receiving fitting body 3 in the insertion/removal direction X.

Therefore, in the vehicle charging system 1 and the power receiving fitting body 3 according to the present embodiment, as illustrated in FIG. 15, even though the position of each power supply terminal 41 corresponding to the position of each power receiving terminal 31 is shifted in the insertion/removal direction X, when the lift part 5 is driven to move the power supply fitting body 40 in the fitting direction with respect to the power receiving fitting body 3, the tip end of the power supply fitting body 40 on the fitting direction X1 side comes into contact with the pair of guide surfaces 351f1 and 351f2, so that the power receiving terminals 31 and the power supply terminals 41 can be in a contactable state, in which they can come into contact with each other, immediately before fitting when viewed from the insertion/removal direction X. As a consequence, the vehicle charging system 1 and the power receiving fitting body 3 according to the present embodiment can cause the power receiving fitting body 3 and the power supply fitting body 40 to be reliably fitted to each other.

First Modification of First Embodiment

Figure 16:
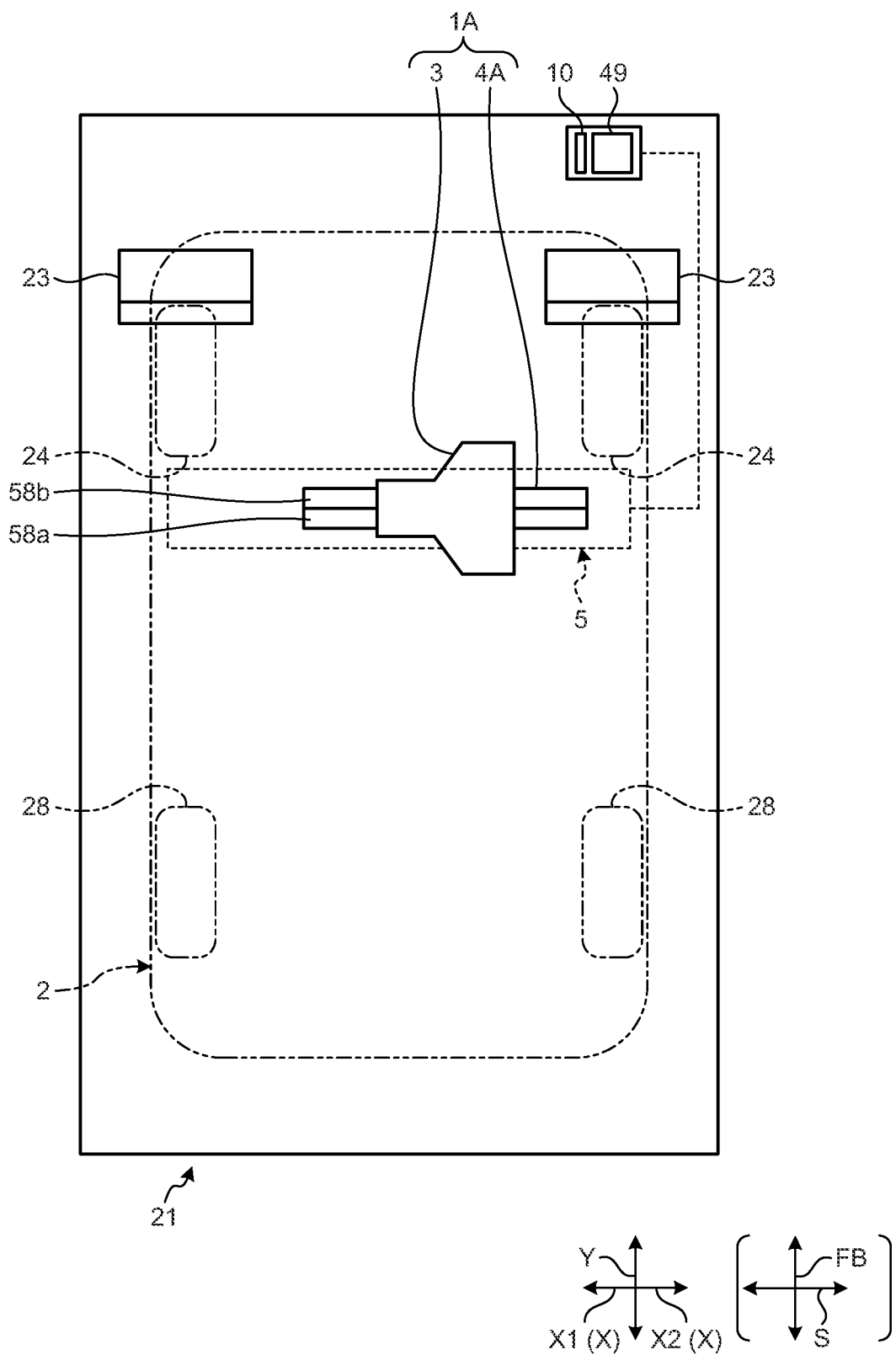
FIG. 16 is a plan view illustrating a first modification of the first embodiment in the vehicle charging system according to the present invention.

FIG. 16 is a plan view illustrating a first modification of the first embodiment in the vehicle charging system 1 according to the present invention. In the vehicle charging system 1 according to the first embodiment, the insertion/removal direction X of the vehicle charging system 1 and the front-back direction FB of the stopped vehicle 2 coincide with each other, and the width direction Y of the vehicle charging system 1 and the vehicle width direction S of the stopped vehicle 2 coincide with each other. On the other hand, in a vehicle charging system 1A according to the first modification, the insertion/removal direction X of the vehicle charging system 1A and the vehicle width direction S of the stopped vehicle 2 coincide with each other, and the width direction Y of the vehicle charging system 1A and the front-back direction FB of the stopped vehicle 2 coincide with each other. The other configurations of the vehicle charging system 1A according to the first modification are the same as those of the vehicle charging system 1 according to the first embodiment.

When the vehicle 2 stops in the stop space 21, the stop position of the vehicle 2 shifts in the vehicle width direction S even though the vehicle 2 stops by automatic driving. On the other hand, in the front-back direction FB of the vehicle 2, deviation for each stop is smaller than deviation in the vehicle width direction S. Thus, in accordance with the vehicle charging system 1A according to the first modification, the amount of deviation of the power supply fitting body 40 with respect to the power receiving fitting body 3 in the insertion/removal direction X can be made as small as possible.

Second Modification of First Embodiment

Figure 17:
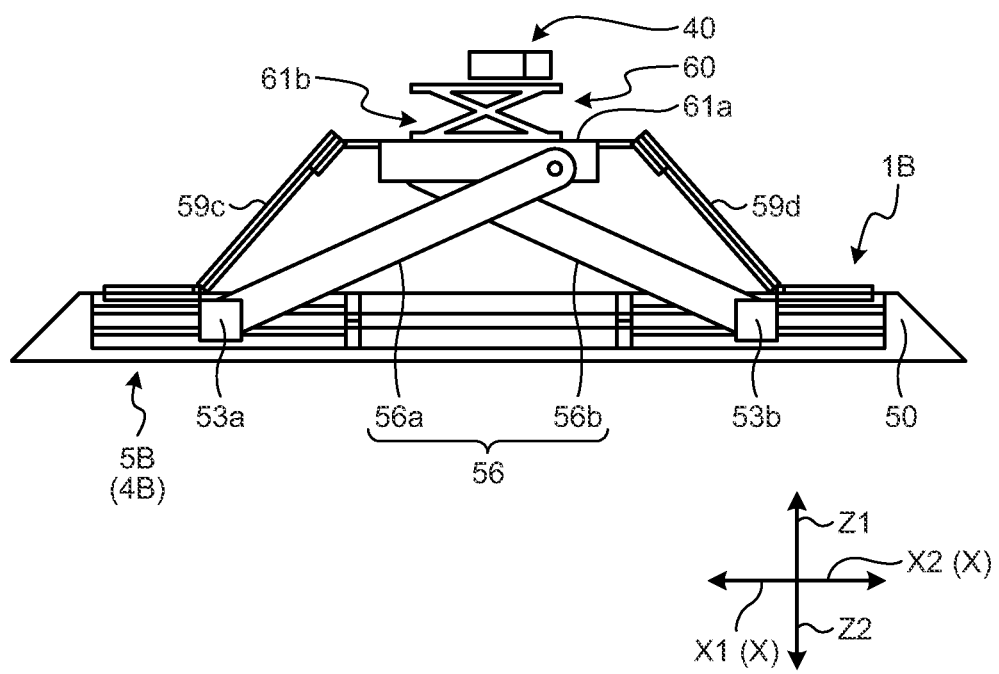
FIG. 17 is a side view illustrating a state in which arms of a lift part included in a power supply device according to a second modification of the first embodiment are raised.

FIG. 17 is a plan view illustrating a second modification of the first embodiment in a vehicle charging system 1B according to the present invention. More specifically, FIG. 17 is a side view illustrating a state in which the arms 56a1, 56a2, 56b1, and 56b2 of a lift part 5B included in a power supply device 4B are raised in the vehicle charging system 1B according to the second modification of the first embodiment of the present embodiment.

The lift part 5B of the power supply device 4B according to the second modification further includes a vertical elastic deformation part 61b and the like, in addition to the configuration of the lift part 5 of the power supply device 4 according to the first embodiment. The lift part 5B includes a fixed portion 61a fixed to the tip ends of the four arms 56a1, 56a2, 56b1, and 56b2 the link mechanism 56, and the vertical elastic deformation part 61b provided between an upper portion of the fixed portion 61a and a lower portion of the power supply fitting body 40. The vertical elastic deformation part 61b is formed to be elastically deformable in the vertical direction Z. Therefore, when the lift part 5B moves the power supply fitting body 40 in the upward direction Z1 and causes the power supply fitting body 40 to enter the opposite space 35s so that the power supply ceiling portion 441 (see FIG. 4) of the power supply fitting body 40 presses against the ceiling wall portion 355 (see FIG. 3) of the power receiving fitting body 3, the vertical elastic deformation part 61b contracts in the vertical direction Z. In such a state, the lift part 5B is moved in the fitting direction X1 by driving the driving source 57, the power receiving fitting body 3 and the power supply fitting body 40 are fitted to each other, and the power receiving terminals 31 and the power supply terminals 41 are brought into contact with each other, so that the battery 22 and the charging device 49 are electrically connected to each other.

The vehicle charging system 1B and the power receiving fitting body 3 according to the present modification have the following configurations. The lift part 5B includes the fixed portion 61a fixed to the tip ends of the four arms 56a1, 56a2, 56b1, and 56b2 in the link mechanism 56, and the vertical elastic deformation part 61b provided between the upper portion of the fixed portion 61a and the lower portion of the power supply fitting body 40. Therefore, the position of the power supply fitting body 40 in the vertical direction Z can be aligned with the position of the power receiving fitting body 3 in the vertical direction Z, so that the power supply fitting body 40 can be reliably fitted to the power receiving fitting body 3.

Third Modification of First Embodiment

Figure 18:
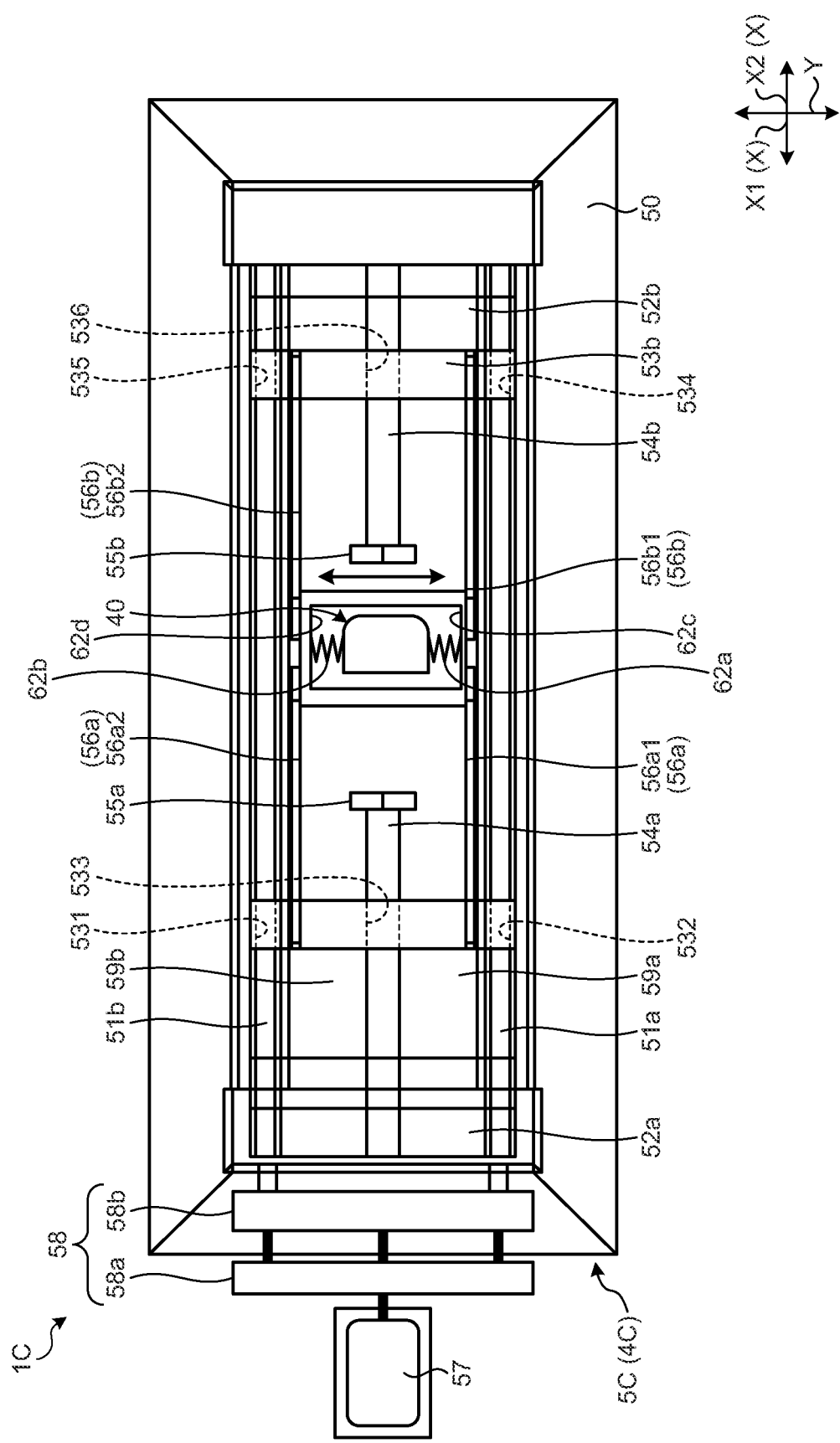
FIG. 18 is a plan view illustrating a third modification of the first embodiment in the vehicle charging system according to the present invention.

FIG. 18 is a plan view illustrating a third modification of the first embodiment in a vehicle charging system 10 according to the present invention.

A lift part 50 of a power supply device 40 in the vehicle charging system 1C according to the third modification further includes widthwise elastic deformation parts 62a and 62b, and the like, in addition to the configuration of the lift part 5B according to the second modification.

The fixed portion 61a has a pair of bent portions 62c and 62d facing each other in the width direction Y. Furthermore, the lift part 5C includes the widthwise elastic deformation parts 62a and 62b between the power supply side portions 443 and 444 in the power supply fitting body 40 and the bent portion 61c and the widthwise elastic deformation part 62b between the power supply side portion 444 in the power supply fitting body 40 and the bent portions 62c and 62d. The widthwise elastic deformation parts 62a and 62b are formed to be elastically deformable in the width direction Y. Therefore, when the power supply fitting body 40 is moved in the fitting direction X1 by the lift part 5C, if the power supply fitting body 40 comes into contact with the pair of guide surfaces 351f1 and 351f2, the power supply fitting body 40 moves in the width direction Y, so that the position of the power supply fitting body 40 in the width direction Y can be aligned with the position of the power receiving fitting body 3 in the width direction Y, whereby when viewed from the insertion/removal direction X, the power receiving terminals 31 and the power supply terminals 41 are in a contactable state.

Second Embodiment

Figure 19:
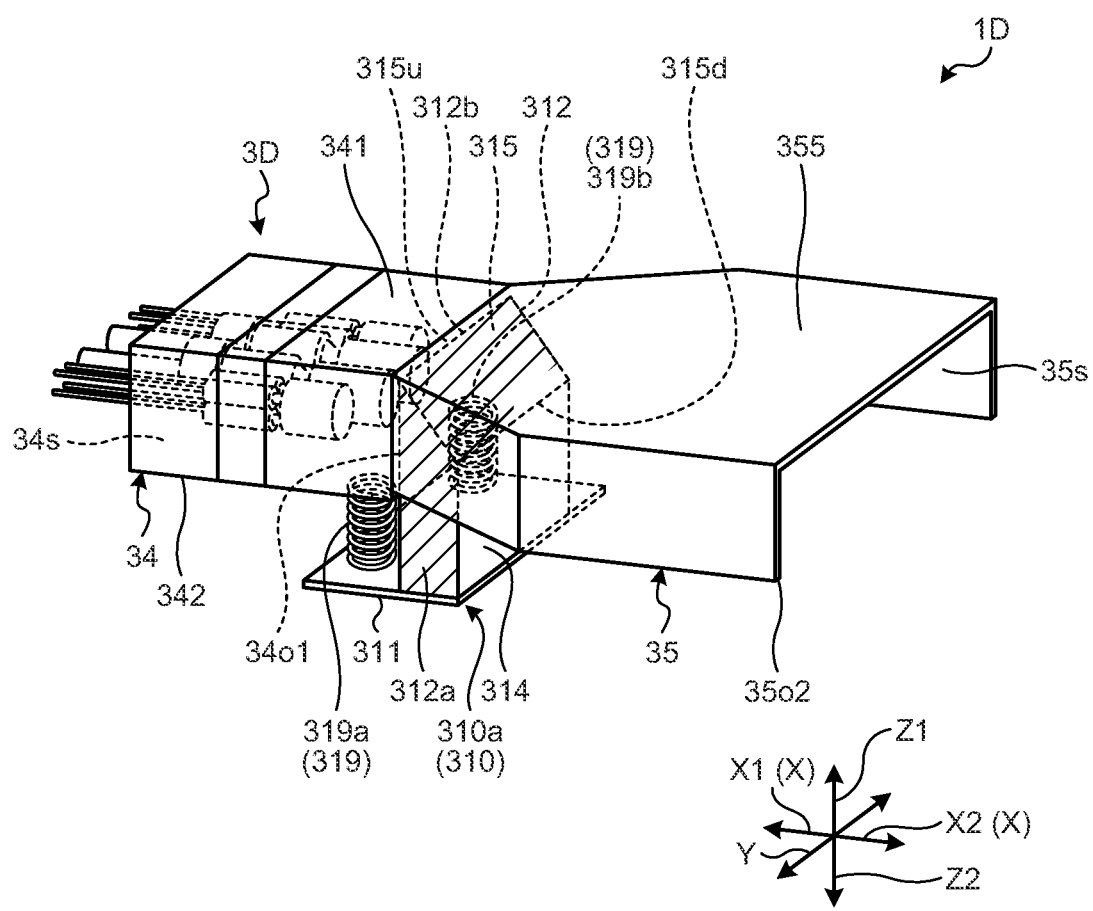
FIG. 19 is a perspective view of a power receiving fitting body according to a second embodiment.
Figure 20:
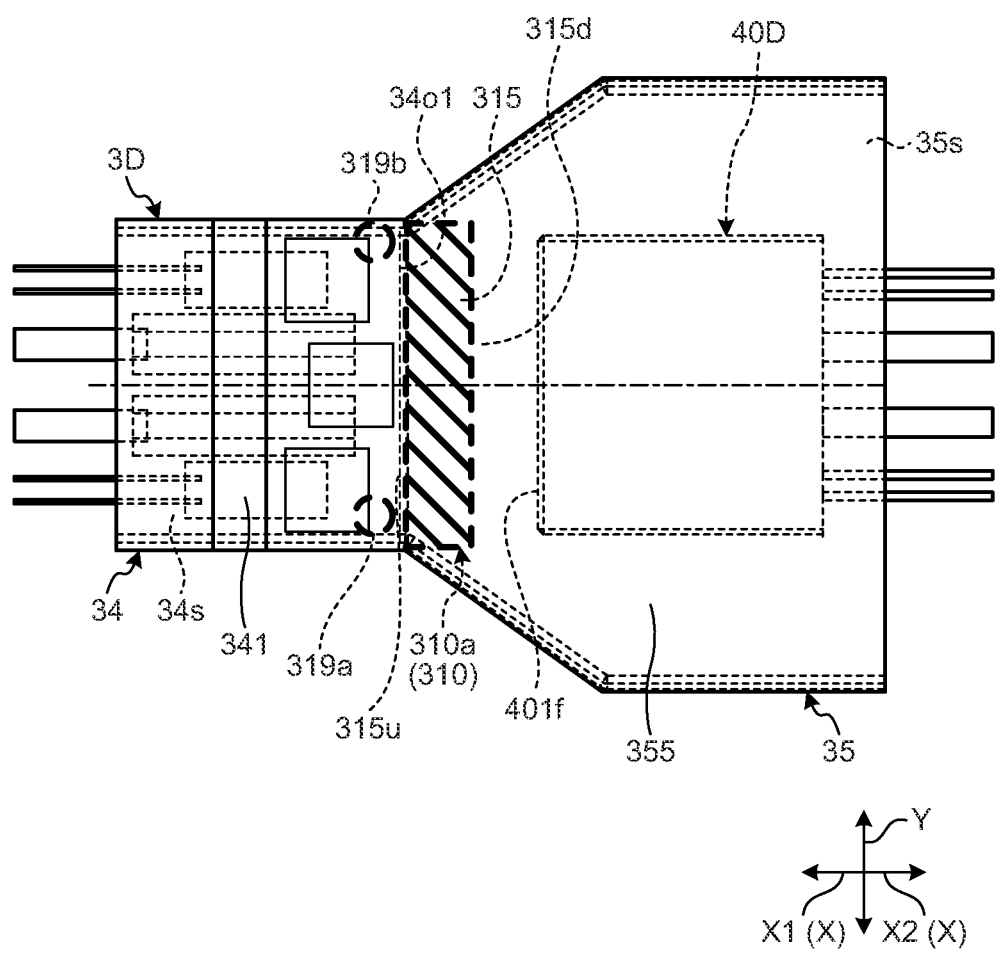
FIG. 20 is a plan view of the power receiving fitting body according to the second embodiment.

FIG. 19 to FIG. 24 are the drawings for explaining a power receiving fitting body 3D according to a second embodiment in a vehicle charging system 1D according to the present invention. FIG. 19 is a perspective view of the power receiving fitting body 3D according to the second embodiment. FIG. 20 is a plan view of the power receiving fitting body 3D according to the second embodiment. FIG. 21 to FIG. 24 are schematic views for sequentially explaining an operation of the vehicle charging system 1D according to the present embodiment.

The power receiving fitting body 3D according to the second embodiment further includes a holding portion door 310 that opens and closes the holding portion opening 34o1, in addition to the configuration of the power receiving fitting body 3 according to the first embodiment.

As illustrated in FIG. 19 and FIG. 20, the holding portion door 310 includes a holding door body 310a, a substrate 311, and an urging member 319.

The holding portion door 310 includes a pair of door side portions 312a and 312b facing each other in the width direction Y, a pair of opposite walls 313 and 314 facing each other in the insertion/removal direction X, and a door upper surface portion 315 that connects a pair of both upper ends of the door. The door upper surface portion 315 faces the substrate 311 in the vertical direction Z. The door upper surface portion 315 has a door upper surface upper end 315u at the end thereof in the upward direction Z1, and a door upper surface lower end 315d at the end thereof in the downward direction Z2. The door upper surface lower end 315d is located on the removal direction X2 side, and the door upper surface upper end 315u is located on the fitting direction X1 side. When viewed from the width direction Y, the door upper surface lower end 315d and the door upper surface upper end 315u are inclined with respect to the vertical direction Z and the insertion/removal direction X.

The substrate 311 is formed in a rectangular flat plate shape, for example. The urging member 319 is, for example, a coil spring. For example, a pair of urging members 319 are arranged side by side in the width direction Y. The pair of urging members 319a and 319b cause a tip end of the holding door body 310a to abut an inner surface of the power receiving ceiling portion 341 by the urging force of the urging member 319 in a state in which no external force is applied, thereby closing the holding portion opening 34o1.

Figure 21:
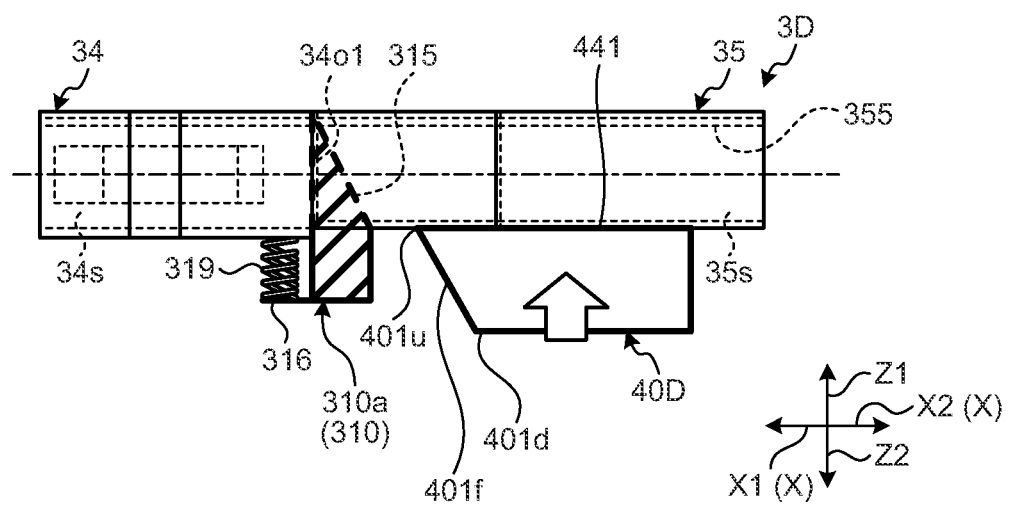
FIG. 21 is a schematic view for sequentially explaining an operation of a vehicle charging system according to the second embodiment.

On the other hand, as illustrated in FIG. 21, a tip end surface 401f of a power supply fitting body 40D on the fitting direction X1 side has a tip lower end portion 401d at the end thereof in the downward direction Z2, and a tip upper end portion 401u at the end thereof in the upward direction Z1. The tip lower end portion 401d is located on the removal direction X2 side, and the tip upper end portion 401u is located on the fitting direction X1 side. When viewed from the width direction Y, the tip lower end portion 401d and the tip upper end portion 401u are inclined with respect to the vertical direction Z and the insertion/removal direction X.

Figure 22:
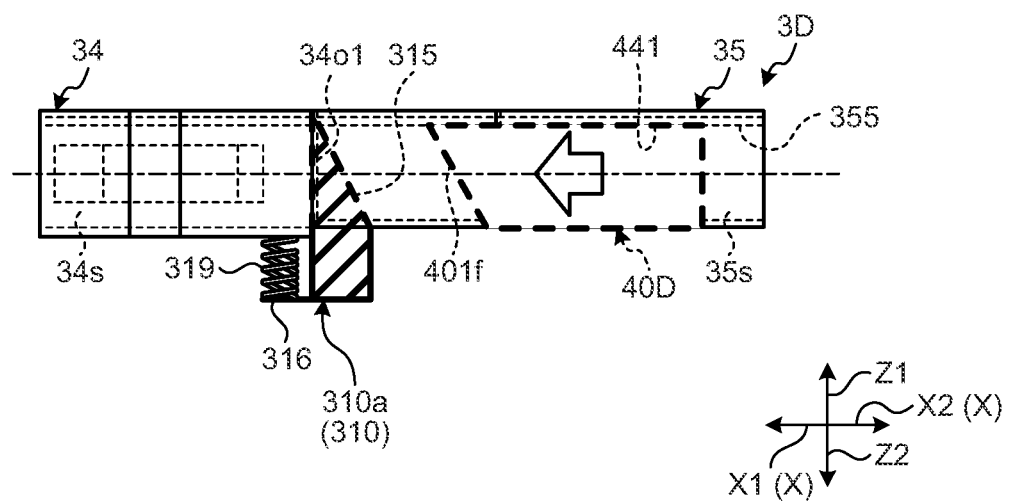
FIG. 22 is a schematic view for sequentially explaining the operation of the vehicle charging system according to the second embodiment.

Next, the operation of the vehicle charging system 1D of the present embodiment will be described with reference to FIG. 21 to FIG. 24. As illustrated in FIG. 21, the vehicle charging system 1D moves the power supply fitting body 40D toward the upward direction Z1 by driving the lift part 5. Thereafter, the vehicle charging system 1D continues to drive the lift part 5, thereby causing the power supply fitting body 40D to enter the opposite space 35s so that the power supply ceiling portion 441 of the power supply fitting body 40D comes into contact with the ceiling wall portion 355 of the opposite space forming part 35 as illustrated in FIG. 22. Thereafter, the vehicle charging system 1D stops driving the lift part 5.

Figure 23:
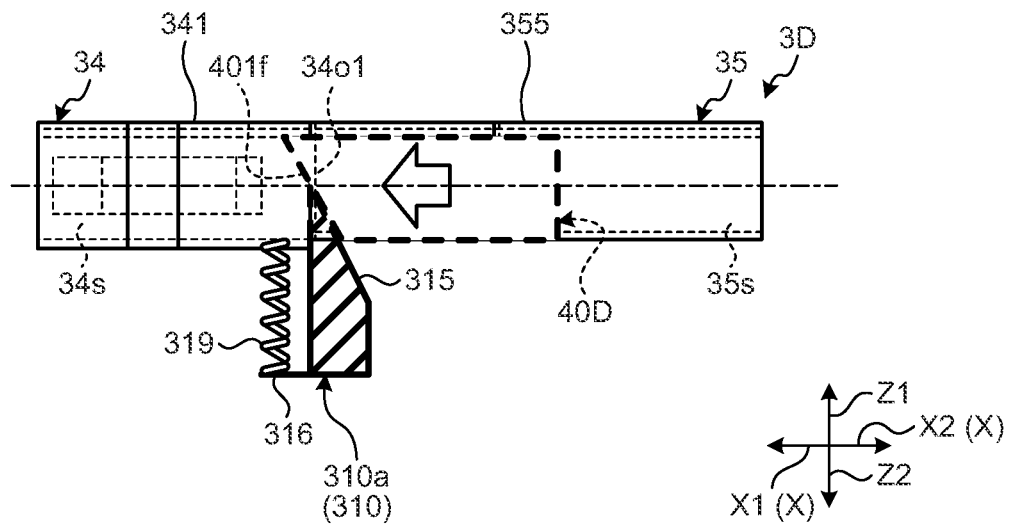
FIG. 23 is a schematic view for sequentially explaining the operation of the vehicle charging system according to the second embodiment.

Next, when the vehicle charging system 1D moves the power supply fitting body 40D toward the fitting direction X1 by driving the lift part 5, the tip end surface 401f of the power supply fitting body 40 comes into contact with the door upper surface portion 315 of the holding door body 310a as illustrated in FIG. 23. Then, the holding door body 310a moves in the downward direction Z2 by the external force based on the movement of the power supply fitting body 40. At this time, the urging member 319 extends in the vertical direction Z against the urging force.

Figure 24:
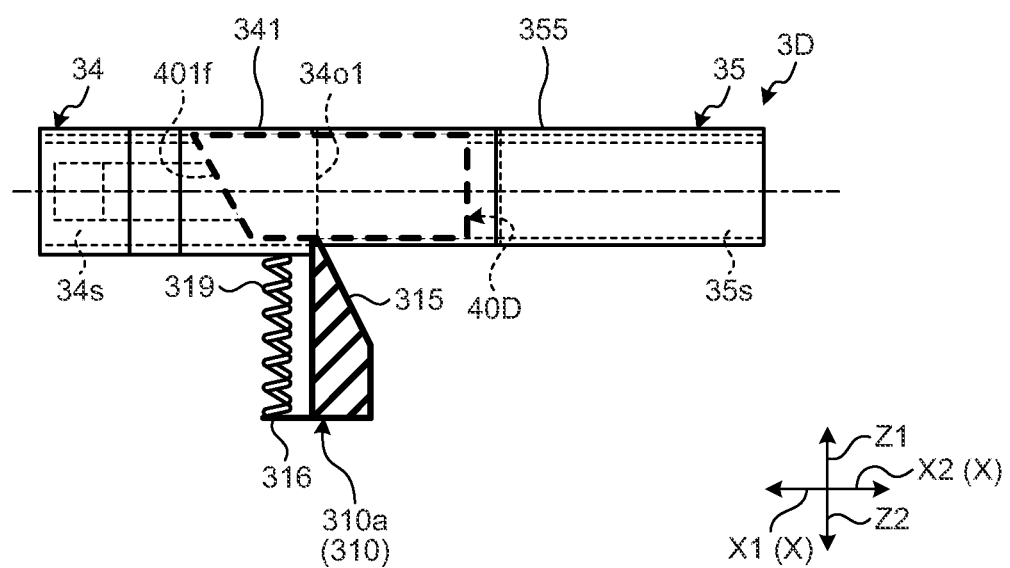
FIG. 24 is a schematic view for sequentially explaining the operation of the vehicle charging system according to the second embodiment.

Thereafter, when the vehicle charging system 1D further moves the power supply fitting body 40D toward the fitting direction X1 by continuously driving the lift part 5, the holding door body 310a further moves downward, and the door upper surface portion 315 of the holding door body 310a comes into contact with the power supply bottom portion 442 of the power supply fitting body 40D to cause the holding portion opening 34o1 to be in an open state, as illustrated in FIG. 24. In such a state, the vehicle charging system 1D causes the power supply fitting body 40D and the power receiving fitting body 3 to be fitted to each other and brings the power receiving terminals 31 and the power supply terminals 41 into contact with each other, thereby electrically connecting the battery 22 and the charging device 49.

Thereafter, after the battery 22 is completely charged, when the vehicle charging system 1D moves the power supply fitting body 40D toward the removal direction X2 by driving the lift part 5, the tip end surface 401f of the power supply fitting body 40D comes into contact with the door upper surface portion 315 of the holding door body 310a. Thereafter, when the lift part 5 is continuously driven and the power supply fitting body 40D is further moved in the removal direction X2, the contact between the holding door body 310a and the power supply fitting body 40 is released, and the holding door body 310a moves upward by the urging force of the urging member 319 to close the holding portion opening 34o1.

That is, the holding portion door 310 is in an open state by the external force based on the movement of the power supply fitting body 40D by the lift part 5, exposes the power receiving terminals 31 to the opposite space 35s via the holding portion opening 34o1, and is in a closed state due to the absence of the external force based on the movement of the power supply fitting body 40D by the lift part (insertion/removal direction movement part) 5 to close the holding portion opening 34o1. Therefore, in the vehicle charging system 1D and the power receiving fitting body 3D according to the present embodiment, the holding portion door 310 can expose the power receiving terminals 31 to the opposite space 35s to enable the contact between the power receiving terminals 31 and the power supply terminals 41 during the charging of the battery 22, and close the holding portion opening 34o1 during the travel of the vehicle 2. As a consequence, in the vehicle charging system 1D and the power receiving fitting body 3D according to the present embodiment, the holding portion door 310 enables the battery 22 to be charged by the charging device 49, and foreign material can be prevented from being attached to the power receiving terminals 31 during the travel of the vehicle 2.

First Modification of Second Embodiment

Figure 25:
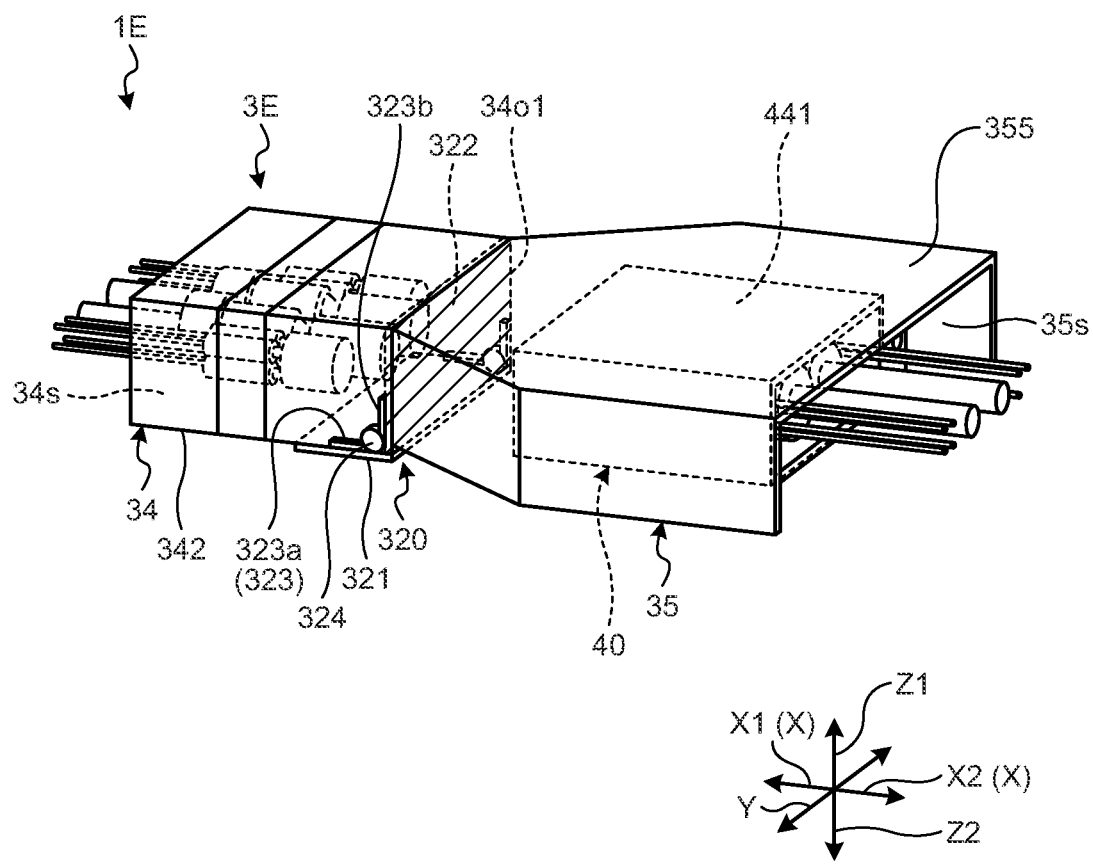
FIG. 25 is a perspective view of a power receiving fitting body according to a first modification of the second embodiment.
Figure 26:
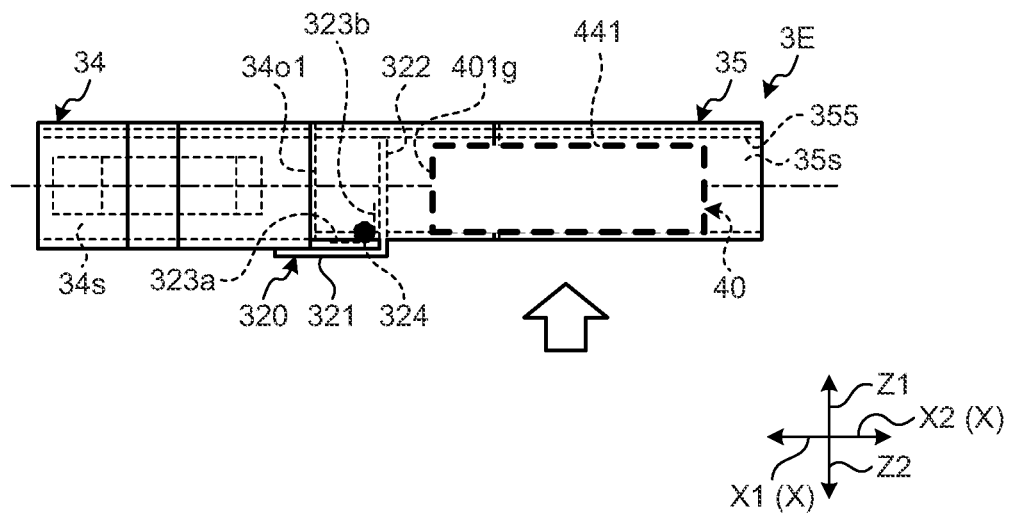
FIG. 26 is a schematic view for sequentially explaining an operation of a vehicle charging system according to the first modification of the second embodiment.

FIG. 25 to FIG. 29 are drawings for explaining a power receiving fitting body 3E according to a first modification of the second embodiment in a vehicle charging system 1E according to the present invention. FIG. 25 is a perspective view of the power receiving fitting body 3E according to the first modification of the second embodiment. FIG. 26 to FIG.

29 are schematic views for sequentially explaining an operation of the vehicle charging system 1E according to the present embodiment.

The power receiving fitting body 3E according to the first modification further includes a holding portion door 320 that opens and closes the holding portion opening 34o1, in addition to the configuration of the power receiving fitting body 3 according to the first embodiment.

As illustrated in FIG. 25, the holding portion door 320 includes a substrate 321 fixed to an outer surface of the power receiving bottom portion 342, a holding door body 322 that can rotate around a shaft 324 with respect to the substrate 321, and an urging member 323 provided on the shaft 324.

The urging member 323 is, for example, a torsion coil spring, is wound around the shaft 324, and has one end 323a coming into contact with an inner surface of the power receiving bottom portion 342 and the other end 323b coming into contact with the holding door body 322. In a state in which no external force is applied, the urging member 323 brings the holding portion door 320 into contact with a stopper (not illustrated) by its own urging force, thereby closing the holding portion opening 34o1.

Next, an operation of the vehicle charging system 1E according to the present modification will be described with reference to FIG. 26 to FIG. 29. As illustrated in FIG. 26, the vehicle charging system 1E moves the power supply fitting body 40 toward the upward direction Z1 by driving the lift part 5, thereby causing the power supply fitting body 40 to enter the opposite space 35s. Then, the vehicle charging system 1E brings the power supply ceiling portion 441 of the power supply fitting body 40 into contact with the ceiling wall portion 355 of the opposite space forming part 35, and then stops driving the lift part 5.

Figure 27:
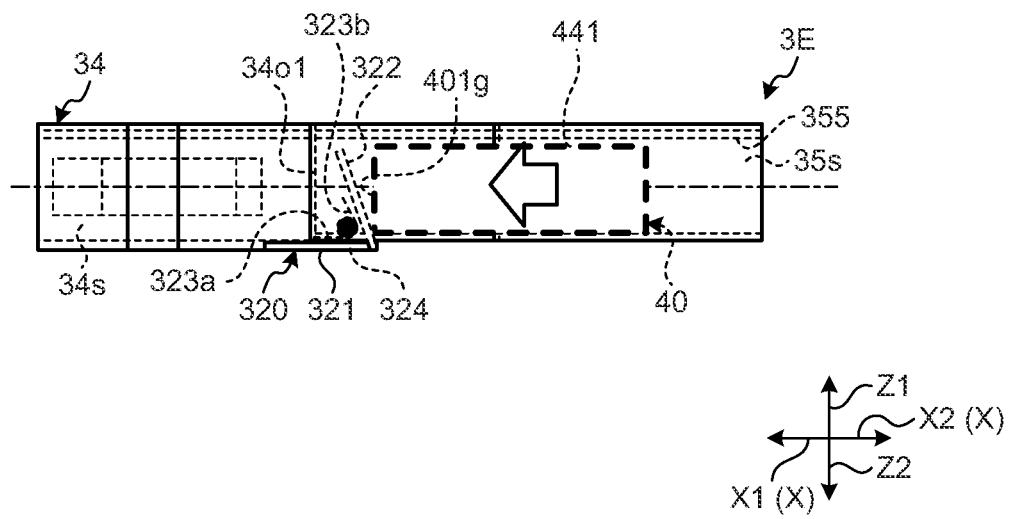
FIG. 27 is a schematic view for sequentially explaining the operation of the vehicle charging system according to the first modification of the second embodiment.

Next, when the vehicle charging system 1E moves the power supply fitting body 40 toward the fitting direction X1 by driving the lift part 5, a tip end surface 401g of the power supply fitting body 40 on the fitting direction X1 side comes into contact with the holding door body 322 as illustrated in FIG. 27. Then, the holding door body 322 rotates around the shaft 324 counterclockwise in FIG. 27 by the external force based on the movement of the power supply fitting body 40 against the urging force of the urging member 323, and comes into close proximity to the inner surface of the power receiving bottom portion 342.

Figure 28:
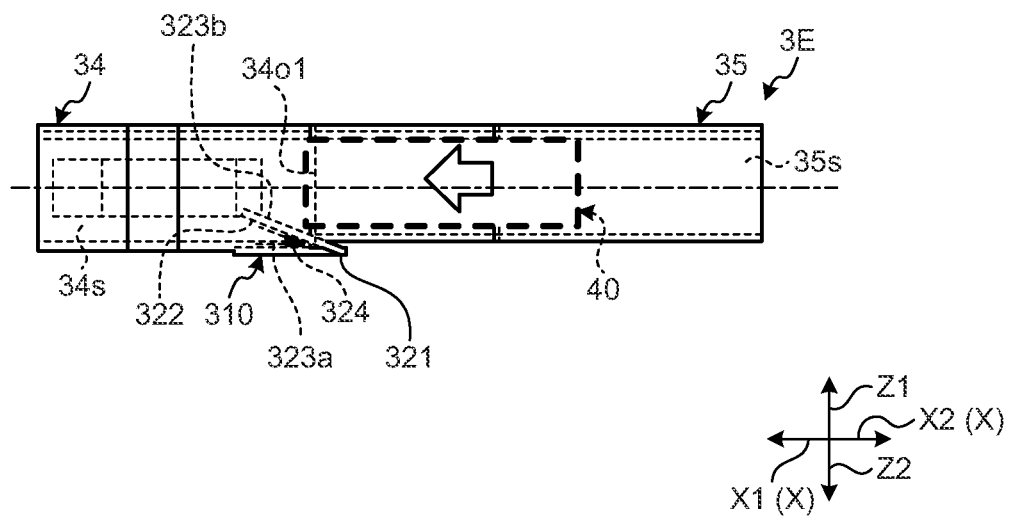
FIG. 28 is a schematic view for sequentially explaining the operation of the vehicle charging system according to the first modification of the second embodiment.

Thereafter, when the vehicle charging system 1E further moves the power supply fitting body 40 toward the fitting direction X1 by continuously driving the lift part 5, the holding door body 322 further rotates around the shaft 324 counterclockwise and comes into closer proximity to the inner surface of the power receiving bottom portion 342 as illustrated in FIG. 28.

Thereafter, when the vehicle charging system 1E further moves the power supply fitting body 40 toward the fitting direction X1 by continuously driving the lift part 5, the holding door body 322 comes into contact with the power supply bottom portion 442 of the power supply fitting body 40 to cause the holding portion opening 34o1 to be in an open state. In such a state, the vehicle charging system 1E causes the power supply fitting body 40 to be fitted to the power receiving fitting body 3 and brings the power receiving terminals 31 and the power supply terminals 41 into contact with each other, thereby electrically connecting the battery 22 and the charging device 49.

Figure 29:
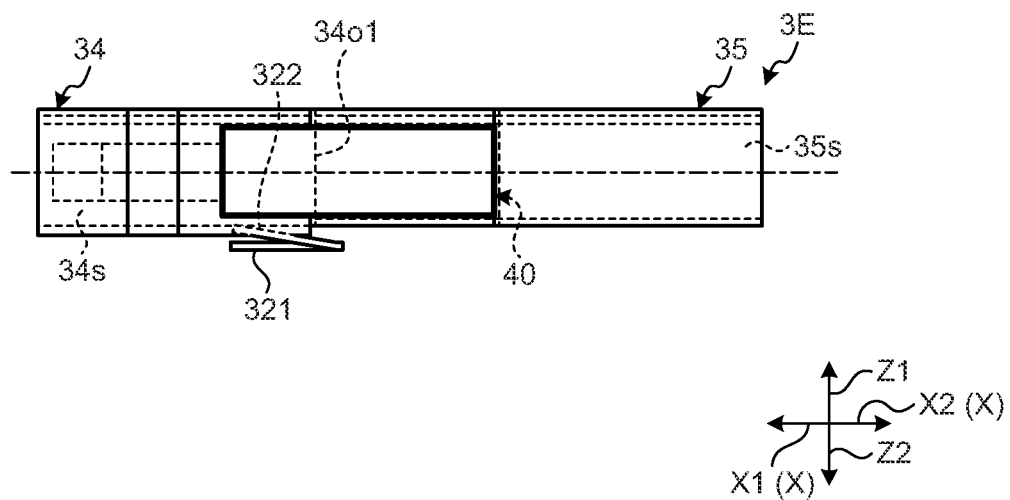
FIG. 29 is a schematic view for sequentially explaining the operation of the vehicle charging system according to the first modification of the second embodiment.

Thereafter, after the battery 22 is completely charged, when the vehicle charging system 1E moves the power supply fitting body 40 toward the removal direction X2 by driving the lift part 5, the contact between the power supply fitting body 40 and the holding door body 322 is released, and the holding door body 322 rotates clockwise by the urging force of the urging member 323 to close the holding portion opening 34o1 as illustrated in FIG. 29.

The vehicle charging system 1E according to the present modification has the same operation and effect as those of the vehicle charging system 1D according to the second embodiment.

Second Modification of Second Embodiment

Figure 30:
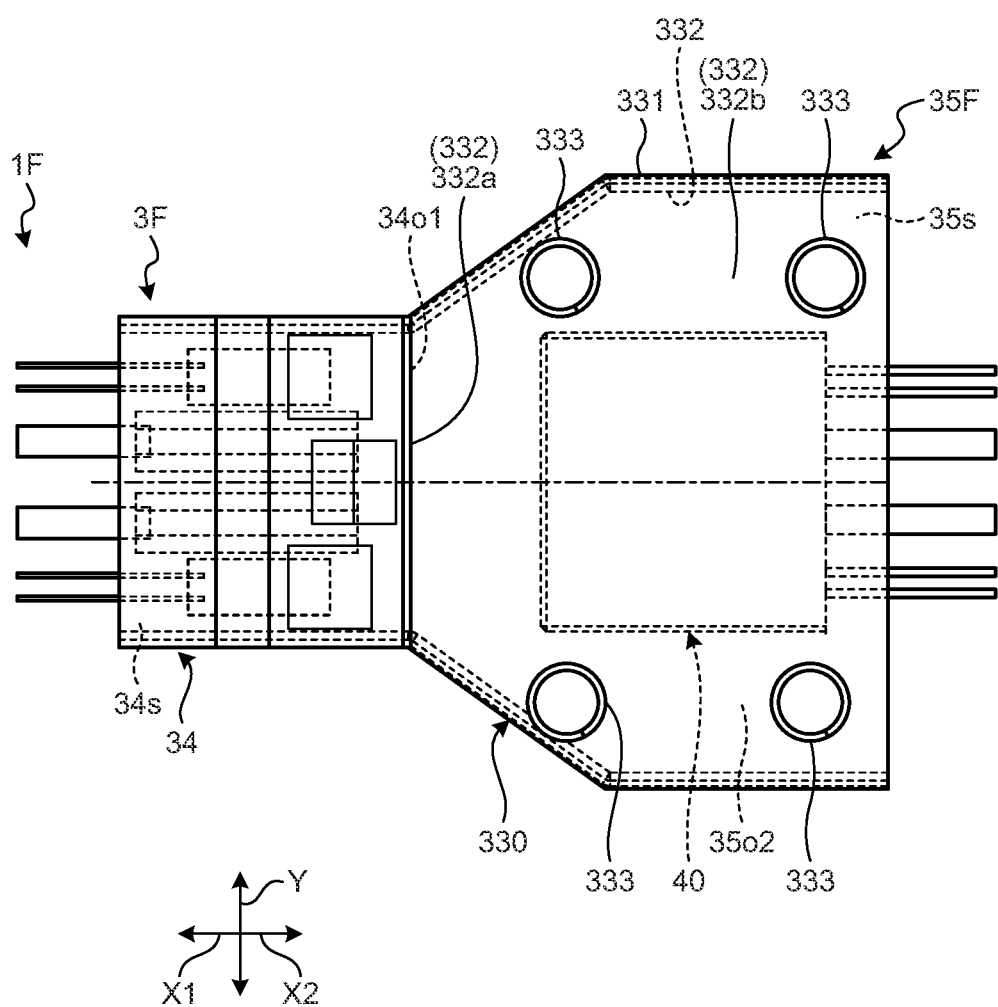
FIG. 30 is a plan view of a power receiving fitting body according to a second modification of the second embodiment.
Figure 31:
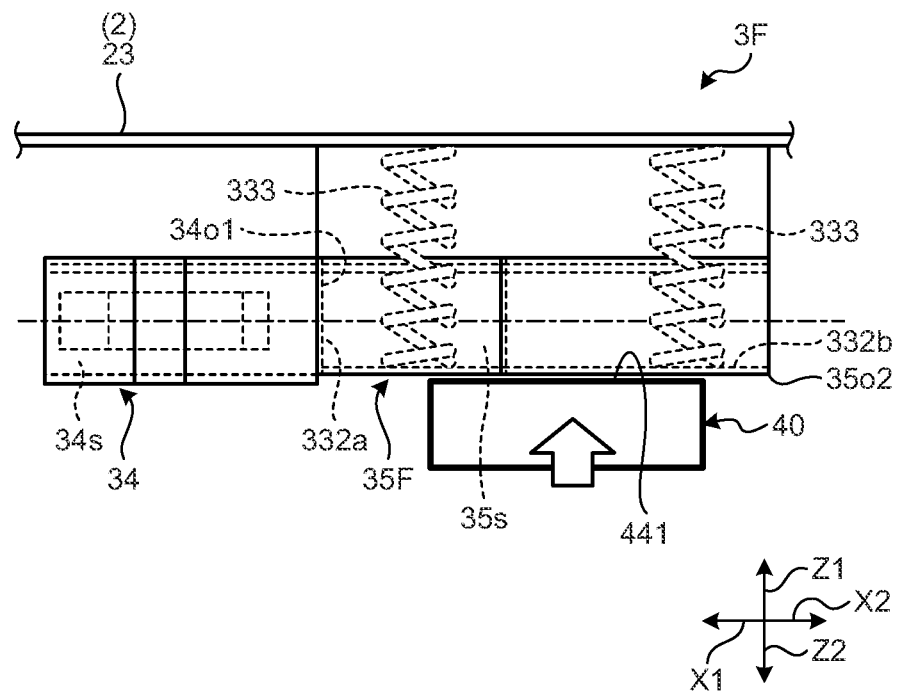
FIG. 31 is a schematic view for sequentially explaining an operation of a vehicle charging system according to the second modification of the second embodiment.
Figure 32:
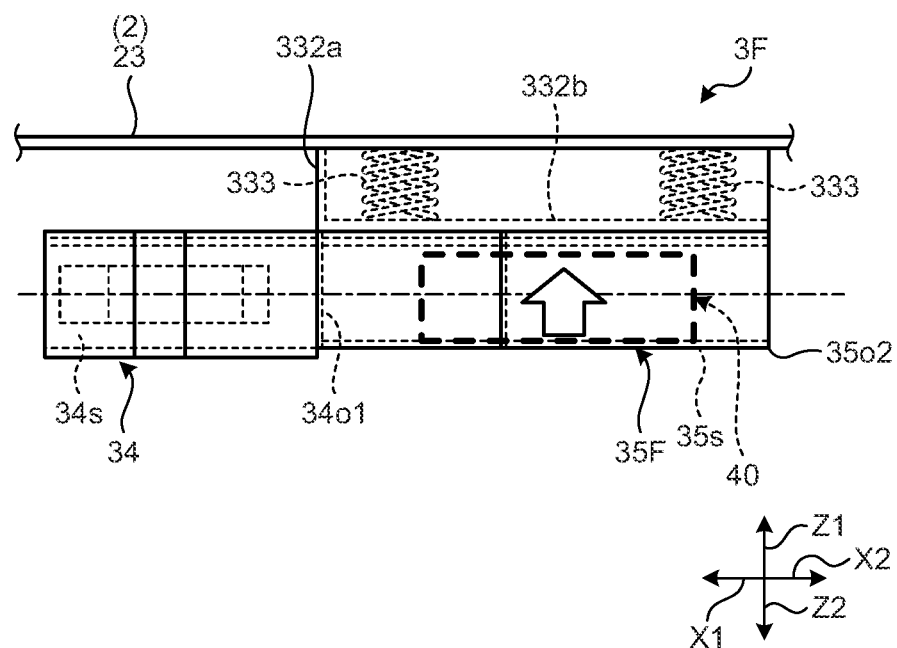
FIG. 32 is a schematic view for sequentially explaining the operation of the vehicle charging system according to the second modification of the second embodiment.
Figure 33:
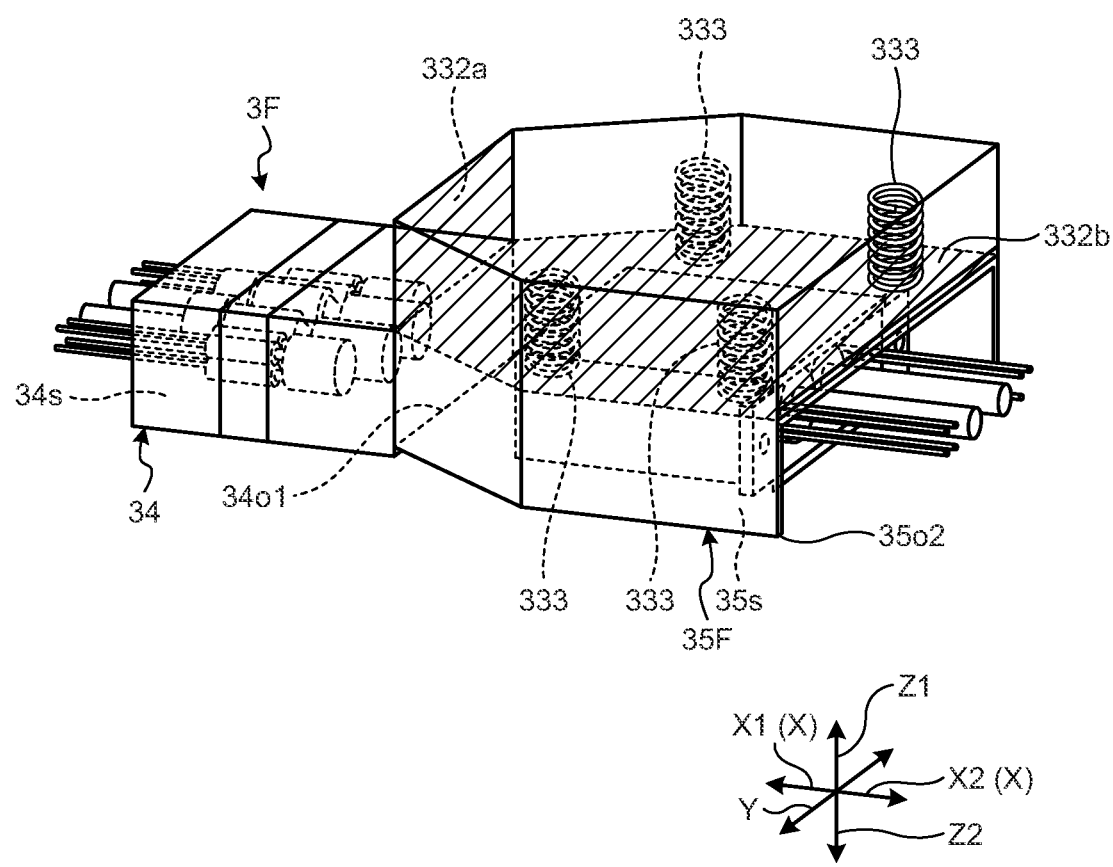
FIG. 33 is a perspective view for sequentially explaining the operation of the vehicle charging system according to the second modification of the second embodiment.
Figure 34:
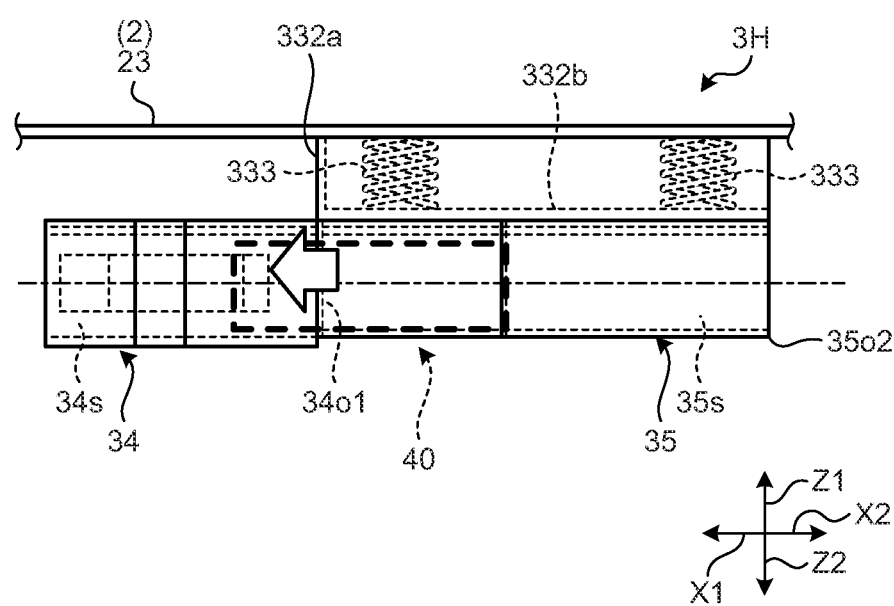
FIG. 34 is a schematic view for sequentially explaining the operation of the vehicle charging system according to the second modification of the second embodiment.

FIG. 30 to FIG. 34 are drawings for explaining a power receiving fitting body 3F according to a second modification of the second embodiment in a vehicle charging system 1F according to the present invention. FIG. 30 is a perspective view of the power receiving fitting body 3F according to the second modification of the second embodiment. FIG. 31, FIG. 32, and FIG. 34 are schematic views for sequentially explaining an operation of the vehicle charging system 1F according to the present embodiment. FIG. 33 is a perspective view illustrating the course of the operation of toe vehicle charging system 1F according to the present embodiment.

As illustrated in FIG. 31 and FIG. 34, an opposite space forming part 35F according to the present modification is formed in a tubular shape in which the length in the vertical direction Z is longer than that of the power receiving terminal holding part 34 in the vertical direction Z. Furthermore, the opposite space forming part 35F is provided therein with a door body 332 configured to be movable in the vertical direction Z inside the opposite space forming part 35F.

The door body 332 includes a holding portion door 332a that opens and closes the holding portion opening 34o1 and a forming portion door 332b that opens and closes a forming portion opening 35o2. Furthermore, the power receiving fitting body 3F includes urging members 333 between the bottom 25 of the vehicle 2 and the forming portion door 332b of the door body 332 in the vertical direction Z. In the power receiving fitting body 3F of the present embodiment, four urging members 333 are provided between the bottom 25 of the vehicle 2 and the forming portion door 332b. The urging member 333 is, for example, a coil spring and extends in the vertical direction Z. Furthermore, when no external force is applied, the holding portion door 332a closes the holding portion opening 34o1 by the urging members 333 and the forming portion door 332b closes the forming portion opening 35o2 by the urging members 333 as illustrated in FIG. 31.

Next, an operation of the vehicle charging system 1F according to the present modification will be described with reference to FIG. 31 to FIG. 34. As illustrated in FIG. 31, the vehicle charging system 1F moves the power supply fitting body 40 toward the upward direction Z1 by driving the lift part 5. Thereafter, the vehicle charging system 1F continues to drive the lift part 5, thereby causing the power supply ceiling portion 441 of the power supply fitting body 40 comes into contact with the forming portion door 332b, moving the door body 332 in the upward direction Z1 against the urging force of the urging members 333 to cause the power supply fitting body 40 to enter the opposite space 35s, and then stops driving the lift part 5, as illustrated in FIG. 32.

At this time, by the movement of the door body 332 in the upward direction Z1, the holding portion door 332a opens the holding portion opening 34o1 and the forming portion door 332b opens the forming portion opening 35o2.

Thereafter, the vehicle charging system 1F moves the power supply fitting body 40 toward the fitting direction X1 by driving the lift part 5, causes the power supply fitting body 40 to be fitted to the power receiving fitting body 3F and brings the power receiving terminals 31 and the power supply terminals 41 into contact with each other, thereby electrically connecting the battery 22 and the charging device 49.

Thereafter, after the battery 22 is completely charged, when the vehicle charging system 1F moves the power supply fitting body 40 toward the removal direction X2 by driving the lift part 5. Thereafter, the vehicle charging system 1F stops driving the lift part 5, drives the lift part 5 again to move the power supply fitting body 40 in the downward direction Z2, and moves the power supply fitting body 40 back from the opposite space 35s. Then, the contact between the forming portion door 332b of the door body 332 and the power supply ceiling portion 441 of the power supply fitting body 40 is released, so that, by the urging force of the urging members 333, the holding portion door 332a of the door body 332 is in a close state to close the holding portion opening 34o1 and the forming portion door 332b of the door body 332 is in a close state to close the forming portion opening 35o2, as illustrated in FIG. 31.

The vehicle charging system 1F and the power receiving fitting body 3F according to the present modification have the following configurations. The forming portion door 332b is in an open state by the external force based on the movement of the power supply fitting body 40 by the vertical direction movement part, connects the opposite space 35s with an exterior via the forming portion opening 35o2, and is in a closed state due to the absence of the external force based on the movement of the power supply fitting body 40 by the vertical movement part to close the forming portion opening 35o2. Therefore, the vehicle charging system 1F and the power receiving fitting body 3F according to the present embodiment can connect the opposite space 35s with an exterior to cause the power supply fitting body 40 to enter the opposite space 35s during the charging of the battery 22, and close the forming portion opening 35o2 by the forming portion door 332b during the travel of the vehicle 2. As a consequence, the vehicle charging system 1 and the power receiving fitting body 3 enable the battery 22 to be charged by the charging device 49, and close the holding portion opening 34o1 with the holding portion door 332a and close the forming portion opening 35o2 with the forming portion door 332b during the travel of the vehicle 2, thereby preventing foreign material from being attached to the power receiving terminals 31.

Third Embodiment

Figure 35:
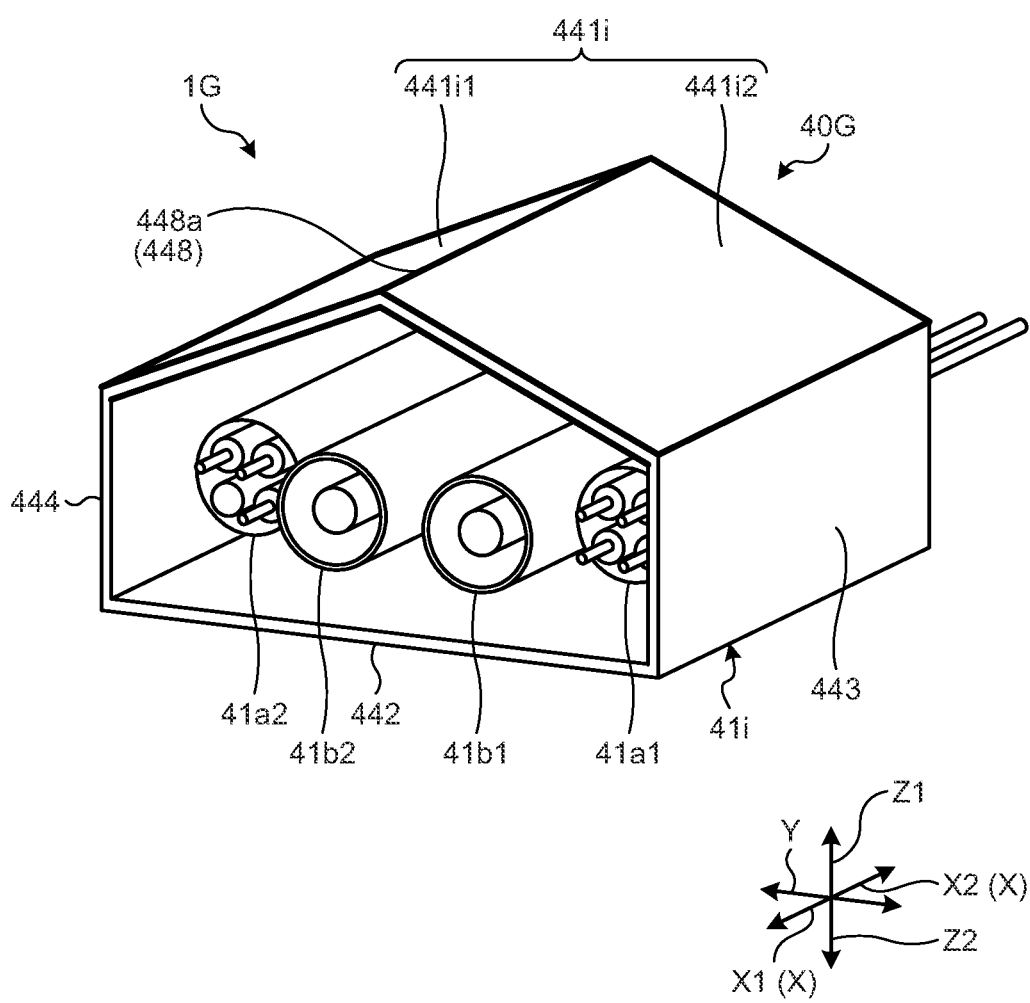
FIG. 35 is a perspective view for explaining a power supply fitting body according to a third embodiment in a vehicle charging system according to the present invention.
Figure 36:
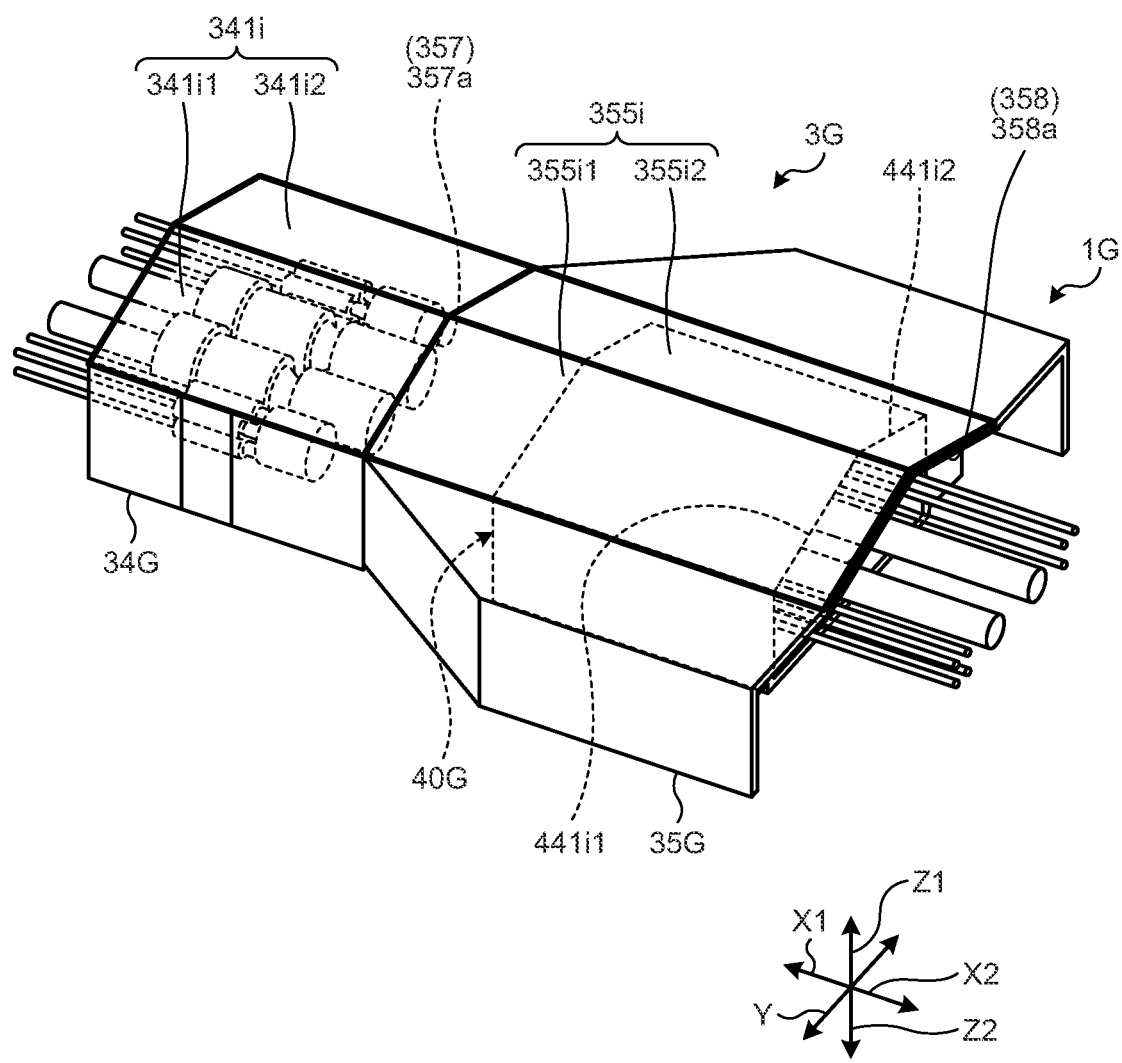
FIG. 36 is a perspective view for explaining a power receiving fitting body according to the third embodiment in the vehicle charging system according to the present invention.

FIG. 35 is a perspective view for explaining a power supply fitting body 40G according to a third embodiment in a vehicle charging system 1G according to the present invention. FIG. 36 is a perspective view for explaining a power receiving fitting body 3G according to the third embodiment in the vehicle charging system 1G according to the present invention.

As illustrated in FIG. 35, the power supply fitting body 40G in the vehicle charging system 1G according to the third embodiment has a power supply ceiling portion 441i facing the power supply bottom portion 442 in the vertical direction Z. The power supply ceiling portion 441i has a first ceiling constituting portion 441i1 and a second ceiling constituting portion 441i2, and a convex portion 448 protruding toward the upward direction Z1 is formed by the first ceiling constituting portion 441i1 and the second ceiling constituting portion 441i2 on a contact surface 448a located on an upper surface side of the power supply ceiling portion 441i. The convex portion 448 extends in the insertion/removal direction X.

As illustrated in FIG. 36, the power receiving terminal holding part 34G in a power receiving fitting body 3G according to the third embodiment in the vehicle charging system 1G has a power receiving ceiling portion 341i in the upward direction Z1. The power receiving ceiling portion 311i is formed by a first ceiling constituting portion 341i1 and a second ceiling constituting portion 341i2. Furthermore, a concave portion recessed toward the upward direction Z1 side is formed by the first ceiling constituting portion 341i1 and the second ceiling constituting portion 341i2 on a ceiling surface located on a lower surface side of the power receiving ceiling portion 341i. The concave portion can engage with the convex portion 448 of the power supply fitting body 40G.

The opposite space forming part 35G in the power receiving fitting body 3G has a ceiling wall portion 355i in the upward direction Z1. The ceiling wall portion 355i is formed by a first ceiling wall constituting portion 355i1 and a second ceiling wall constituting portion 355i2. Furthermore, a concave portion 358 recessed toward the upward direction Z1 side is formed on a ceiling surface 358a located on a lower surface side of the ceiling wall portion 355i. The concave portion 358 can engage with the convex portion 448 of the power supply fitting body 40G.

Furthermore, in the power receiving fitting body 3G, the concave portion of the power receiving terminal holding part 34G and the concave portion 358 of the opposite space forming part 35G extend in the insertion/removal direction X, respectively, and an end of the concave portion on the removal direction X2 side and an end of the concave portion 358 on the fitting direction X1 side are continuous in the insertion/removal direction X.

In the vehicle charging system 1G according to the present embodiment, when the power supply fitting body 40G moves in the upward direction Z1 by driving the lift part 5 and the contact surface 448a of the power supply ceiling portion 441i of the power supply fitting body 40G is brought into contact with the ceiling surface 358a of the ceiling wall portion 355i or the power receiving fitting body 3G, the convex portion 448 of the power supply fitting body 40G engages with the concave portion 358 of the power receiving fitting body 3G, and the axial direction of the power supply terminals 41 becomes parallel to the axial direction of the power receiving terminals 31 along the insertion/removal direction X. Thus, in such a state, when the power supply fitting body 40G is moved in the fitting direction X1, the convex portion 448 in the power supply fitting body 40G engages with the concave portion formed in a power receiving terminal holding part 34G and the power supply terminals 41 come into contact with the power receiving terminals 31.

Note that the aforementioned embodiment has been described in which the convex portion 448 is formed in the power supply fitting body 40G and the concave portion and the concave portion 358 are formed in the power receiving fitting body 3G. However, the present embodiment is not limited thereto, and a concave portion may be formed in the power supply fitting body 40G and a convex portion may be formed in the power receiving fitting body 3G.

The vehicle charging system 1G and the power receiving fitting body 3G according to the present embodiment have the following configurations. Between the ceiling surface 358a and the contact surface 448a, one surface is provided with the convex portion 448 extending in the insertion/removal direction X and the other surface is formed with the concave portion 358 engaging with the convex portion 448 and extending in the insertion/removal direction X. When the convex portion 448 and the concave portion 358 engage with each other in an opposite state, the axial direction of the power supply terminals 41 becomes parallel to the axial direction of the power receiving terminals 31. Therefore, in the vehicle charging system 1G and the power receiving fitting body 3G according to the present embodiment, the axial direction of the power supply terminals 41 can be made parallel to the axial direction of the power receiving terminals 31 by the convex portion 448 and the concave portion 358. Consequently, the vehicle charging system 1G and the power receiving fitting body 3G according to the present embodiment can reliably perform fitting between the power receiving fitting body 3G and the power supply fitting body 40G.

First Modification of Third Embodiment

FIG. 37 is a perspective view for explaining a power supply fitting body 40H and a power receiving fitting body 3H according to a first modification of the third embodiment in a vehicle charging system 1H according to the present invention. FIG. 38 is a sectional view illustrating a contact surface 449a of the power supply fitting body 40H and a ceiling surface 359a of the power receiving fitting body 3G. Note that in FIG. 37, the power supply fitting body 40H indicated by the solid line indicates the positions of convex portions 449 provided on the contact surface 449a for the purpose of convenience, and similarly to other embodiments and modifications, also in the vehicle charging system 1H according to the present embodiment, the power supply fitting body 40H is not arranged at a position outside the opposite space 35s in the power receiving fitting body 3H.

The contact surface 449a of the bower supply fitting body 40H in the vehicle charging system 1H according to the present modification has a plurality of convex portions 449 protruding upward as illustrated in FIG. 37 and FIG. 38. The convex portions 449 extend in the insertion/removal direction X. Furthermore, each convex portion 449 is parallel to the insertion/removal direction X. Moreover, the convex portions 449 are arranged as the same distance in the width direction Y.

The ceiling surface 359a, which is a lower surface of a ceiling wall portion 355H of the power receiving fitting body 3H, is formed with a plurality of concave portions 359. The concave portion 359 can engage with each of the convex portions 449, and is recessed toward the upward direction Z1 from a lower surface of the ceiling surface 359a. The concave portions 359 extend in the insertion/removal direction X, respectively. Furthermore, each concave portion 359 is parallel to the insertion/removal direction X. The concave portion 359 has a plurality of first concave portions 359m and a plurality of second concave portions 359s.

The first concave portions 359m are arranged on the fitting direction X1 side of the power receiving terminal holding part 34 in the insertion/removal direction X. Furthermore, the first concave portions 359m are arranged at the same distance in the width direction Y.

The second concave portions 359s are arranged at positions outside the fitting direction X1 side of the power receiving terminal holding part 34 in the insertion/removal direction X, and are arranged at both sides of the first concave portions 359m, respectively. Furthermore, the second concave portions 359s are arranged at the same distance in the width direction Y. Moreover, a distance between the second concave portions 359s in the width direction is the same as that between the first concave portions 359m in the width direction.

In the vehicle charging system 1H according to the present embodiment, when the power supply fitting body 40H moves in the upward direction Z1 by driving the lift part 5 and the contact surface 449a of the power supply ceiling portion 441 of the power supply fitting body 40H is brought into contact with the ceiling surface 359a of the ceiling wall portion 355 of the power receiving fitting body 3H, the convex portions 449 of the power supply fitting body 40H engage with the concave portions 359 of the power receiving fitting body 3H, and the axial direction of the power supply terminals 41 becomes parallel to the axial direction of the power receiving terminals 31 along the insertion/removal direction X. In such a state, the power supply fitting body 40H is located in the opposite space 35s, and the positions of the power supply terminals 41 in the vertical direction Z and the positions of the power receiving terminals 31 in the vertical direction Z coincide with each other (opposite state).

In the opposite state, when a part of the convex portions 449 and the first concave portions 359m engage with each other and a part of the convex portions 449 and the second concave portions 359s engage with each other, the position of each power supply terminal 41 in the width direction Y is shifted from the position of each corresponding power receiving terminal 31 in the width direction Y. In the vehicle charging system 1H according to the present embodiment, when the power supply fitting body 40H is moved in the fitting direction X1 side by driving the lift part 5, the power supply fitting body 40H comes into contact with the pair of guide surfaces 351f1 and 351f2 and moves in the width direction Y, so that the power receiving terminals 31 and the power supply terminals 41 can be in a connectable state, in which they can come into contact with each other, immediately before fitting when viewed from the insertion/removal direction X. The contactable state means a state in which the positions of the power receiving terminals 31 in the width direction Y and the positions of the power supply terminals 41 in the width direction Y coincide with each other. In such a contactable state, when the power supply terminals 41 are simply moved in the fitting direction X1 by driving the lift part 5, toe power supply terminals 41 can be brought into contact with the power receiving terminals 31.

The aforementioned modification has been described in which the convex portions 449 are formed on the power supply fitting body 40H and the concave portions 359 are formed in the power receiving fitting body 3H. However, the modification of the present embodiment is not limited thereto, and concave portions may also be formed in the power supply fitting body 40H and convex portions may also be formed on the power receiving fitting body 3H.

The vehicle charging system 1H and the power receiving fitting body 3H according to the present modification have the following configurations. Between the ceiling surface 359a and the contact surface 449a, one surface is provided with the convex portions 449 extending in the insertion/removal direction X and the other surface is formed with the concave portions 359 engaging with the convex portions 449 and extending in the insertion/removal direction X. When the convex portions 449 and the concave portions 359 engage with each other in an opposite state, the axial direction of the power supply terminals 41 becomes parallel to the axial direction of the power receiving terminals 31. Therefore, in the vehicle charging system 1H and the power receiving fitting body 3H according to the present modification, the axial direction of the power supply terminals 41 can be made parallel to the axial direction of the power receiving terminals 31 by the convex portion 449 and the concave portion 359. As a consequence, in the vehicle charging system 1H and the power receiving fitting body 3H according to the present modification, in a case where the power supply fitting body 40H moves in the insertion/removal direction X close to the power receiving fitting body 3H by the lift part 5 (insertion/removal direction movement part), the power supply fitting body 40 comes into contact with the pair of guide surfaces 351f1 and 351f2, so that the axial direction of the power supply terminals 41 can be made parallel to the axial direction of the power receiving terminals 31 when the power supply fitting body 40H moves in the width direction Y. Furthermore, in the aforementioned fittable state, when the power supply fitting body 40 moves in the insertion/removal direction X close to the power receiving fitting body 3 by the lift part 5 (insertion/removal direction movement part), it is possible to maintain the state in which the axial direction of the power supply terminals 41 is parallel to the axial direction of the power receiving terminals 31. Consequently, the vehicle charging system 1H and the power receiving fitting body 3H according to the present embodiment can reliably perform fitting between the power receiving fitting body 3H and the power supply fitting body 40H.

Fourth Embodiment

FIG. 39 to FIG. 44 are drawings illustrating a power supply device 4I of a fourth embodiment in the vehicle charging system 1I according to the present invention. The first embodiment has been described in which the power supply device 4 is buried in the stop space 21 of the vehicle 2, for example. However, the power supply device 4I according to the present embodiment is different from the power supply device 4 of the first embodiment in that the power supply device 4H is provided on the ground of the stop space 21 of the vehicle 2.

Figure 39:
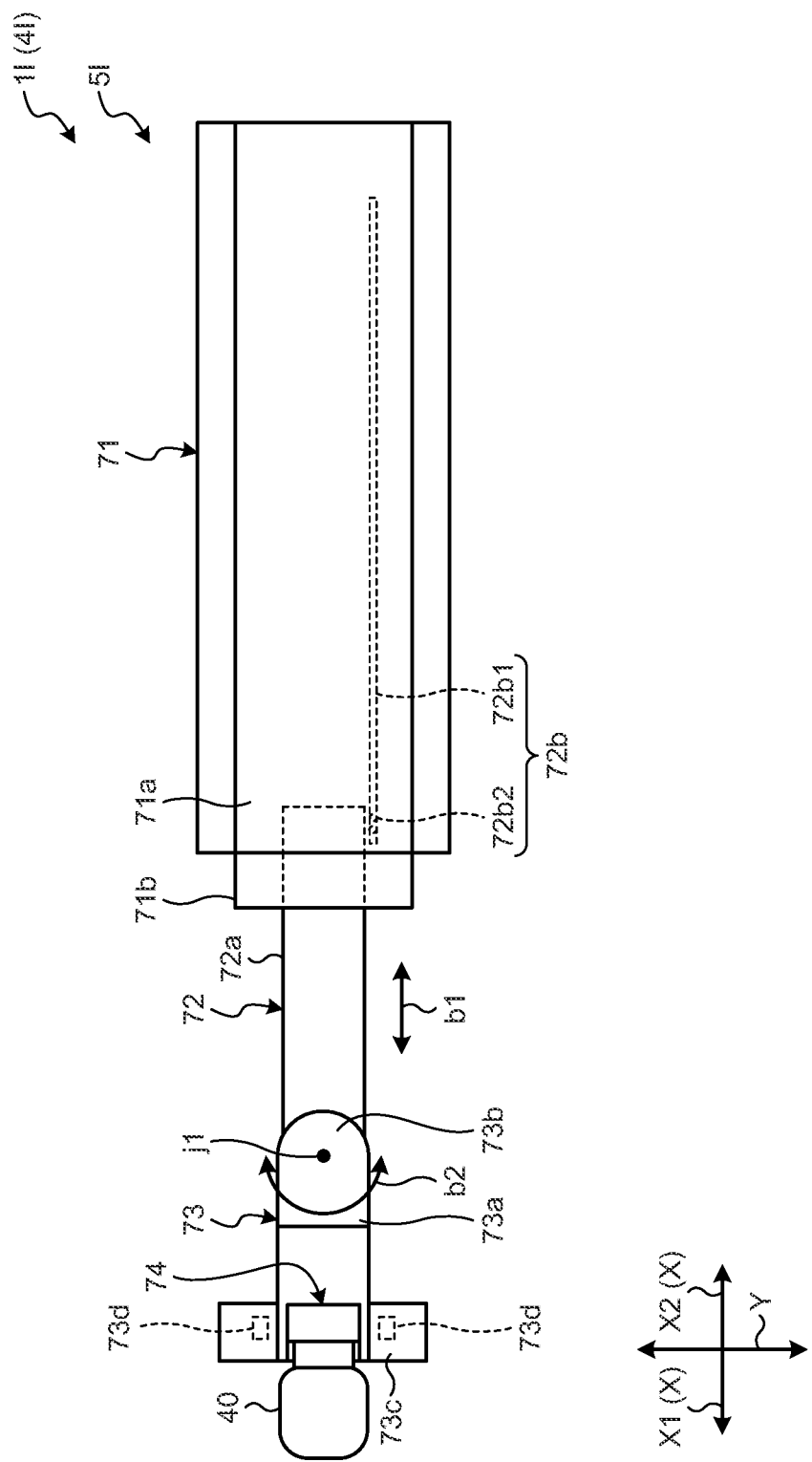
FIG. 39 is a plan view illustrating a lift part of a power supply device according to a vehicle charging system of a fourth embodiment.
Figure 40:
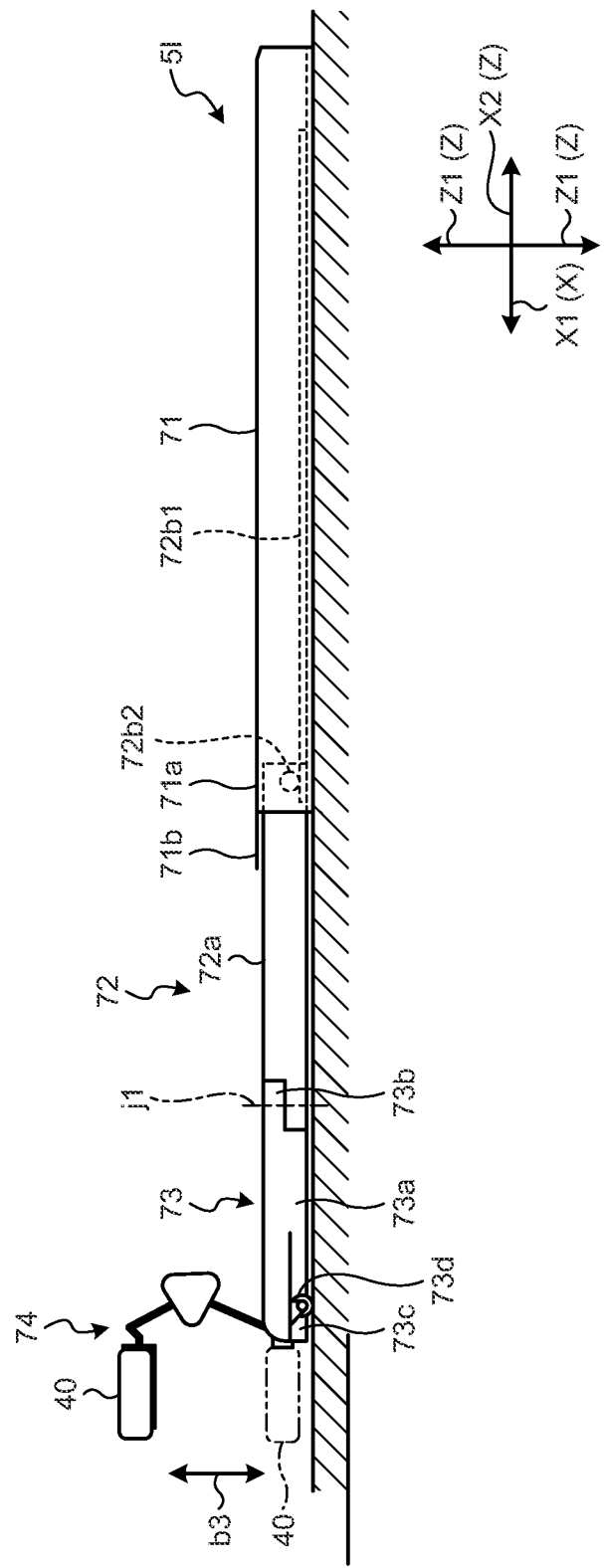
FIG. 40 is a side view illustrating the lift part.
Figure 41:
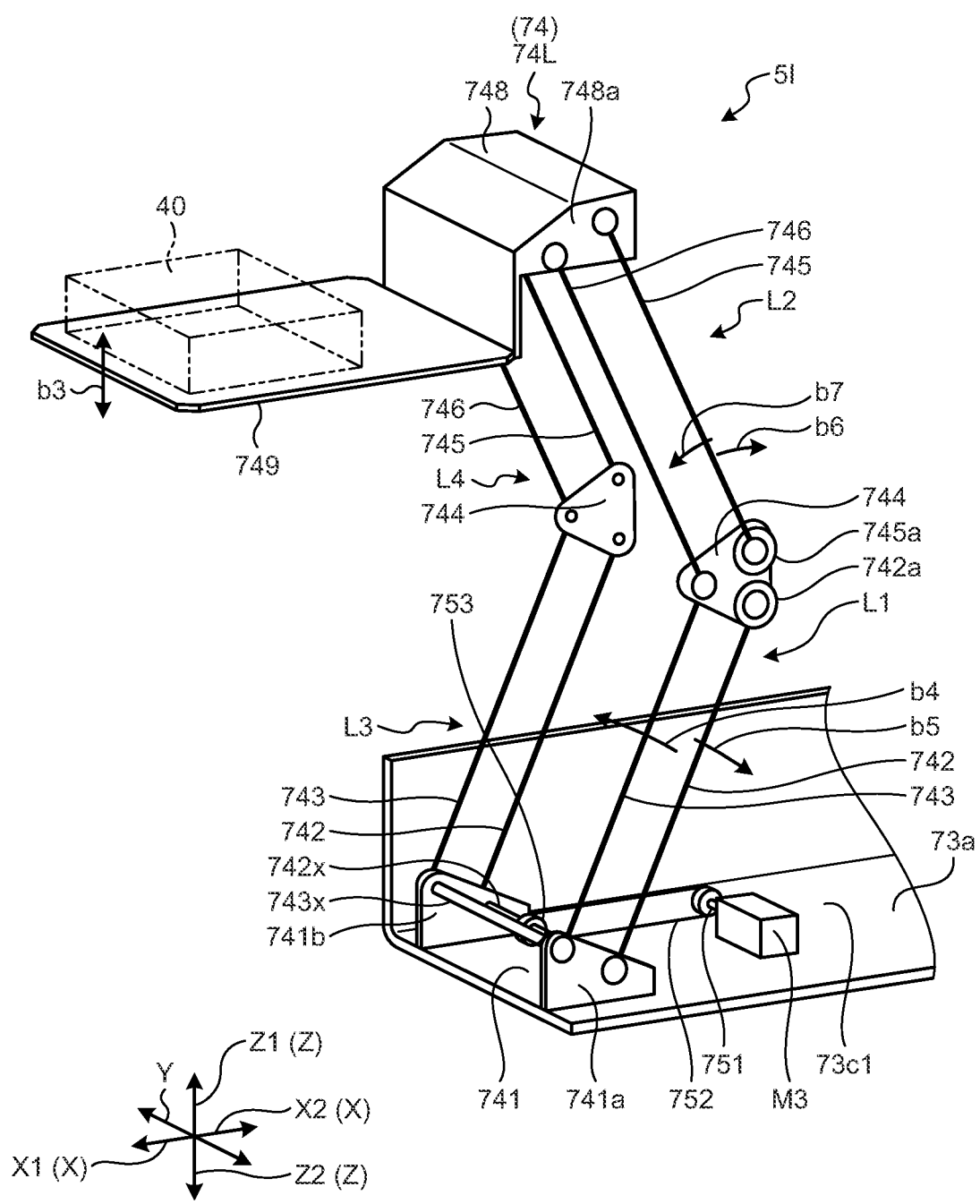
FIG. 41 is a perspective view illustrating a lift mechanism included in the lift part.
Figure 42:
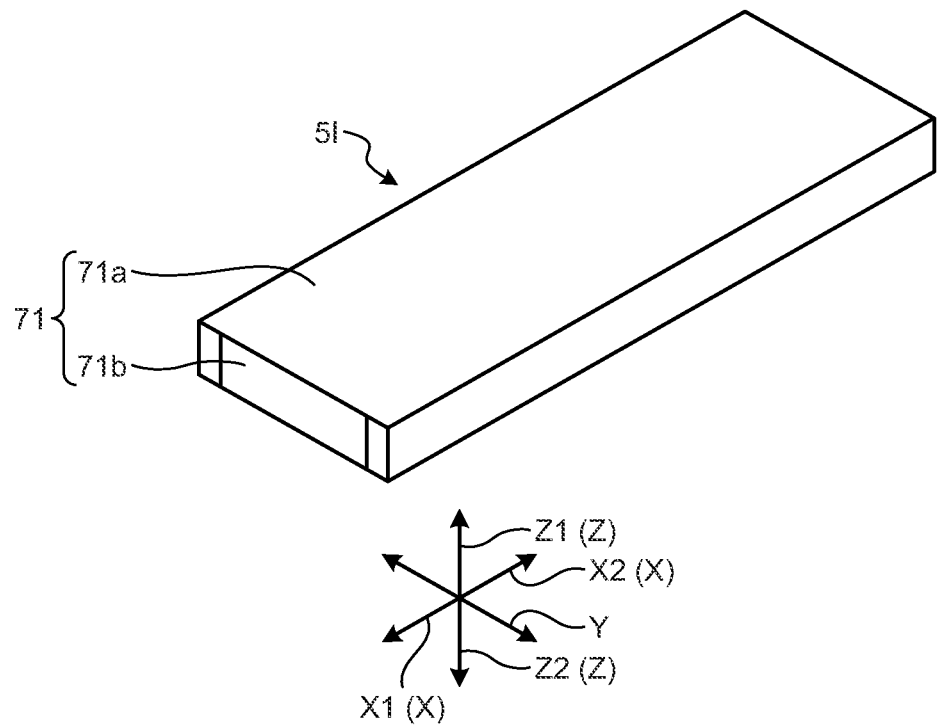
FIG. 42 is a perspective view for sequentially explaining an operation of the lift part of the fourth embodiment.
Figure 43:
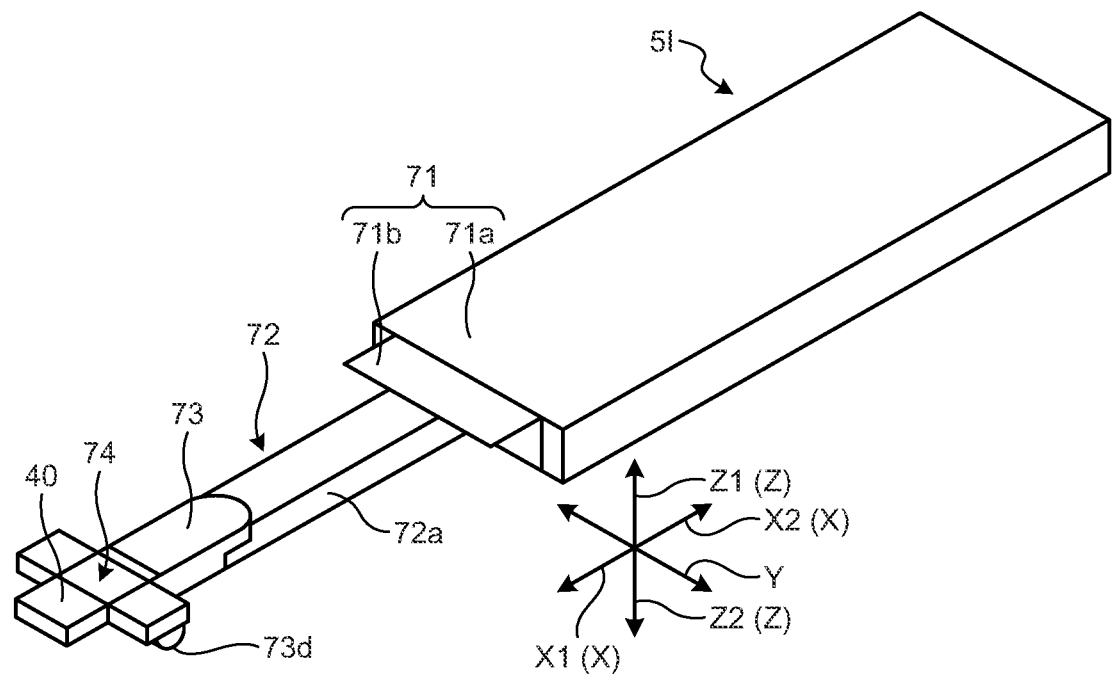
FIG. 43 is a perspective view for sequentially explaining the operation of the lift part of the fourth embodiment.
Figure 44:
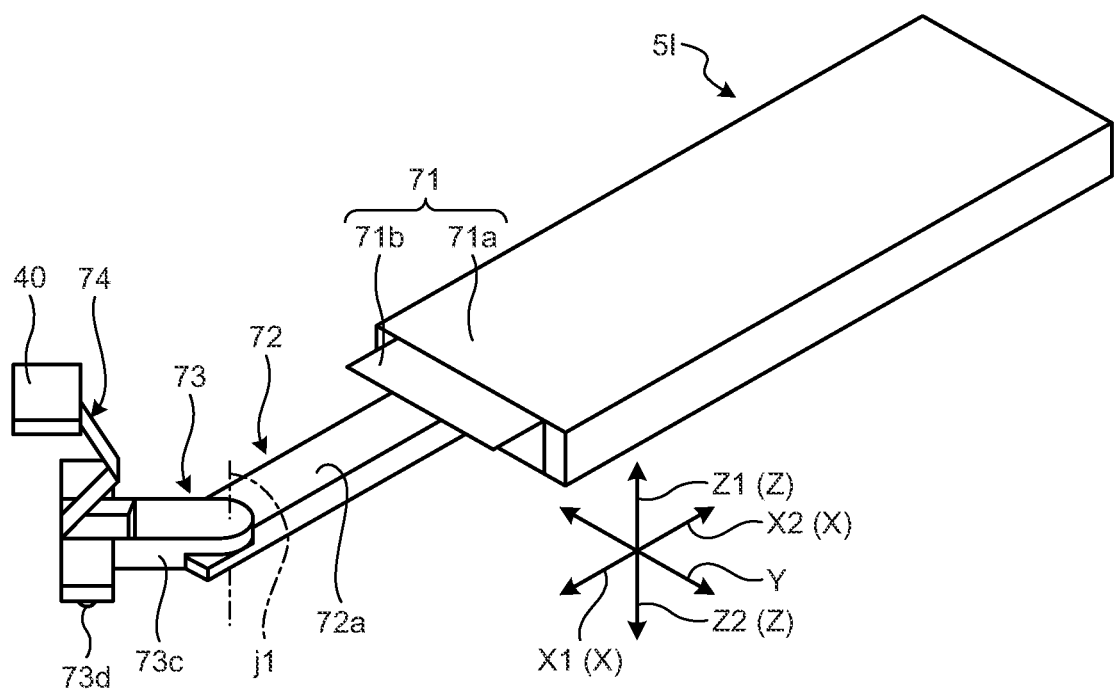
FIG. 44 is a perspective view for sequentially explaining the operation of the lift part of the fourth embodiment.

FIG. 39 is a plan view illustrating a lift part 5I of the power supply device 4I of the fourth embodiment of the present embodiment. FIG. 40 is a side view illustrating the lift part 5I. FIG. 41 is a perspective view illustrating a lift mechanism 74 included in the lift part 5H. FIG. 42 is a perspective view sequentially illustrating an operation of the lift part 5I of the present embodiment. FIG. 43 is a perspective view sequentially illustrating the operation of the lift part 5I of the present embodiment. FIG. 44 is a perspective view sequentially illustrating the operation of the lift part 5I of the present embodiment.

The lift part 5I in the power supply device 4I of the present embodiment includes a lift housing 71, a projecting and retracting portion 72, a swing mechanism 73, and the lift mechanism 74. The lift housing 71 has a housing body 71a and a lid 71b. The lid 71b is attached to an end on the upper surface of the housing body 71a by a hinge so as to be openable and closable. In a state in which the lid 71b is closed with respect to the housing body 71a, the projecting and retracting portion 72, the swing mechanism 73, and the lift mechanism 74 are accommodated inside the housing body 71a and the lid 71b. On the other hand, in a state in which the lid 71b is open with respect to the housing body 71a, the projecting and retracting portion 72, the swing mechanism 73, and the lift mechanism 74 advance from the inside of the housing body 71a as will be described below.

The projecting and retracting portion 72 includes a substantially parallelepiped projecting and retracting body 72a extending in the insertion/removal direction X, a linear movement mechanism 72b provided inside the housing body 71a to linearly move the projecting and retracting body 72a in the front-back direction (longitudinal direction), and a first motor that drives the linear movement mechanism 72b.

The linear movement mechanism 72b of the present embodiment has a rack 72b1 and a pinion 72b2. The rack 72b1 is fixed to the bottom surface inside the housing body 71a, and the first motor for rotating the pinion 72b2 is fixed to a base end of the projecting and retracting body 72a. By rotating the first motor in forward and reverse directions, the projecting and retracting body 72a can be caused to advance and retract with respect to the housing body 71a as indicated by arrow b1.

The swing mechanism 73 includes a swing base end 73a, a connection portion 73b, a caster mounting portion 73c, and a caster 73d.

The swing base end 73a is attached to a tip end of the projecting and retracting body 72a via the connection portion 73b. More specifically, the swing base end 73a is connected to the projecting and retracting body 72a by the connection portion 73b so as to be swingable around a swing shaft j1.

The connection portion 73b has a rotary gear provided to be rotatable around the swing shaft j1, and an output gear provided on an output shaft of a second motor, and causes the rotary gear and the output gear to engage with each other to drive the second motor, thereby swinging the swing base end 73a around the swing shaft j1 with respect to the tip end of the projecting and retracting body 72a. The swing mechanism 73 of the present embodiment swings the swing base end 73a around the swing shaft j1 in one direction with respect to the tip end of the projecting and retracting body 72a by driving the second motor (indicated by arrow b2 in FIG. 39), and swings the swing base end 73a around the swing shaft j1 in the other direction with respect to the tip end of the projecting and retracting body 72a by reversely driving the second motor (indicated by the arrow b2 in FIG. 39).

The caster mounting portion 73c is a portion for mounting the caster 73d. Furthermore, the caster mounting portion 73c has a concave portion 73c1 for accommodating an elevating mechanism part 74L of the lift mechanism 74 when the power supply fitting body 40 is located at the lowermost position as indicated by a two dot chain line in FIG. 40 (see FIG. 41).

The caster 73d is attached to the bottom of the caster mounting portion 73c. Furthermore, the caster 73d can freely change its direction, rotates by changing its direction according to the linear motion of the projecting and retracting body 72a and the swing motion of the swing base end 73a, and supports the projecting and retracting body 72a and the swing base end 73a while regulating the projecting and retracting body 72a and the swing base end 73a, which protrude from the lift housing 71, from coming into contact with the ground.

The lift mechanism 74 moves the power supply fitting body 40 in the vertical direction Z. More specifically, the lift mechanism 74 is configured to be able to move a power supply fitting body mounting part 749 (up and down) in the vertical direction Z as indicated by arrow b3 while maintaining the posture of the power supply fitting body mounting part 749. The lift mechanism 74 has a base portion 741 attached to a tip end of the swing base end 73a and is provided at the tip end thereof with the power supply fitting body mounting part 749 having a plate shape and on which the power supply fitting body 40 is mounted.

FIG. 41 is a perspective view illustrating the lift mechanism 74. In FIG. 41, the power supply fitting body 40 mounted on the power supply fitting body mounting part 749 is indicated by a virtual line.

The lift mechanism 74 includes the elevating mechanism part 74L and a third motor M3 that drives the elevating mechanism part 74L.

The elevating mechanism part 74L has a base end attached to the caster mounting portion 73c and a tip end to which the power supply fitting body 40 is attached, and is foldable. When the elevating mechanism part 74L is folded and the power supply fitting body 40 is located at the lowermost position, the folded elevating mechanism part 74L is accommodated in the concave portion 73c1 of the caster mounting portion 73c.

The elevating mechanism part 74L of the present embodiment has four parallel link mechanisms L1 to L4. The parallel link mechanisms L1 and L2 and the parallel link mechanisms L3 and L4 are bilaterally symmetrical to each other, and the respective corresponding parts will be described using the same reference numerals.

The base portion 741 of the elevating mechanism part 74L is fixed to the bottom of the concave portion 73c1 of the caster mounting portion 73c. One ends of link members 742 and 743 of the parallel link mechanism L1 and one ends of link members 742 and 743 of the parallel link mechanism L3 are rotatably attached to a pair of mechanism mounting portions 741a and 741b on both right and left sides of the base portion 741, respectively.

In the elevating mechanism part 74L of the present embodiment, one end of the link member 742 of the parallel link mechanism L1 and one end of the link member 742 of the parallel link mechanism L3 are connected to each other by a rotating shaft 712x, and the rotating shaft 742x is rotatably supported by the pair of mechanism mounting portions 741a and 741b. Furthermore, in the elevating mechanism part 74L, one end of the link member 743 of the parallel link mechanism L1 and one end of the link member 743 of the parallel link mechanism L3 are connected to each other by a rotating shaft 743x, and the rotating shaft 743x is rotatably supported by the pair of mechanism mounting portions 741a and 741b.

The other ends of the link members 742 and 743 of the parallel link mechanism L1 are rotatably attached to a substantially triangular connection portion 744. Furthermore, one ends of link members 745 and 746 of the parallel link mechanism L2 are rotatably attached to the connection portion 744. The parallel link mechanism L1 of the present embodiment is attached to the connection portion 744 so that the other end of the link member 743 and one end of the link member 746 overlap each other. Furthermore, the link member 742 and the link member 745 are provided with interlocking portions 742a and 745a for interlocking with each other in contact with each other, respectively. The configurations of the parallel link mechanisms L1 and L2 are the same for the parallel link mechanisms L3 and L4.

The other ends of the link members 745 and 746 of each of the parallel link mechanisms L2 and L4 are rotatably attached to link mounting portions 748a on both right and left sides of a movable part 748 connected to the power supply fitting body mounting part 749. The movable part 748 is integrally formed with the power supply fitting body mounting part 749. That is, the movable part 748 and the power supply fitting body mounting part 749 are members for mounting the power supply fitting body 40.

Furthermore, the third motor M3 for operating the elevating mechanism part 74L is fixed to the bottom of the concave portion 73c1. A pulley 751 is attached to a motor shaft of the third motor M3. A belt 752 is stretched over the pulley 751 and a pulley 753 attached to the rotating shaft 742x, so that the rotation of the third motor M3 is transferred to the rotating shaft 742x.

By rotating the third motor M3 in the forward and reverse directions, the rotating shaft 742x rotates in the forward and reverse directions, thereby rotating the link member 742 as indicated by arrows b4 and b5. As the link member 742 rotates, the link member 743 also rotates.

When the link member 742 rotates in the direction of the arrow b4, the link member 745 rotates in the direction of arrow b6 by the interlocking portions 742a and 745a, so that the link member 746 also rotates in the same direction and the movable part 748 and the power supply fitting body mounting part 749 move in the upward direction Z1. On the other hand, when the link member 742 rotates in the direction of the arrow b5, the link member 745 rotates in the direction of arrow b7 by the interlocking portions 742a and 745a, so that the link member 746 also rotates in the same direction and the movable part 748 and the power supply fitting body mounting part 749 move in the downward direction Z2. As described above, the link member 745, which rotates in conjunction with the rotation operation of the link member 742, rotates (reversely rotates) in a direction opposite to that of the link member 742.

Furthermore, in a state in which the vehicle 2 is not stopped in the stop space 21, the lift part 5I of the power supply device 4I of the present embodiment accommodates the projecting and retracting portion 72, the swing mechanism 73, and the lift mechanism 74 inside the lift housing 71 as illustrated in FIG. 42.

Next, when the vehicle 2 is stopped in the stop space 21, the lift part 5I advances the projecting and retracting portion 72 from the lift housing 71, thereby exposing the projecting and retracting portion 72, the swing mechanism 73, and the lift mechanism 74 to an exterior from the lift housing 71 as illustrated in FIG. 43.

Next, as illustrated in FIG. 44, the lift part 5I moves the power supply fitting body 40 upward by driving the lift mechanism 74. Furthermore, if necessary, the lift part 5I drives the swing mechanism 73. From such a state, the lift part 5H further advances the projecting and retracting portion 72 with respect to the lift housing 71, thereby moving the power supply fitting body 40 in the fitting direction X1 and causing the power supply fitting body 40 to be fitted to a power receiving fitting body 3.

Note that the configuration of the aforementioned each embodiment and the configuration of each modification can be applied by combining a part of the configurations with another part of the configurations.

Note that the vehicle charging systems 1, 1A, 1B, 1C, 1D, 1E, 1F, 1G, 1H, and 1I according to the aforementioned embodiments have been described in which power is supplied from the charging device 49 provided outside the vehicle to the battery 22 mounted on the vehicle 2 and charges the battery 22. However, the vehicle charging systems 1, 1A, 1B, 1C, 1D, 1E, 1F, 1G, 1H, and 1I according to the present embodiments are not limited thereto; power may also be supplied from the battery 22 mounted on the vehicle 2 to a storage battery of the charging device 49 provided outside the vehicle (for example, a residence) and may charge the storage battery.

Furthermore, the vehicle charging systems 1, 1A, 1B, 1C, 1D, 1E, 1F, 1G, 1H, and 1I according to the aforementioned embodiments have been described in which each of the power receiving fitting bodies 3, 3D, 3E, 3F, 3G, and 3H has the power receiving terminal holding part 34 and the opposite space forming part 35 and these are integrally formed with each other. However, the vehicle charging systems 1, 1A, 1B, 1C, 1D, 1E, 1F, 1G, 1H, and 1I according to the present embodiments are not limited thereto; even though each of the power receiving fitting bodies 3, 3D, 3E, 3F, 3G, and 3H has the power receiving terminal holding part 34 and does not have the opposite space forming part 35, a concave portion in the bottom 25 of the vehicle 2 can be used as an opposite space forming part.

Moreover, the vehicle charging systems 1, 1A, 1B, 1C, 1E, 1E, 1F, 1G, and 1H according to the present embodiments have been described in which each of the power receiving fitting bodies 3, 3D, 3E, 3F, 3G, and 3H is arranged inside the concave portion 27 provided in the bottom 25 of the vehicle 2. However, the vehicle charging systems 1, 1A, 1B, 1C, 1D, 1E, 1F, 1G, 1H, and 1I according to the present embodiments are not limited thereto; it is sufficient if in the power receiving fitting bodies 3, 3D, 3E, 3F, 3G, and 3H, at least the shaft center of the power receiving terminal 31 is arranged inside the concave portion 27.

Furthermore, the vehicle charging systems 1, 1A, 1B, 1D, 1E, 1F, 1G, and 1H according to the aforementioned embodiments have been described in which in the power receiving fitting bodies 3, 3D, 3E, 3F, 3G, and 3H, two power receiving terminals 31 are arranged side by side in the width direction Y. However, the power receiving fitting bodies 3, 3D, 3E, 3F, 3G, and 3H in the vehicle charging systems 1, 1A, 1B, 1D, 1E, 1F, 1G, 1H, and 1I according to the present embodiments are not limited thereto; a plurality of three or more power receiving terminals 31 may also be arranged side by side in the width direction Y.

Moreover, the vehicle charging systems 1, 1A, 1B, 1D, 1E, 1F, 1G, 1H, and 1I according to the present embodiments have been described in which in the power receiving fitting bodies 3, 3D, 3E, 3F, 3G, and 3H, two power receiving terminals 31 are arranged side by side adjacent to each other in the width direction Y and two power receiving signal terminals 31a are arranged side by side adjacent to both sides of the power receiving terminals 31 in the width direction Y. However, the vehicle charging systems 1, 1A, 1B, 1D, 1E, 1F, 1G, 1H, and 1I according to the present embodiments are not limited thereto; two power receiving terminals 31 may also be arranged side by side adjacent to each other in the width direction Y and two power receiving signal terminals 31a may also be arranged side by side so as to be arranged in the vertical direction Z between these two power receiving terminals 31 in the width direction Y.

Since a vehicle charging system and a power receiving fitting body according to the present embodiment have the above configurations, it is possible to suppress the influence on a layout inside a vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle charging system comprising:
   a power supply device including a power supply fitting body and provided in a stop space of a vehicle; and
   a power receiving fitting body that is provided on a bottom of the vehicle and is able to be fitted to and removed from the power supply fitting body in a horizontal insertion/removal direction extending horizontally, wherein
   the power receiving fitting body includes a power receiving terminal electrically connected to a battery provided in the vehicle, a power receiving terminal holding part that holds the power receiving terminal, and an opposite space forming part that is arranged adjacent to the power receiving terminal holding part in the horizontal insertion/removal direction and forms an opposite space facing the power receiving terminal,
   the power supply fitting body includes a power supply terminal electrically connected to a charging device provided outside the vehicle,
   the power supply device includes at least a horizontal insertion/removal direction movement part that moves the power supply fitting body in the horizontal insertion/removal direction, and
   when the power supply fitting body is located in the opposite space and the power supply terminal and the power receiving terminal are in an opposite state in which the power supply terminal and the power receiving terminal are opposite to each other in the horizontal insertion/removal direction, the horizontal insertion/removal direction movement part causes the power receiving fitting body and the power supply fitting body to be fitted to each other by moving the power supply fitting body toward the power receiving fitting body in the horizontal insertion/removal direction, and electrically connects the battery and the charging device by bringing the power receiving terminal and the power supply terminal into contact with each other.

2. The vehicle charging system according to claim 1, wherein
   the power receiving terminal holding part has a holding portion opening at an end of the power receiving terminal in a removal direction, the holding portion opening connecting the opposite space with an internal space of the power receiving terminal holding part,
   the power receiving fitting body has a holding portion door that opens and closes the holding portion opening,
   the holding portion door is in an open state by external force based on a movement of the power supply fitting body by the horizontal insertion/removal direction movement part, and exposes the power receiving terminal to the opposite space via the holding portion opening, and
   the holding portion door is in a closed state due to absence of the external force based on the movement of the power supply fitting body by the horizontal insertion/removal direction movement part, and closes the holding portion opening.

3. The vehicle charging system according to claim 1, wherein
   the opposite space forming part has guide surfaces that are arranged on a side of the power receiving fitting body in the horizontal insertion/removal direction and face the power supply fitting body in the horizontal insertion/removal direction in the opposite state,
   the guide surfaces are arranged in a pair with the power receiving terminal holding part interposed therebetween, and a distance between the pair of guide surfaces in a width direction becomes shorter toward the power receiving fitting body in the horizontal insertion/removal direction.

4. The vehicle charging system according to claim 2, wherein
the opposite space forming part has guide surfaces that are arranged on a side of the power receiving fitting body in the horizontal insertion/removal direction and face the power supply fitting body in the horizontal insertion/removal direction in the opposite state,
the guide surfaces are arranged in a pair with the power receiving terminal holding part interposed therebetween, and
a distance between the pair of guide surfaces in a width direction becomes shorter toward the power receiving fitting body in the horizontal insertion/removal direction.

5. The vehicle charging system according to claim 1, wherein
the power supply device has a vertical movement part that causes the power supply fitting body to advance and retract with respect to the opposite space by moving the power supply fitting body in a vertical direction of the vehicle.

6. The vehicle charging system according to claim 2, wherein
the power supply device has a vertical movement part that causes the power supply fitting body to advance and retract with respect to the opposite space by moving the power supply fitting body in a vertical direction of the vehicle.

7. The vehicle charging system according to claim 3, wherein
the power supply device has a vertical movement part that causes the power supply fitting body to advance and retract with respect to the opposite space by moving the power supply fitting body in a vertical direction of the vehicle.

8. The vehicle charging system according to claim 4, wherein
the power supply device has a vertical movement part that causes the power supply fitting body to advance and retract with respect to the opposite space by moving the power supply fitting body in a vertical direction of the vehicle.

9. The vehicle charging system according to claim 5, wherein
the opposite space forming part has a forming portion opening that connects the opposite space and an exterior in a downward direction,
the power receiving fitting body has a forming portion door that opens and closes the forming portion opening,
the forming portion door is in an open state by external force based on a movement of the power supply fitting body by the vertical movement part, and connects the opposite space with an exterior via the forming portion opening, and
the forming portion door is in a closed state due to absence of the external force based on the movement of the power supply fitting body by the vertical movement part, and closes the forming portion opening.

10. The vehicle charging system according to claim 6, wherein
the opposite space forming part has a forming portion opening that connects the opposite space and an exterior in a downward direction,
the power receiving fitting body has a forming portion door that opens and closes the forming portion opening,
the forming portion door is in an open state by external force based on a movement of the power supply fitting body by the vertical movement part, and connects the opposite space with an exterior via the forming portion opening, and
the forming portion door is in a closed state due to absence of the external force based on the movement of the power supply fitting body by the vertical movement part, and closes the forming portion opening.

11. The vehicle charging system according to claim 7, wherein
the opposite space forming part has a forming portion opening that connects the opposite space and an exterior in a downward direction,
the power receiving fitting body has a forming portion door that opens and closes the forming portion opening,
the forming portion door is in an open state by external force based on a movement of the power supply fitting body by the vertical movement part, and connects the opposite space with an exterior via the forming portion opening, and
the forming portion door is in a closed state due to absence of the external force based on the movement of the power supply fitting body by the vertical movement part, and closes the forming portion opening.

12. The vehicle charging system according to claim 8, wherein
the opposite space forming part has a forming portion opening that connects the opposite space and an exterior in a downward direction,
the power receiving fitting body has a forming portion door that opens and closes the forming portion opening,
the forming portion door is in an open state by external force based on a movement of the power supply fitting body by the vertical movement part, and connects the opposite space with an exterior via the forming portion opening, and
the forming portion door is in a closed state due to absence of the external force based on the movement of the power supply fitting body by the vertical movement part, and closes the forming portion opening.

13. The vehicle charging system according to claim 5, wherein
the opposite space forming part has a contact surface coming into contact with a ceiling surface of the power supply fitting body when the power supply fitting body is moved in an upward direction by the vertical movement part,
one of the ceiling surface and the contact surface is formed with a convex portion extending in the horizontal insertion/removal direction, the other of the ceiling surface and the contact surface is formed with a concave portion configured to engage with the convex portion and extending in the horizontal insertion/removal direction, and
when the convex portion and the concave portion engage with each other in the opposite state, an axial direction of the power supply terminal becomes parallel to an axial direction of the power receiving terminal.

14. The vehicle charging system according to claim 6, wherein
the opposite space forming part has a contact surface coming into contact with a ceiling surface of the power supply fitting body when the power supply fitting body is moved in an upward direction by the vertical movement part, one of the ceiling surface and the contact surface is formed with a convex portion extending in the horizontal insertion/removal direction, the other of the ceiling surface and the contact surface is formed with a concave portion configured to engage with the convex portion and extending in the horizontal insertion/removal direction, and when the convex portion and the concave portion engage with each other in the opposite state, an axial direction of the power supply terminal becomes parallel to an axial direction of the power receiving terminal.

15. The vehicle charging system according to claim 7, wherein the opposite space forming part has a contact surface coming into contact with a ceiling surface of the power supply fitting body when the power supply fitting body is moved in an upward direction by the vertical movement part, one of the ceiling surface and the contact surface is formed with a convex portion extending in the horizontal insertion/removal direction, the other of the ceiling surface and the contact surface is formed with a concave portion configured to engage with the convex portion and extending in the horizontal insertion/removal direction, and when the convex portion and the concave portion engage with each other in the opposite state, an axial direction of the power supply terminal becomes parallel to an axial direction of the power receiving terminal.

16. The vehicle charging system according to claim 8, wherein the opposite space forming part has a contact surface coming into contact with a ceiling surface of the power supply fitting body when the power supply fitting body is moved in an upward direction by the vertical movement part, one of the ceiling surface and the contact surface is formed with a convex portion extending in the horizontal insertion/removal direction, the other of the ceiling surface and the contact surface is formed with a concave portion configured to engage with the convex portion and extending in the horizontal insertion/removal direction, and when the convex portion and the concave portion engage with each other in the opposite state, an axial direction of the power supply terminal becomes parallel to an axial direction of the power receiving terminal.

17. The vehicle charging system according to claim 9, wherein the opposite space forming part has a contact surface coming into contact with a ceiling surface of the power supply fitting body when the power supply fitting body is moved in an upward direction by the vertical movement part, one of the ceiling surface and the contact surface is formed with a convex portion extending in the horizontal insertion/removal direction, the other of the ceiling surface and the contact surface is formed with a concave portion configured to engage with the convex portion and extending in the horizontal insertion/removal direction, and when the convex portion and the concave portion engage with each other in the opposite state, an axial direction of the power supply terminal becomes parallel to an axial direction of the power receiving terminal.

18. The vehicle charging system according to claim 1, wherein the power receiving fitting body has a plurality of the power receiving terminals, and the power receiving terminals are arranged side by side in a width direction that is a direction different from the horizontal insertion/removal direction and the vertical direction of the vehicle.

19. The vehicle charging system according to claim 2, wherein the power receiving fitting body has a plurality of the power receiving terminals, and the power receiving terminals are arranged side by side in a width direction that is a direction different from the horizontal insertion/removal direction and the vertical direction of the vehicle.

20. A power receiving fitting body that is provided on a bottom of a vehicle and is able to be fitted to and removed from a power supply fitting body in a horizontal insertion/removal direction, the power supply fitting body being included in a power supply device provided in a stop space of a vehicle, the power receiving fitting body comprising:

a power receiving terminal electrically connected to a battery provided in the vehicle;

a power receiving terminal holding part that holds the power receiving terminal; and an opposite space forming part that is arranged adjacent to the power receiving terminal holding part in the horizontal insertion/removal direction and forms an opposite space facing the power receiving terminal, wherein the power receiving terminal is able to face and come into contact with, in the horizontal insertion/removal direction, a power supply terminal electrically connected to a charging device provided outside the vehicle, and when the power supply fitting body is moved toward a side of the power receiving fitting body in the horizontal insertion/removal direction, the power receiving fitting body is fitted to the power supply fitting body and the power receiving terminal and the power supply terminal come into contact with each other so as to electrically connect the battery and the charging device.

\* \* \* \* \*